United States Patent [19]
Kiuchi et al.

[11] Patent Number: 5,638,524
[45] Date of Patent: Jun. 10, 1997

[54] DIGITAL SIGNAL PROCESSOR AND METHOD FOR EXECUTING DSP AND RISC CLASS INSTRUCTIONS DEFINING IDENTICAL DATA PROCESSING OR DATA TRANSFER OPERATIONS

[75] Inventors: Atsushi Kiuchi, Kunitachi, Japan; Toru Baji, San Jose, Calif.; Tetsuya Nakagawa, Koganei; Kenji Kaneko, Sagamihara, both of Japan

[73] Assignee: Hitachi America, Ltd., Tarrytown, N.Y.

[21] Appl. No.: 443,199

[22] Filed: May 17, 1995

Related U.S. Application Data

[63] Continuation of Ser. No. 127,694, Sep. 27, 1993, abandoned.
[51] Int. Cl.$^6$ ............................................. G06F 9/30
[52] U.S. Cl. ................... 395/375; 364/263.3; 364/906.2
[58] Field of Search ................................. 395/375, 800

[56] References Cited

U.S. PATENT DOCUMENTS

| | | |
|---|---|---|
| 4,188,669 | 2/1980 | Rauscher . |
| 4,498,135 | 2/1985 | Caudel . |
| 4,503,500 | 3/1985 | Magar . |
| 4,661,925 | 4/1987 | Maccianti et al. . |
| 4,847,759 | 7/1989 | Oklobzija . |
| 4,935,867 | 6/1990 | Wang et al. . |
| 5,034,879 | 7/1991 | Woodward et al. . |
| 5,099,421 | 3/1992 | Buerkle et al. . |
| 5,303,356 | 4/1994 | Vassilidino ....................... 395/375 |
| 5,313,551 | 5/1994 | Labrousse ........................ 395/485 |

FOREIGN PATENT DOCUMENTS 0301220  1/1989  European Pat. Off. .

OTHER PUBLICATIONS

Tanenbaum, "Structured, Computer Organization", 1976, p. 75–79, Prentice–Hall.
Texas Instruments, "TMS320C3X User's Guide", pp. 10–3 –10–199 (1991).

*Primary Examiner*—David Y. Eng
*Attorney, Agent, or Firm*—Flehr Hohbach Test Albritton & Herbert

[57] ABSTRACT

A digital signal processor that includes an instruction memory, a program control unit, and an instruction decoder. The instruction memory stores a sequence of instruction words including DSP instruction words and RISC instruction words. The program control unit outputs an instruction address to the instruction memory so as to select one instruction word in the instruction memory. Every DSP instruction word identifies one data processing operation and one data transfer operation to be performed. The DSP instruction words include a predefined DSP instruction word having separate source and destination fields for specifying register locations for data sources and data destinations. The RISC instruction words include a predefined RISC instruction word corresponding to the predefined DSP instruction word. The predefined RISC instruction word has separate source and destination fields for specifying register locations for data sources and data destinations. One of the source and destination fields in the predefined RISC instruction word has more bits than the corresponding field in the predefined DSP instruction word. The instruction decoder decodes the selected instruction.

22 Claims, 50 Drawing Sheets

1130 (DSP Class Instructions)

| | Instruction Type | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 1134 | D1=SX1 op SY1 D2=SX2 * SY2 MEMA(B)=Rs Rl=MEMB(A) | TY | St | Op | SX1 | | SY1 | | D1 | | SX2 | | SY2 | | D2 | Rl | Rs | Ab | MEMB | Aa | MEMA |
| 1135 | D1=SX1 op SY1 D2=SX2 * SY2 Ra=MEMA Rb=MEMB | TY | Op | SX1 | | SY1 | | D1 | | SX2 | | SY2 | | D2 | Rb | Ra | Ab | MEMB | Aa | MEMA |
| 1136 | D=SRC1 op SRC2 MEMA(B)=Rs Rl=MEMB(A) | TY | | St | Op | | SY1 | | SRC1 | | | SRC2 | | D | Rl | Rs | Ab | MEMB | Aa | MEMA |
| 1137 | D=SRC1 op SRC2 Ra=MEMA Rb=MEMB | TY | | Op | | SX1 | | SRC1 | | | SRC2 | | D | Rb | Ra | Ab | MEMB | Aa | MEMA |
| 1138 | D1=SX1 op SY1 D2=SX2 * SY2 Rq=MEM | TY | Rg | Op | | | SY1 | | D1 | | SX2 | | SY2 | | D2 | Rq | Am | MEM |
| 1139 | D1=SX1 op SY1 D2=SX2 * SY2 MEM=Rp | TY | | Op | | SX1 | | | SY1 | | D1 | | SX2 | | SY2 | | D2 | Rp | Am | MEM |
| 1140 | D=op SRC MEMA(B)=Rs Rl=MEMB(A) | | TY | | | St | | Op | | | | SRC | | D | Rl | Rs | Ab | MEMB | Aa | MEMA |
| 1141 | D=op SRC Ra=MEMA Rb=MEMB | | TY | | | 0 | | Op | | | | SRC | | D | Rb | Ra | Ab | MEMB | Aa | MEMA |
| 1142 | D=SRC1 op SRC2 Rq=MEM | | | TY | | | Rg | | Op | | SRC1 | | SRC2 | | D | Rq | Am | MEM |
| 1143 | D=SCR1 op SCR2 MEM=Rp | | | TY | | | | | Op | | SRC1 | | SRC2 | | D | Rp | Am | MEM |
| 1144 | D= op SRC Rq=MEM | | | | TY | | | | | Rg | | Op | | | SRC | | D | Rq | Am | MEM |
| 1145 | D= op SRC MEM=Rp | | | | TY | | | | | | | Op | | | SRC | | D | Rp | Am | MEM |

Figure 8(a)

| Instruction Type | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| DST1=SRCX1 op SRCY1  DST2=SRCX2 * SRCY2 | TY | | | | SRCX1 | | | | DST1 | | | SRCX2 | | | SRCY2 | | | DST2 | | | CC | | | Op |
| MEMA load/store between Raa  Rbb=MEMB | TY | | | | MEMB | | | | Aq | | | MEMA | | | Raa | | | Rbb | | | Ap | | | Op |
| Ra=Rb (data move between registers) | | | | | | | | | Ra | | | 1 1 1 | | | | | Rb | | | | 0 | 0 | 0 | 0 |
| [if ccl DST=DST op $DATA or [if ccl DST=$DATA op DST | TY | | | | | | Op | | | $DATA(upper) | | | | | | | | DST | | | CC | | | |
| [if ccl Rn=$DATA | TY | | | | | | | Op | $DATA(upper) | | | | | | | | | Rn | | | CC | | | |
| [if ccl DST=SRC1opSRC2 | TY | | | | | | Op | | | | | SRC1 | | | SRC2 | | | DST | | | CC | | | |
| [if ccl op (short)$Address or [if ccl op $Disp  (stand branch) | TY | | | | | | Op | | | $Address or $Disp | | | | | | | | | | | CC | | | |
| [if ccl op (short)$Address or [if ccl op $Disp  (delay branch) | TY | | | | | | Op | | | $Address or $Disp | | | | | | | | | | | CC | | | |
| repeat M rc=N (program control) | TY | | | | | | | | | | N | | | | | | | | M | | | | | |
| Rn=*(short)$Address or *$(short)Address=Rn | TY | | | | | | Op | | | $Address | | | | | | | Rn | | | | $Address | | | |
| [Rn=*!An++$Disp or *!An++$Disp=Rn | TY | | | | | | | | $Disp | | | | | | | Rn | | | | | An | | | Op |
| [if ccl DST=DST op $Data | TY | | | | | | Op | | | | | $Data | | | | | | DST | | | CC | | | |
| second word of two word instruction | | | | | | | | | | | $Address(lower) or $Data(lower) | | | | | | | | | | | | | |
| [if ccl DST= op SRC or [if ccl DST op SRC | TY | | | | | | | | | Op | | | | | SRC | | | DST | | | CC | | | |
| Rn=*$Address or *$Address=Rn | TY | | | | | | | | | Op | | | | | | | Rn | | | 0 | 0 | $A(up) | | |
| [if ccl DST= op (DST, $Data) | TY | | | | | | Op | | | | | $Data | | | | | | DST | | | CC | | | |
| [if ccl op $Address  (standard branch) | TY | | | | | | | | | Op | | | 0 0 | | 0 | 0 | 0 | 0 0 | | | CC | | | |
| [if ccl op $Address  (delayed branch) | TY | | | | | | | | | Op | | | 0 0 | | 0 | 0 | 0 | 0 0 | | | CC | | | |
| Special (other instruction) | | | | | | | | | | Op | | | | | | | | other operand area | | | | | | |
| Rn=MEM or MEM=Rn | TY | | | | | | | | | MEM | | | | | | | Rn | | | | An | | | Op |
| push Rn or pop Rn (stacking operation) | TY | | | | | | | | | Op | | | | | | | Rn | | M | | 0 | 0 | 0 | 0 |
| repeat M rc=Rm (program control) | TY | | | | | | | | | | | | Rm | | | | | | M | | | | | |
| [if ccl op Rm  (standard branch) | TY | | | | | | | | | | | Op | | | | | Rm | | | | CC | | | |
| [if ccl op Rm  (delayed branch) | TY | | | | | | | | | | | Op | | | | | Rm | | | | CC | | | |
| no operation | | | | | | | | | | | | all 0's | | | | | | | | | | | | |

1132 (RISC Class Instructions)

Figure 8(b)

| | Instruction Type | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 1134 | D1=SX1 op SY1 D2=SX2 * SY2 MEMA(B)=Rs Rl=MEMB(A) | PT | T | St | Op | SX1 | | | SY1 | | | D1 | SX2 | | | SY2 | D2 | Rl | Rs | Ab | MEMB | Aa | MEMA |
| 1135 | D1=SX1 op SY1 D2=SX2 * SY2 Ra=MEMA Rb=MEMB | PT | T | Op | | SX1 | | | SY1 | | | D1 | SX2 | | | SY2 | D2 | Rb | Ra | Ab | MEMB | Aa | MEMA |
| 1136 | D=SRC1 op SRC2 MEMA(B)=Rs Rl=MEMB(A) | | PT | | T | H | St | | | Op | | | | SRC1 | | | D | Rl | Rs | Ab | MEMB | Aa | MEMA |
| 1137 | D=SRC1 op SRC2 Ra=MEMA Rb=MEMB | | PT | | T | H | | | | Op | | | | SRC2 | | | D | Rb | Ra | Ab | MEMB | Aa | MEMA |
| 1138 | D1=SX1 op SY1 D2=SX2 * SY2 Rq=MEM | | PT | | T | H | Rg | Op | | SX1 | | | D1 | SX2 | | | SY2 | | | | D2 | Rq | Am | MEM |
| 1139 | D1=SX1 op SY1 D2=SX2 * SY2 MEM=Rp | | PT | | T | H | Op | | | SX1 | | | D1 | SX2 | | | SY2 | | | | D2 | Rp | Am | MEM |
| 1140 | D=op SRC MEMA(B)=Rs Rl=MEMB(A) | | | PT | | T | H | St | | | Op | | | | SRC | | | D | Rl | Rs | Ab | MEMB | Aa | MEMA |
| 1141 | D=op SRC Ra=MEMA Rb=MEMB | | | PT | | T | H | | | | Op | | | | SRC | | | D | Rb | Ra | Ab | MEMB | Aa | MEMA |
| 1142 | D=SRC1 op SRC2 Rq=MEM | | | | PT | | T | Rg | | | Op | | | | SRC2 | | | D | Rq | | | Am | MEM |
| 1143 | D=SCR1 op SCR2 MEM=Rp | | | | PT | | T | | | | Op | | | | SRC2 | | | D | Rp | | | Am | MEM |
| 1144 | D=op SRC Rq=MEM | | | | | PT | | T | Rg | | | Op | | | | SRC | | | D | Rq | | | Am | MEM |
| 1145 | D=op SRC MEM=Rp | | | | | PT | | T | | | | Op | | | | SRC | | | D | Rp | | | Am | MEM |

1130 (DSP Class Instructions)

Figure 8(c)

1132 (RISC Class Instructions)

| | Instruction Type | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 1146 | DST1=SRCX1 op SRCY1 DST2=SRCX2 * SRCY2 | PT | T | SRCX1 | | | SRCY1 | | | DST1 | | | SRCX2 | | | SRCY2 | | | DST2 | | | CC | | | |
| 1147 | MEMA load/store between Raa Rbb=MEMB | PT | | | H | | MEMB | | | Aq | | | MEMA | | | Raa | | | Rbb | | | Ap | | | Op |
| 1148 | Ra=Rb (data move between registers) | PT | T | | H | | Op | | | Ra | | | 1 1 1 | | | | | | Rb | | | 0 0 0 0 | | | |
| 1149 | [if cc] DST=DST op $DATA or [if cc] DST=$DATA op DST | PT | T | | H | | Op | | | $DATA(upper) | | | | | | | | | DST | | | CC | | | |
| 1150 | [if cc] Rn=$DATA | PT | T | | H | | Op | | $DATA(upper) | | | | | | | | | | Rn | | | CC | | | |
| 1151 | [if cc] DST=SRC1opSRC2 | PT | T | | H | | Op | | | | | | SRC1 | | | SRC2 | | | DST | | | CC | | | |
| 1152 | [if cc] op (short)$Address or [if cc] op $Disp (stand branch) | | | PT | | | Op | | | $Address or $Disp | | | | | | | | | | | | CC | | | |
| 1153 | [if cc] op (short)$Address or [if cc] op $Disp (delay branch) | | | PT | | T | Op | | | $Address or $Disp | | | | | | | | | | | | CC | | | |
| 1154 | repeat M rc=N (program control) | | | PT | | T | | | | | | N | | | | | | | | M | | | | | |
| 1155 | Rn=*(short)$Address or *$(short)Address=Rn | | | | PT | T | Op | | | $Address | | | | | | | | | Rn | | | $Address | | | |
| 1156 | [Rn]=*[An++$Disp or *An++$Disp=Rn | | | | PT | T | | | | $Disp | | | | | | | | | Rn | | | An | | | Op |
| 1157 | [if cc] DST=DST op $Data | | | | | PT | | T | H | Op | | | $Data | | | | | | DST | | | CC | | | |
| 1158 | second word of two word instruction | | | | | PT | | T | H | | | | $Address(lower) or $Data(lower) | | | | | | | | | | | | |
| 1159 | [if cc] DST= op SRC or [if cc] DST op SRC | | | | | | PT | T | H | | | Op | | | | SRC | | | DST | | | CC | | | |
| 1160 | Rn=*$Address or *$Address=Rn | | | | | | PT | T | H | | | | Op | | | | | | Rn | | | 0 0 $A(up) | | | |
| 1161 | [if cc] DST= op (DST, $Data) | | | | | | | PT | T | H | Op | | | $Data | | | | | | DST | | | CC | | | |
| 1162 | [if cc] op $Address (standard branch) | | | | | | | PT | T | H | Op | | | 0 0 0 0 | | | | | | 0 0 $A(up) | | | | |
| 1163 | [if cc] op $Address (delayed branch) | | | | | | | | PT | T | H | Op | | | 0 0 0 0 | | | 0 0 0 0 | | | 0 0 $A(up) | | | |
| 1164 | Special (other instruction) | | | | | | | | | T | H | | Op | | | | | | other operand area | | | | | | |
| 1165 | Rn=MEM or MEM=Rn | | | | | | | | | T | | | MEM | | | | | | Rn | | | An | | | Op |
| 1166 | push Rn or pop Rn (stacking operation) | | | | | | | | | | PT | T | H | Op | | | | | | Rn | | | 0 0 0 0 | | |
| 1167 | repeat M rc=Rm (program control) | | | | | | | | | | PT | T | H | Rm | | | | | | M | | | | | |
| 1168 | [if cc] op Rm (standard branch) | | | | | | | | | | | PT | T | | Op | | | | | Rm | | | CC | | | |
| 1169 | [if cc] op Rm (delayed branch) | | | | | | | | | | | | PT | T | | Op | | | | | Rm | | | CC | | | |
| 1170 | no operation | | | | | | | | | | | | | all 0's | | | | | | | | | | | | |

Figure 8(d)

1132 (RISC Class Instructions)

| | Instruction Type | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 1146 | DST1=SRCX1 op SRCY1  DST2=SRCX2 * SRCY2 | 0 | 1 | SRCX1 | | | SRCY1 | | | DST1 | | | SRCX2 | | | SRCY2 | | | DST2 | | | CC | | | Op |
| 1147 | MEMA load/store between Raa  Rbb=MEMB | 0 | 0 | 1 | 0 | 0 | MEMB | | | Aq | | | MEMA | | | Raa | | | Rbb | | | Ap | | | Op |
| 1148 | Ra=Rb (data move between registers) | 0 | 0 | 1 | 0 | 1 | | | Ra | | | | | | | | | Rb | | | | 0 | 0 | 0 | 0 |
| 1149 | [if cc] DST=DST op $DATA or [if cc] DST=$DATA op DST | 0 | 0 | 1 | 1 | 0 | | Op | | | $DATA(upper) | | | | | | | | | DST | | | CC | | |
| 1150 | [if cc] Rn=$DATA | 0 | 0 | 1 | 1 | 1 | 0 | Op | | | $DATA(upper) | | | | | | | | | Rn | | | CC | | |
| 1151 | [if cc] DST=SRC1opSRC2 | 0 | 0 | 0 | 1 | 1 | 1 | | Op | | | SRC1 | | | SRC2 | | | DST | | | CC | | | |
| 1152 | [if cc] op (short)$Address or [if cc] op $Disp (stand branch) | 0 | 0 | 0 | 0 | 1 | 0 | | Op | | | $Address or $Disp | | | | | | | | | | | CC | | |
| 1153 | [if cc] op (short)$Address or [if cc] op $Disp (delay branch) | 0 | 0 | 0 | 1 | 1 | 0 | | Op | | | $Address or $Disp | | | | | | | | | | | CC | | |
| 1154 | repeat M rc=N (program control) | 0 | 0 | 0 | 0 | 1 | 1 | | | | | N | | | | | | M | | | | | | | |
| 1155 | Rn=*(short)$Address or *$(short)Address=Rn | 0 | 0 | 0 | 0 | 0 | 1 | Op | | | $Address | | | | | | | | | Rn | | | $Address | | |
| 1156 | [Rn=*]An++$Disp or *An++$Disp=Rn | 0 | 0 | 0 | 0 | 1 | 0 | 1 | | | $Disp | | | | | | | | | Rn | | | An | | | Op |
| 1157 | [if cc] DST=DST op $Data | 0 | 0 | 0 | 0 | 0 | 0 | 1 | 0 | Op | | | $Data | | | | | | | DST | | | CC | | |
| 1158 | second word of two word instruction | 0 | 0 | 0 | 0 | 0 | 0 | 1 | 1 | | | | $Address(lower) or $Data(lower) | | | | | | | | | | | | |
| 1159 | [if cc] DST= op SRC or [if cc] DST op SRC | 0 | 0 | 0 | 0 | 0 | 0 | 0 | 1 | Op | | | | Op | | | SRC | | | DST | | | CC | | |
| 1160 | Rn=*$Address or *$Address=Rn | 0 | 0 | 0 | 0 | 0 | 0 | 0 | 1 | 1 | 0 | | | Op | | | | | | Rn | | | 0 | 0 | $A(up) |
| 1161 | [if cc] DST= op (DST, $Data) | 0 | 0 | 0 | 0 | 0 | 0 | 0 | 0 | 1 | 1 | 0 | Op | | | $Data | | | | DST | | | CC | | |
| 1162 | [if cc] op $Address (standard branch) | 0 | 0 | 0 | 0 | 0 | 0 | 0 | 0 | 0 | 1 | 0 | Op | | | 0 | 0 | 0 | 0 | 0 | 0 | $A(up) | | |
| 1163 | [if cc] op $Address (delayed branch) | 0 | 0 | 0 | 0 | 0 | 0 | 0 | 0 | 1 | 1 | 0 | Op | | | 0 | 0 | 0 | 0 | 0 | 0 | $A(up) | | |
| 1164 | Special (other instruction) | 0 | 0 | 0 | 0 | 0 | 0 | 0 | 0 | 0 | 0 | 1 | Op | | | | | | | other operand area | | | | | |
| 1165 | Rn=MEM or MEM=Rn | 0 | 0 | 0 | 0 | 0 | 0 | 0 | 0 | 0 | 0 | 1 | MEM | | | | | | Rn | | | An | | | Op |
| 1166 | push Rn or pop Rn (stacking operation) | 0 | 0 | 0 | 0 | 0 | 0 | 0 | 0 | 0 | 0 | 0 | 1 | Op | | | | | | Rn | | | 0 | 0 | 0 |
| 1167 | repeat M rc=Rm (program control) | 0 | 0 | 0 | 0 | 0 | 0 | 0 | 0 | 0 | 0 | 0 | 1 | 1 | Rm | | | | | | M | | | | |
| 1168 | [if cc] op Rm (standard branch) | 0 | 0 | 0 | 0 | 0 | 0 | 0 | 0 | 0 | 0 | 0 | 0 | 1 | Op | | | Rm | | | | CC | | | |
| 1169 | [if cc] op Rm (delayed branch) | 0 | 0 | 0 | 0 | 0 | 0 | 0 | 0 | 0 | 0 | 0 | 0 | 1 | Op | | | Rm | | | | CC | | | |
| 1170 | no operation | 0 | 0 | 0 | 0 | 0 | 0 | 0 | 0 | 0 | 0 | 0 | 0 | 0 | all 0's | | | | | | | | | | |

Figure 8(f)

| Bit | Field | Values | Bit | Field | Values |
|---|---|---|---|---|---|
| 0 | MEM load | 0:Rq=*Am 1:Rq=*Am++ 2:Rq=*Am-- 3:Rq=*Am++io | | MEM store | 0:*Am=Rp 1:*Am++=Rp 2:*Am--=Rp 3:*Am++io=Rp |
| 1 | | | | | |
| 2 | Am | 0:xa0 1:xa1 2:ya1 3:ya2 | | | |
| 3 | | | | | |
| 4 | Rq | | | Rp | 0:a0h 1:a1h |
| 5 | DST | 0:a0 1:a1 | | | |
| 6 | SRC | 0:a0 1:a1 2:mo 3:m1 4:xd0 5:xd1 6:yd0 7:yd1 | | | |
| 7 | | | | | |
| 8 | | | | | |

Type 1144: two operand register-register instruction with one load

| Instructions | 23 | 22 | 21 | 20 | 19 | 18 | 17 | 16 | 15 | 14 | 13: Rq 0:xd0l 1:xd1l 2:yd0l 3:yd1l | 12 | 11 | 10 | 9 |
|---|---|---|---|---|---|---|---|---|---|---|---|---|---|---|---|
| DST=test(SRC) (#7) | 1 | 1 | 1 | 1 | 1 | 1 | 1 | 1 | 1 | 0 | | 0 | 0 | 0 | 0 |
| DST=clear | 1 | 1 | 1 | 1 | 1 | 1 | 1 | 1 | 1 | 0 | | 0 | 0 | 0 | 1 |
| DST=SRC | 1 | 1 | 1 | 1 | 1 | 1 | 1 | 1 | 1 | 0 | | 0 | 0 | 1 | 0 |
| DST=abs(SRC) | 1 | 1 | 1 | 1 | 1 | 1 | 1 | 1 | 1 | 0 | | 0 | 0 | 1 | 1 |
| DST=round(SRC) | 1 | 1 | 1 | 1 | 1 | 1 | 1 | 1 | 1 | 0 | | 0 | 1 | 0 | 0 |
| DST=SRC | 1 | 1 | 1 | 1 | 1 | 1 | 1 | 1 | 1 | 0 | | 0 | 1 | 0 | 1 |
| DST.i=test(SRC.i) (#7) | 1 | 1 | 1 | 1 | 1 | 1 | 1 | 1 | 1 | 0 | | 0 | 1 | 1 | 0 |
| DST.i=clear | 1 | 1 | 1 | 1 | 1 | 1 | 1 | 1 | 1 | 0 | | 0 | 1 | 1 | 1 |
| DST.i=SRC.i | 1 | 1 | 1 | 1 | 1 | 1 | 1 | 1 | 1 | 0 | | 1 | 0 | 0 | 0 |
| DST.i=abs(SRC.i) (#6) | 1 | 1 | 1 | 1 | 1 | 1 | 1 | 1 | 1 | 0 | | 1 | 0 | 0 | 1 |
| DST.i=round(SRC.i) | 1 | 1 | 1 | 1 | 1 | 1 | 1 | 1 | 1 | 0 | | 1 | 0 | 1 | 0 |
| DST.i=SRC.i | 1 | 1 | 1 | 1 | 1 | 1 | 1 | 1 | 1 | 0 | | 1 | 0 | 1 | 1 |

Type 1145: two operand register-register instruction with one store

| Instructions | 23..14 | 13: Rq | 12 | 11 | 10 | 9 |
|---|---|---|---|---|---|---|
| same as above | 1...1 | 0 | 0 | 0 | 0 | 0 |
| | | | 0 | 0 | 0 | 1 |
| | | | 0 | 0 | 1 | 0 |
| | | | 0 | 0 | 1 | 1 |
| | | | 0 | 1 | 0 | 0 |
| | | | 0 | 1 | 0 | 1 |
| | | | 0 | 1 | 1 | 0 |
| | | | 0 | 1 | 1 | 1 |
| | | | 1 | 0 | 0 | 0 |
| | | | 1 | 0 | 0 | 1 |
| | | | 1 | 0 | 1 | 0 |
| | | | 1 | 0 | 1 | 1 |

(#6) "i" means integer arithmetic operation
(#7) in case of clear instruction, SRC is ignored

Figure 9(a)

| | Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|
| | | | | | | | | | | SRCX1 | | | SRCY1 | | | D1 | SRCX2 | | SRCY2 | | D2 | Rq | Am | | MEM | |
| | | | | | | | | Rq | | 0:a0  1:a1 | | | 0:a0  1:a1 | | | 0:a0 | 0:a0 | | 0:a0 | | 0:m0  1:m1 | | | | load | |
| | | | | | | | | | | 2:mo  3:m1 | | | 2:mo  3:m1 | | | 1:a1 | 1:a1 | | 1:a1 | | | | | | | |
| | | | | | | | | | | 4:xd0 5:xd1 | | | 4:xd0 5:xd1 | | | | 2:xd0 | | 2:yd0 | | | | | | | |
| | | | | | | | | | | 6:yd0 7:yd1 | | | 6:yd0 7:yd1 | | | | 3:xd1 | | 3:yd1 | | | | | | | |
| 1138 | six op. RR instruction with one load | D1=SRCX1 + SRCY1  D2.u=SRCX2.s * SRCY2.s | 1 | 1 | 1 | 0 | 1 | Rq | 0 | | | | | | | | | | | | | | | | | | |
| | | D1=SRCX1 - SRCY1  D2.u=SRCX2.s * SRCY2.s | | | | | | | | | | | | | | | | | | | | | | | | | | |
| 1139 | six op. RR instruction with one store | (#3) same as above | 1 | 1 | 1 | 1 | 0 | 1 | 1 | | | | | | | | | | | | | | | | | MEM store | |
| | | | | | | | | | 0 | | | | | | | | | | | | | | | | | |
| 1142 | three operand register-register instruction with one load | DST=SRC1 + SRC2 | 1 | 1 | 1 | 1 | 1 | 1 | 1 | 0 | 0 | 0 | 0 | 0 | SRC1 | | SRC2 | | DST 0:a0 1:a1 (ALU) 0:mo 1:m1 (MLT) | | Rq | | | MEM load | |
| | | DST=SRC1 - SRC2 | | | | | | | | | 0 | 0 | 0 | 1 | 0:a0 | | 0:a0 | | | | | | | | | |
| | | DST.U=SRC1.s * SRC2.s  (#3) | | | | | | | | | 0 | 0 | 1 | 0 | 1:a1 | | 1:a1 | | | | | | | | | |
| | | DST.l=SRC1.s * SRC2.s | | | | | | | | | 0 | 0 | 1 | 1 | 2:mo | | 2:mo | | | | | | | | | |
| | | DST.r=(SRC1 + SRC2).shb | | | | | | | | Rq | 0 | 1 | 0 | 0 | 3:m1 | | 3:m1 | | | | | | | | | |
| | | DST.r=(SRC1 - SRC2).shb | | | | | | | | | 0 | 1 | 0 | 1 | 4:xd0 | | 4:xd0 | | | | | | | | | |
| | | DST.r=SRC1 + SRC2.sha  (#1) | | | | | | | | | 0 | 1 | 1 | 0 | 5:xd1 | | 5:xd1 | | | | | | | | | |
| | | DST.r=SRC1 - SRC2.sha | | | | | | | | | 0 | 1 | 1 | 1 | 6:yd0 | | 6:yd0 | | | | | | | | | |
| | | | | | | | | | | | | | | | 7:yd1 | | 7:yd1 | | | | | | | | | |
| 1143 | three operand register-register instruction with one store | same as above | 1 | 1 | 1 | 1 | 1 | 1 | 1 | 0 | 0 | 0 | 0 | 0 | | | | | | | Rp | | | MEM store | |
| | | | | | | | | | | | 0 | 0 | 0 | 1 | | | | | | | | | | | |
| | | | | | | | | | | | 0 | 0 | 1 | 0 | | | | | | | | | | | |
| | | | | | | | | | | | 0 | 0 | 1 | 1 | | | | | | | | | | | |
| | | | | | | | | | | | 0 | 1 | 0 | 0 | | | | | | | | | | | |
| | | | | | | | | | | | 0 | 1 | 0 | 1 | | | | | | | | | | | |
| | | | | | | | | | | | 0 | 1 | 1 | 0 | | | | | | | | | | | |
| | | | | | | | | | | | 0 | 1 | 1 | 1 | | | | | | | | | | | |

(#1) "r" means rounded result, "sha" means shift amount value is given by sha register, "shb" means shift amount value is given by shb register
(#3) "s" means signed data, "us" means unsigned data, "u" means upper part of mult. result, "l" means lower part of mult. result

Figure 9(b)

| Bit | Left column | | Right column | |
|---|---|---|---|---|
| 0 | MEMA load/store | 0:Rl,s,*Aa 1:Rl,s,*Aa++ 2:Rl,s,*Aa-- 3:Rl,s,*Aa++io | MEMA load | 0:Ra=*Aa 1:Ra=*Aa++ 2:Ra=*Aa-- 3:Ra=*Aa++io |
| 1 | | | | |
| 2 | Aa | 0:xa0 1:xa1 | | |
| 3 | MEMB load/store | 0:Rl,s,*Ab 1:Rl,s,*Ab++ 2:Rl,s,*Ab-- 3:Rl,s,*Ab++io | MEMB load | 0:Rb=*Aa 1:Rb=*Aa++ 2:Rb=*Aa-- 3:Rb=*Aa++io |
| 4 | | | | |
| 5 | Ab | 0:ya0 1:ya1 | | |
| 6 | Rs | 0:a0h 1:a1h | Ra | 0:xd0h 1:xd1h |
| 7 | Rl | 0:xd0h 1:xd1h or 0:yd0h 1:yd1h | Rb | 0:yd0h 1:yd1h |
| 8 | DST | | | |
| 9 | SRC | | | |
| 10 | | | | |
| 11 | | | | |
| 12 | 0 1 0 1 0 1 0 1 0 1 0 1 0 1 0 1 | | 0 1 0 1 0 1 0 1 0 1 0 1 0 1 0 1 | |
| 13 | 0 0 1 1 0 0 1 1 0 0 1 1 0 0 1 1 | | 0 0 1 1 0 0 1 1 0 0 1 1 0 0 1 1 | |
| 14 | 0 0 0 0 1 1 1 1 0 0 0 0 1 1 1 1 | | 0 0 0 0 1 1 1 1 0 0 0 0 1 1 1 1 | |
| 15 | 0 0 0 0 0 0 0 0 1 1 1 1 1 1 1 1 | | 0 0 0 0 0 0 0 0 1 1 1 1 1 1 1 1 | |
| 16 | St | 0:Xst 1:Yst | 0 | |
| 17 | 0 | | 0 | |
| 18 | 0 | | 1 | |
| 19 | 1 | | 1 | |
| 20 | 1 | | 1 | |
| 21 | 1 | | 1 | |
| 22 | 1 | | 1 | |
| 23 | 1 | | 1 | |

| Type | Instructions |
|---|---|
| two operand register-register instruction with one load and one store (1140) | DST:=test(SRC) (#7)<br>DST:=clear<br>DST:=SRC<br>DST:=abs(SRC)<br>DST:=round(SRC)<br>DST:=−SRC<br>DST.i:=test(SRC.i) (#7)<br>DST.i:=clear<br>DST.i:=SRC.i<br>DST.i:=abs(SRC.i) (#6)<br>DST.i:=inc(SRC.i)<br>DST.i:=dec(SRC.i) |
| two operand register-register instruction with two loads (1141) | same as above |

| | Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|
| 1134 | six op. RR instr. with one load one store | D1=SRCX1 + SRCY1<br>D2.u=SRCX2.s * SRCY2.s<br>D1=SRCX1 - SRCY1<br>D2.u=SRCX2.s * SRCY2.s | 1 | 0 | St | 0 | SRCX1 | | | SRCY1 | | | SRCX2 | | SRCY2 | D2 | D1 | RI | Rs | Ab | MEMB load/store | | Aa | MEMA load/store | | |
| 1135 | six op. RR instruction with two loads | (#3)<br>same as above | 1 | 1 | 0 | 0 | | | | | | | | | | | | | Rb | Ra | | MEMB load | | | MEMA load | | |
| 1136 | three operand register-register instruction with one load | DST=SRC1 + SRC2<br>DST=SRC1 - SRC2<br>DST.u=SRC1.s * SRC2.s  (#3)<br>DST.l=SRC1.s * SRC2.s   (#3)<br>DST.r=(SRC1 + SRC2).shb<br>DST.r=(SRC1 - SRC2).shb<br>DST.r=SRC1 + SRC2.sha<br>DST.r=SRC1 - SRC2.sha   (#1) | 1 | 1 | 1 | 0 | St | 0 | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 | SRC1 | | | SRC2 | | DST | RI | Rs | Ab | MEMB load/store | | | MEMA load/store | | |
| 1137 | three operand register-register instruction with one store | same as above | 1 | 1 | 1 | 1 | 0 | 0 | 0<br>0<br>0<br>0<br>1<br>1<br>1<br>1 | 0<br>0<br>1<br>1<br>0<br>0<br>1<br>1 | 0<br>1<br>0<br>1<br>0<br>1<br>0<br>1 | | | | | | | Rb | Ra | | MEMB load | | | MEMA load | | |

Figure 9(e)

| Type | Instructions | 23 | 22 | 21 | 20 | 19 | 18 | 17 | 16 | 15 | 14 | 13 | 12 | 11 | 10 | 9 8 7 | 6 5 4 | 3 2 1 0 |
|---|---|---|---|---|---|---|---|---|---|---|---|---|---|---|---|---|---|---|
| two operand register-regsiter instruction with condition code | | 0 | 0 | 0 | 0 | 0 | 0 | 0 | 1 | 0 | | | | | | SRC | DST | CC |
| | [if cc] DST=test(SRC) | | | | | | | | | | 0 | 0 | 0 | 0 | 0 | | | |
| | [if cc] DST=clear (#7) | | | | | | | | | | 0 | 0 | 0 | 0 | 1 | | | |
| | [if cc] DST=SRC | | | | | | | | | | 0 | 0 | 0 | 1 | 0 | | | |
| | [if cc] DST=abs(SRC) | | | | | | | | | | 0 | 0 | 0 | 1 | 1 | | | |
| | [if cc] DST=round(SRC) | | | | | | | | | | 0 | 0 | 1 | 0 | 0 | | | |
| | [if cc] DST=~SRC | | | | | | | | | | 0 | 0 | 1 | 0 | 1 | | | |
| | [if cc] DST.i=test(SRC.i) (#7) | | | | | | | | | | 0 | 1 | 0 | 0 | 0 | | | |
| | [if cc] DST.i=clear | | | | | | | | | | 0 | 1 | 0 | 0 | 1 | | | |
| | [if cc] DST.i=SRC.i | | | | | | | | | | 0 | 1 | 0 | 1 | 0 | | | |
| | [if cc] DST.i=abs(SRC.i) (#6) | | | | | | | | | | 0 | 1 | 0 | 1 | 1 | | | |
| | [if cc] DST.i=inc(SRC.i) | | | | | | | | | | 1 | 0 | 0 | 0 | 0 | | | |
| | [if cc] DST.i=dec(SRC.i) | | | | | | | | | | 1 | 0 | 0 | 0 | 1 | | | |
| | [if cc] DST.i=bpen(SRC) | | | | | | | | | | 1 | 0 | 0 | 1 | 0 | | | |
| | [if cc] DST.i=dmsb(SRC) | | | | | | | | | | 1 | 0 | 0 | 1 | 1 | | | |

DST:
0:a0
1:a1
2:mo
3:m1
4:xd0
5:xd1
6:yd0
7:yd1

CC:
0:uncond. & CC=enable
1:CCD
2:if CC
3:if CS
4:if P
5:if N
6:if NZ
7:if Z
8:if GE
9:if LT
A:if GT
B:if LE
C:if UGT
D:if ULT
E:if V
F:if UO

1159

| Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| two operand register-register instruction with condition code (1151) | [if cc] DST=SRC1 + SRC2 | 0 | 0 | 1 | 1 | 1 | 0 | 0 | 0 | 0 | 0 | 0 | SRC1 | | | SRC2 | | | DST | | | CC | | | |
| | [if cc] DST=SRC1 - SRC2 | | | | | | 0 | 0 | 0 | 0 | 0 | 1 | | | | | | | | | | | | | |
| | [if cc] DST.u=SRC1.s * SRC2.s | (#1) | | | | | 0 | 0 | 0 | 0 | 1 | 0 | | | | | | | | | | | | | |
| | [if cc] DST.l=SRC1.s * SRC2.s | | | | | | 0 | 0 | 0 | 0 | 1 | 1 | | | | | | | | | | | | | |
| | [if cc] DST.r=(SRC1 + SRC2).shb | | | | | | 0 | 0 | 0 | 1 | 0 | 0 | | | | | | | | | | | | | |
| | [if cc] DST.r=(SRC1 - SRC2).shb | | | | | | 0 | 0 | 0 | 1 | 0 | 1 | | | | | | | | | | | | | |
| | [if cc] DST=SRC1 + SRC2.sha | | | | | | 0 | 0 | 0 | 1 | 1 | 0 | | | | | | | | | | | | | |
| | [if cc] DST=SRC1 - SRC2.sha | | | | | | 0 | 0 | 0 | 1 | 1 | 1 | | | | | | | | | | | | | |
| | [if cc] DST.i=SRC1.i + SRC2.i | | | | | | 0 | 0 | 1 | 0 | 0 | 0 | | | | | | | | | | | | | |
| | [if cc] DST.i=SRC1.i - SRC2.i | (#6) | | | | | 0 | 0 | 1 | 0 | 0 | 1 | | | | | | | | | | | | | |
| | [if cc] DST.u=SRC1.i * SRC2.i | | | | | | 0 | 0 | 1 | 0 | 1 | 0 | | | | | | | | | | | | | |
| | [if cc] DST.l=SRC1.i * SRC2.i (#6) | | | | | | 0 | 0 | 1 | 0 | 1 | 1 | | | | | | | | | | | | | |
| | [if cc] DST.r=(SRC1 + SRC2).sha | | | | | | 0 | 0 | 1 | 1 | 0 | 0 | | | | | | | | | | | | | |
| | [if cc] DST.r=(SRC1 - SRC2).sha | | | | | | 0 | 0 | 1 | 1 | 0 | 1 | | | | | | | | | | | | | |
| | [if cc] DST=SRC1 + SRC2.shb | | | | | | 0 | 0 | 1 | 1 | 1 | 0 | | | | | | | | | | | | | |
| | [if cc] DST=SRC1 - SRC2.shb | | | | | | 0 | 0 | 1 | 1 | 1 | 1 | | | | | | | | | | | | | |
| | [if cc] DST=SRC1 + SRC2 + carry | | | | | | 0 | 1 | 0 | 0 | 0 | 0 | | | | | | | | | | | | | |
| | [if cc] DST=SRC1 - SRC2 - carry | (#3) | | | | | 0 | 1 | 0 | 0 | 0 | 1 | | | | | | | | | | | | | |
| | [if cc] DST.u=SRC1.us * SRC2.s | | | | | | 0 | 1 | 0 | 0 | 1 | 0 | | | | | | | | | | | | | |
| | [if cc] DST.l=SRC1.us * SRC2.s | | | | | | 0 | 1 | 0 | 0 | 1 | 1 | | | | | | | | | | | | | |
| | [if cc] DST.u=SRC1.us * SRC2.us | | | | | | 0 | 1 | 0 | 1 | 0 | 0 | | | | | | | | | | | | | |
| | [if cc] DST.l=SRC1.us * SRC2.us | | | | | | 0 | 1 | 0 | 1 | 0 | 1 | | | | | | | | | | | | | |
| | SCR1 - SRC2 | | | | | | 0 | 1 | 0 | 1 | 1 | 0 | | | | | | | 0 | 0 | 0 | 0 | 0 | 0 | 0 |
| | SCR1.i - SRC2.i | | | | | | 0 | 1 | 0 | 1 | 1 | 1 | | | | | | | | | | | | | |
| | [if cc] DST=SRC1 <<l SRC2.i | (#2) | | | | | 0 | 1 | 1 | 0 | 0 | 0 | | | | | | | | | | | | | |
| | [if cc] DST=SRC1 <<a SRC2.i | | | | | | 0 | 1 | 1 | 0 | 0 | 1 | | | | | | | | | | | | | |
| | [if cc] DST=SRC1 <<r SRC2.i | | | | | | 0 | 1 | 1 | 0 | 1 | 0 | | | | | | | | | | | | | |
| | [if cc] DST=SRC1 <<rc SRC2.i | | | | | | 0 | 1 | 1 | 0 | 1 | 1 | | | | | | | | | | | | | |
| | [if cc] DST=SRC1 & SRC2 | | | | | | 0 | 1 | 1 | 1 | 0 | 0 | | | | | | | | | | | | | |
| | [if cc] DST=SRC1 | SRC2 | | | | | | 0 | 1 | 1 | 1 | 0 | 1 | | | | | | | | | | | | | |
| | [if cc] DST=SRC1 ^ SRC2 | | | | | | 0 | 1 | 1 | 1 | 1 | 0 | | | | | | | | | | | | | |

(#2) if SRC2 is positive, it means left shift; if SRC2 is negative, it means right shift.

Figure 9(f)

| | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | Type | Instructions |
|---|---|---|---|---|---|---|---|---|---|---|---|---|---|---|---|---|---|---|---|---|---|---|---|---|---|---|
| 1151 | 0 | 0 | 1 | 1 | 1 | 1 | 0 | 0 | 0 | 0 | 0 | SRC1 | | | SRC2 | | | DST | | | CC | | | | two operand register-register instruction with condition code | [if cc] DST=bit_clear(SRC1,SRC2.i) |
| | | | | | | 1 | 0 | 0 | 0 | 0 | 1 | | | | | | | | | | | | | | | [if cc] DST=bit_set(SRC1,SRC2.i) |
| | | | | | | 1 | 0 | 0 | 0 | 1 | 0 | | | | | | | | | | | | | | | [if cc] DST=bit_comp(SRC1,SRC2.i) |
| | | | | | | 1 | 0 | 0 | 0 | 1 | 1 | | | | | | | 0 | 0 | 0 | 0 | 0 | 0 | 0 | | bit_test(SRC1,SRC2.i) |
| | | | | | | 1 | 0 | 0 | 1 | 0 | 0 | | | | | | | 0 | 0 | 0 | 0 | 0 | 0 | 0 | | SRC1 & SRC2 |
| | | | | | | 1 | 0 | 0 | 1 | 0 | 1 | | | | | | | 0 | 0 | 0 | 0 | 0 | 0 | 0 | | SRC1 ∧ SRC2 |
| | | | | | 0 | 1 | 1 | 1 | 0 | 1 | 1 | | | | | | | | | | | | | | (cont't) | div_c(SRC1,SRC2,DST) |
| | | | | | 0 | 1 | 1 | 1 | 1 | 0 | 0 | | | | | | | | | | | | | | | div_b(SRC1,SRC2,DST) |
| | | | | | 0 | 1 | 1 | 1 | 1 | 0 | 1 | | | | | | | | | | | 0 | 0 | 1 | | div_a(SRC1,SRC2,DST) |
| 1149 | 0 | 0 | 1 | 0 | 1 | 0 | 0 | 0 | 0 | 0 | 0 | most significant byte of (long)$DATA (#4) | | | | | | DST | | | CC | | | | two operand register-immediate instruction with condition code | [if cc] DST=DST + $DATA |
| | | | | | | 0 | 0 | 0 | 0 | 0 | 1 | | | | | | | | | | | | | | | [if cc] DST=DST - $DATA |
| | | | | | | 0 | 0 | 0 | 0 | 1 | 0 | | | | | | | | | | | | | | | DST=$DATA - DST |
| | | | | | | 0 | 0 | 0 | 0 | 1 | 1 | | | | | | | | | | | | | | | DST - $DATA |
| | | | | | | 0 | 0 | 0 | 1 | 0 | 0 | | | | | | | | | | | | | | | [if cc] DST=DST + $DATA + carry |
| | | | | | | 0 | 0 | 0 | 1 | 0 | 1 | | | | | | | | | | | | | | | [if cc] DST=DST + $DATA - carry |
| | | | | | | 0 | 0 | 0 | 1 | 1 | 0 | | | | | | | | | | | | | | | [if cc] DST=$DATA - DST - carry |
| | | | | | | 0 | 0 | 1 | 0 | 0 | 0 | | | | | | | | | | | | | | | [if cc] DST.i=DST.i + $DATA |
| | | | | | | 0 | 0 | 1 | 0 | 0 | 1 | | | | | | | | | | | | | | | [if cc] DST.i=DST.i - $DATA (#6) |
| | | | | | | 0 | 0 | 1 | 0 | 1 | 0 | | | | | | | | | | | | | | | [if cc] DST.i=$DATA - DST.i |
| | | | | | | 0 | 0 | 1 | 0 | 1 | 1 | | | | | | | | | | | | | | | DST.i - $DATA |
| | | | | | | 0 | 0 | 1 | 1 | 0 | 0 | | | | | | | | | | | | | | | [if cc] DST=DST & $DATA |
| | | | | | | 0 | 0 | 1 | 1 | 0 | 1 | | | | | | | | | | | | | | | [if cc] DST=DST | $DATA |
| | | | | | | 0 | 0 | 1 | 1 | 1 | 0 | | | | | | | | | | | | | | | [if cc] DST=DST ∧ $DATA |
| 1150 | 0 | 0 | 1 | 1 | 0 | 0 | | | | | | most significant byte of (long)$DATA | | | Rn (64 kinds of registers) | | | | | | CC | | | | long DATA | [if cc] Rn=$DATA (#9) |

(#4) least significant 2 bytes are specified in the second data word
(#9) when the ccr is specified as a destination with [if cc], all contents in ccr are updated

| Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 1157 direct shift instruction with CC | [if cc] DST=DST <<l $Data | 0 | 0 | 0 | 0 | 0 | 0 | 0 | 1 | 0 | 0 | -24<=$Data<=+24 | | | | | | | DST | | | CC | | | 0 |
| | [if cc] DST=DST <<a $Data  (#2) | 0 | 0 | 0 | 0 | 0 | 0 | 0 | 1 | 0 | 1 | -8<=$Data<=+48 | | | | | | | DST | | | CC | | | 0 |
| | [if cc] DST=DST <<r $Data | 0 | 0 | 0 | 0 | 0 | 0 | 0 | 1 | 1 | 0 | -1<=$Data<=+1 | | | | | | | DST | | | CC | | | 0 |
| | [if cc] DST=DST <<rc $Data | 0 | 0 | 0 | 0 | 0 | 0 | 0 | 1 | 1 | 1 | | | | | | | | DST | | | CC | | | 0 |
| 1161 direct bit manip. instruction with CC | [if cc] DST=bit_clear(DST,$Data) | 0 | 0 | 0 | 0 | 0 | 0 | 1 | 0 | 0 | 0 | 0 | 0 | $Data | | | | | DST | | | CC | | | 0 |
| | [if cc] DST=bit_set(DST,$Data) | 0 | 0 | 0 | 0 | 0 | 0 | 1 | 0 | 0 | 0 | 0 | 1 | $Data | | | | | DST | | | CC | | | 0 |
| | [if cc] DST=bit_comp(DST,$Data) | 0 | 0 | 0 | 0 | 0 | 0 | 1 | 0 | 0 | 0 | 1 | 0 | $Data | | | | | DST | | | CC | | | 0 |
| | [if cc] DST=bit_test(DST,$Data) | 0 | 0 | 0 | 0 | 0 | 0 | 1 | 0 | 0 | 0 | 1 | 1 | $Data | | | | | DST | | | CC | | | 0 |
| 1146 six operand register-register instruction | D1=SX1+SY1<br>D2.u=SX2.s * SY2.s | 0 | 1 | SRCX1 | | | SRCY1 | | | DST1<br>0:a0<br>1:a1<br>2:mo<br>3:m1<br>4:xd0<br>5:xd1<br>6:yd0<br>7:yd1 | | | SRCX2<br>0:a0<br>1:a1<br>2:mo<br>3:m1<br>4:xd0<br>5:xd1<br>6:yd0<br>7:yd1 | | | SRCY2<br>0:a0<br>1:a1<br>2:mo<br>3:m1<br>4:xd0<br>5:xd1<br>6:yd0<br>7:yd1 | | | DST2<br>0:a0<br>1:a1<br>2:mo<br>3:m1<br>4:xd0<br>5:xd1<br>6:yd0<br>7:yd1 | | | 0 | 0 | 0 | 0 |
| | D1=SX1 - SY1<br>D2.u=SX2.s * SY2.s | | | | | | | | | | | | | | | | | | | | | 0 | 0 | 0 | 1 |
| | D1=SX1 + SY1<br>D2.u=SX2.us * SY2.s | | | | | | | | | | | | | | | | | | | | | 0 | 0 | 1 | 0 |
| | D1=SX1 - SY1<br>D2.u=SX2.us * SY2.s | | | | | | | | | | | | | | | | | | | | | 0 | 0 | 1 | 1 |
| | D1=SX1 + SY1<br>D2.u=SX2.us * SY2.us | | | | | | | | | | | | | | | | | | | | | 0 | 1 | 0 | 0 |
| | D1=SX1 - SY1<br>D2.u=SX2.us * SY2.us | | | | | | | | | | | | | | | | | | | | | 0 | 1 | 0 | 1 |
| | D1=SX1 - SX2<br>D2.u=SX2.us * SY2.us  (#3) | | | | | | | | | | | | | | | | | | | | | 0 | 1 | 1 | 0 |
| | D1=SX1 + SY1 + carry<br>D2.u=SX2.s * SY2.s | | | | | | | | | | | | | | | | | | | | | 0 | 1 | 1 | 1 |
| | D1=SX1 - SY1 - carry<br>D2.u=SX2.s * SY2.s | | | | | | | | | | | | | | | | | | | | | 0 | 1 | 1 | 1 |

| Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| six operand register-register instruction | D1=SX1+SY1 | 0 | 1 | SRCX1 | | | SRCY1 | | | DST1 | | | SRCX2 | | | SRCY2 | | | DST2 | | | 1 | 0 | 0 | 0 |
| | D2.u=SX2.s * SY2.s | | | | | | | | | | | | | | | | | | | | | 1 | 0 | 0 | 1 |
| | D1=SX1 - SY1 | | | | | | | | | | | | | | | | | | | | | 1 | 0 | 1 | 0 |
| | D2.u=SX2.s * SY2.s | | | | | | | | | | | | | | | | | | | | | 1 | 0 | 1 | 1 |
| | D1=SX1 + SY1 | | | | | | | | | | | | | | | | | | | | | 1 | 1 | 0 | 0 |
| | D2.u=SX2.us * SY2.us | | | | | | | | | | | | | | | | | | | | | 1 | 1 | 0 | 1 |
| (con't) | D1=SX1 - SY1 | | | | | | | | | | | | | | | | | | | | | 1 | 1 | 1 | 0 |
| | D2.u=SX2.us * SY2.us | | | | | | | | | | | | | | | | | | | | | 1 | 1 | 1 | 1 |
| | D1=SX1 - SX2 | | | | | | | | | | | | | | | | | | | | | | | | |
| | D2.u=SX2.us * SY2.us (#3) | | | | | | | | | | | | | | | | | | | | | | | | |
| | D1=SX1 + SY1 + carry | | | | | | | | | | | | | | | | | | | | | | | | |
| | D2.u=SX2.s * SY2.s | | | | | | | | | | | | | | | | | | | | | | | | |
| | D1=SX1 - SY1 - carry | | | | | | | | | | | | | | | | | | | | | | | | |
| | D2.u=SX2.s * SY2.s | | | | | | | | | | | | | | | | | | | | | | | | |
| double ld/st | Raa=MEMA  Rbb=MEMB (#10) | 0 | 0 | 1 | 0 | 0 | MEMB load | | | Aq (=An) | | | MEMA load | | | Raa a0h~1h xd0h~1h | | | Rbb m0h~1h yd0h~1h | | | Ap (=An) | | | 0 |
| | MEMA=RAA  Rbb=MEMB | | | | | | | | | | | | MEMA store | | | | | | | | | | | | 1 |
| single ld/st | Rn=MEM (#10) | 0 | 0 | 0 | 0 | 0 | 0 | 0 | 0 | 0 | 0 | 0 | MEM load | | | Rn | | | | | | An | | | 0 |
| | MEM=Rn | | | | | | | | | | | | MEM store | | | 64 kinds of regsiters | | | | | | | | | 1 |
| | [Rn=*]An++Disp (#11) | 0 | 0 | 0 | 0 | 1 | $Disp | | | | | | | | | | | | | | | | | | 0 |
| | *An++Disp=Rn | | | | | | | | | | | | | | | | | | | | | | | | 1 |

(#10) "An++i0,1" instructions are released in "MEM=Rn" and "MEMA=Raa, MEMB=Rbb"
(#11) in case of omitting [Rn=*] part, data load operation is not executed; just address regsister update operation only and dummy regsister code is used not to update any destinations.

Figure 9(i)

| Type | | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|
| single ld/st | | Rn=*$Address | 0 | 0 | 0 | 0 | 0 | 0 | 0 | 1 | 1 | 0 | 0 | 0 | 0 | colspan="6" | Rn 64 kinds of regsiters | | | | | | 0 | 0 | (long) $Add (upper) (#4) | 0 |
| | | *$Address=Rn | | | | | | | | | | | | | | | | | | | | | | | (short)$Address | |
| | | Rn=*(short)Address (#8) | 0 | 0 | 0 | 0 | 1 | 0 | 0 | 0 | colspan="8" | (short)$Address | | | | | | | | | 0 | 0 | 0 | 0 |
| | | *(short)Address=Rn | | | | | 1 | | | | | | | | | | | | | | | | | | | |
| stacking | | pop Rn | 0 | 0 | 0 | 0 | 0 | 0 | 0 | 0 | 0 | 0 | 1 | 0 | 0 | colspan="6" | Rn | | | | | | 0 | 0 | 0 | 0 |
| | | push Rn | | | | | | | | | | | 1 | | 1 | | | | | | | | | | | |
| special | | set | 0 | 0 | 0 | 0 | 0 | 0 | 0 | 1 | colspan="7" | mode definition area | | | | | | | | 0 | 0 | 1 | 1 | 0 | 0 |
| | | [if cc] break | | | | | | | | | 0 | 0 | 0 | 0 | 0 | 1 | 0 | 0 | 0 | 0 | 1 | 1 | | | | |
| | | [if cc] trap N | | | | | | | | | 0 | 0 | 0 | 0 | 0 | 1 | 1 | 1 | N | | | | CC | | | |
| | | [if cc] creturn | | | | | | | | | 0 | 0 | 0 | 0 | 1 | 0 | 0 | 0 | 0 | 0 | 1 | 0 | | | | |
| | | [if cc] ireturn | | | | | | | | | 0 | 0 | 0 | 0 | 1 | 0 | 1 | 0 | 0 | 0 | 1 | 0 | | | | |
| | | [if cc] breturn | | | | | | | | | 0 | 0 | 0 | 0 | 1 | 1 | 0 | 0 | 0 | 0 | 1 | 0 | | | | |
| | | second word of 2 word instruction | 0 | 0 | 0 | 0 | 0 | 0 | 1 | 1 | 1 | 1 | 1 | 1 | 1 | 1 | 1 | 1 | colspan="8" | least significant 2 bytes of $Address or $Data | | | | | | | |
| | | nop | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| direct repeat | | repeat M rc=N | 0 | 0 | 0 | 1 | 1 | 1 | 0 | 0 | 0 | 0 | 0 | 0 | 0 | 0 | 0 | 0 | N | | | | 0 | 0 | 0 | 0 |
| indirect repeat | | repeat M rc=Rm | 0 | 0 | 0 | 1 | 1 | 1 | 0 | 1 | 0 | 0 | 0 | 0 | 0 | 0 | 0 | 0 | 0 | 0 | 0 | 0 | Rm | | | |

(#8) in case of short direct addressing, constant offset value (H'8000) is always added to short direct address specified by this instruction code

| Type | Instructions | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| 1168 indirect standard branch with condition code | [if cc] goto Rm | 0 | 0 | 0 | 0 | 0 | 0 | 0 | 0 | 0 | 0 | 0 | 0 | 1 | 0 | 0 | 0 | Rm | | | | | CC | | |
| | [if cc] loop Rm | | | | | | | | | | | | | | 0 | 0 | 1 | a0h-1h | | | | | | | |
| | [if cc] call Rm | | | | | | | | | | | | | | 0 | 1 | 0 | m0h-1h | | | | | | | |
| | [if cc] breakout Rm | | | | | | | | | | | | | | 0 | 1 | 1 | xd0h-1h | | | | | | | |
| | [if cc] rgoto Rm | | | | | | | | | | | | | | 1 | 0 | 0 | yd0h-1h | | | | | | | |
| | [if cc] rloop Rm | | | | | | | | | | | | | | 1 | 0 | 1 | xa0-3 | | | | | | | |
| | [if cc] rcall Rm | | | | | | | | | | | | | | 1 | 1 | 0 | ya0-3 | | | | | | | |
| | [if cc] rbreakout Rm | | | | | | | | | | | | | | 1 | 1 | 1 | | | | | | | | |
| 1152 direct standard branch with condition code | [if cc] goto (short)$Address | 0 | 0 | 0 | 0 | 1 | 0 | 0 | 0 | (short)$Address for direct branch | | | | | | | | | | | | | | | |
| | [if cc] loop (short)$Address | | | | | | 0 | 0 | 1 | | | | | | | | | | | | | | | | |
| | [if cc] call (short)$Address | | | | | | 0 | 1 | 0 | | | | | | | | | | | | | | | | |
| | [if cc] breakout (short)$Address (#4) | | | | | | 0 | 1 | 1 | | | | | | | | | | | | | | | | |
| | [if cc] rgoto $Disp | | | | | | 1 | 0 | 0 | $Disp for PC relative branch | | | | | | | | | | | | | | | |
| | [if cc] rloop $Disp | | | | | | 1 | 0 | 1 | | | | | | | | | | | | | | | | |
| | [if cc] rcall $Disp | | | | | | 1 | 1 | 0 | | | | | | | | | | | | | | | | |
| | [if cc] rbreakout $Disp | | | | | | 1 | 1 | 1 | | | | | | | | | | | | | | | | |
| 1162 | [if cc] dgoto $Address (long) $Add (upper) (#4) | 0 | 0 | 0 | 0 | 0 | 0 | 0 | 0 | 1 | 1 | 0 | 0 | 0 | 0 | 0 | 0 | 0 | 0 | 0 | 0 | | | | |
| | [if cc] dloop $Address | | | | | | | | | | | 0 | 0 | 1 | | | | | | | | | | | |
| | [if cc] drgoto $Disp | | | | | | | | | | | 1 | 0 | 0 | | | | | | | | | | | |
| | [if cc] drloop $Disp | | | | | | | | | | | 1 | 0 | 1 | | | | | | | | | | | |
| 1169 indirect delayed branch with CC | [if cc] dgoto Rm | 0 | 0 | 0 | 0 | 0 | 0 | 0 | 0 | 0 | 0 | 0 | 0 | 1 | 0 | 0 | 0 | Rm | | | | | | | |
| | [if cc] dloop Rm | | | | | | | | | | | | | | 0 | 0 | 1 | | | | | | | | |
| | [if cc] drgoto Rm | | | | | | | | | | | | | | 1 | 0 | 0 | | | | | | | | |
| | [if cc] drloop Rm | | | | | | | | | | | | | | 1 | 0 | 1 | | | | | | | | |
| 1153 direct delayed branch with CC | [if cc] dgoto (short)$Address | 0 | 0 | 0 | 0 | 1 | 0 | 0 | 0 | (short)$Address for direct branch | | | | | | | | | | | | | | | |
| | [if cc] dloop (short)$Address | | | | | | 0 | 0 | 1 | | | | | | | | | | | | | | | | |
| | [if cc] drgoto $Disp | | | | | | 1 | 0 | 0 | $Disp for PC relative branch | | | | | | | | | | | | | | | |
| | [if cc] drloop $Disp | | | | | | 1 | 0 | 1 | | | | | | | | | | | | | | | | |
| 1163 | [if cc] dgoto $Address (#4) | 0 | 0 | 0 | 0 | 0 | 0 | 0 | 0 | 0 | 1 | 0 | 0 | 0 | 0 | 0 | 0 | 0 | 0 | $Add (upper) | | | | | |
| | [if cc] dloop $Address | | | | | | | | | | | | | | | | | | 1 | | | | | | |

5,638,524

DIGITAL SIGNAL PROCESSOR AND METHOD FOR EXECUTING DSP AND RISC CLASS INSTRUCTIONS DEFINING IDENTICAL DATA PROCESSING OR DATA TRANSFER OPERATIONS

CROSS-REFERENCE TO RELATED APPLICATIONS

This is a continuation of application Ser. No. 08/127,694 filed Sep. 27, 1993 now abandoned.

The following applications, which are assigned to the same assignee as the instant application, have been filed on the same date as the instant application and contain related subject matter. They are incorporated herein by reference.

Digital Signal Processor and Method for Executing an Instruction with Variable Length Type Code, Baji et al., U.S. patent application Ser. No. 08/127,938, filed Sep. 27, 1993.

Digital Signal Processor and Associated Method for Conditional Data Operation with No Condition Code Update, Kiuchi et al., U.S. patent application Ser. No. 08/127,691, filed Sep. 27, 1993.

On Chip DMA Controller with Interrupt Functions for Digital Signal Processor, Baji, U.S. patent application Ser. No. 08/127,685, filed Sep. 27, 1993.

Double Precision Division Circuit and Method for Digital Signal Processor, Nakagawa et al., U.S. patent application Ser. No. 08/127,660, filed Sep. 27, 1993.

Data Processor With Control Logic for Storing Operation Mode Status and Associated Method, Kiuchi, U.S. patent application Ser. No. 08/127,429, filed Sep. 27, 1993.

On-Chip DMA Controller with Host Computer Interface, Baji et al., U.S. patent application Ser. No. 08/127,429, filed Sep. 27, 1993.

Digital Signal Processor with No-Chip Address Decoder and Wait Status Controller, Baji, U.S. patent application Ser. No. 08/127,682, filed Sep. 27, 1993.

Modulo Arithmetic Addressing Circuit, Shridhar et al., U.S. patent application Ser. No. 08/127,431, filed Sep. 27, 1993.

FIELD OF THE INVENTION

The present invention relates generally to digital signal processors (DSPs). More particularly, it pertains to a DSP and method for executing DSP and RISC class instructions that define identical data processing or data transfer operations.

BACKGROUND OF THE INVENTION

Digital signal processors (DSPs) are special-purpose microcomputers which are uniquely designed to perform digital signal processing at high rates. These high processing rates enable DSPs to implement digital filters and compute fast fourier transforms. In the past, various types of instruction sets have been used for achieving high processing rates for DSPs.

One popular type of instruction set includes instructions which have a type code field and an operation code field to define the specific operations to be performed by the DSP. The type code field for an instruction identifies its instruction type. The operation code field identifies from among the operations that can be executed with the instruction type the specific operations that are to be executed by the instruction. The bit length of each instruction is fixed. In addition, the bit length of the type code field is either fixed or varies only slightly for different instruction types. The same is true of the operation code field.

Another popular type of instruction set uses instructions that have only an operation code field to identify the specific operations the DSP is called on to perform. As is the case with the other instruction set described earlier, the bit length of each instruction is fixed and the operation code field is either fixed or varies only slightly for different instructions.

In order to achieve high processing rates, the remaining fields in the instructions of the described instruction sets may include operand source and destination fields for data processing operations and/or address source fields and operand source or destination fields for memory access data transfer operations. Some of the instructions of these instruction sets include both operand source and destination fields for data processing operations and address source fields and operand source or destination fields for data transfer operations. Thus, these types of instructions define data processing operations in parallel with data transfer operations. However, other instructions in these instruction sets include only operand source and destination fields for data processing and still other instructions include only address source and operand source or destination fields for memory related data transfer operations.

The fixed or limited variable bit lengths of the type codes and/or operation codes of the instructions of these instruction sets take up many of the fixed number of bits of the instructions. As a result, the number of bits left for the remaining fields of the instructions is limited. This limits programming flexibility in a number of critical ways.

For example, it may be desired to have large flexibility in selecting operand sources and destinations for data processing operations and/or large flexibility in selecting address sources and operand sources or destinations for memory access data transfer operations. In order to achieve this kind of flexibility, the bit length of the operand source and destination fields and the address source fields must be large. As a result, the number of parallel operations defined by a fixed bit length instruction is sacrificed in order to accommodate the large bit lengths of these fields.

Alternatively, it may be desired to have many parallel operations defined by a fixed bit length instruction. In this case, the bit lengths of operand source and destination fields and address source fields may be very limited. Thus, flexibility in selecting operand sources and destinations for data processing operations and flexibility in selecting address sources and operand sources or destinations for data transfer operations may be sacrificed.

Furthermore, the distinction between various operand source and destination fields for data processing operations may be eliminated for instructions that define many parallel operations. Thus, the flexibility in selecting separate operand sources and destinations for data processing operations will be eliminated as well.

This sacrificing of programming flexibility could be avoided by increasing the bit length of the instructions of an instruction set. However, the use of longer instructions necessarily will result in increased program storage (i.e., memory) costs. Furthermore, pre-processors and other hardware could be utilized to create longer instruction words only in particular situations. While helpful in adding some flexibility, the resultant increase in overhead and more costly program storage (although minimized) is not desirable.

In the competitive digital signal processor market, the ability of a processor to pipeline instructions is one measure of processor performance. Pipelining is the process of decomposing repetitive processes within the processor into subprocesses that can be executed concurrently and in an overlapping fashion. Two distinct limitations exist in the ability to pipeline instructions. The first is software (i.e., programming) limitations and the second is hardware limitations.

Hardware limitations to pipelining arise when the DSP's hardware physically restricts the operation of the DSP. This type of pipelining limitation may be manifest or hidden. Hardware limitations that are manifest occur when the data paths of the DSP restrict access to existing operand sources, operand destinations, or address sources. Hardware limitations that are hidden occur when an instruction which is written as if it can be performed in a single clock (i.e., machine) cycle can in fact only be performed in two or more cycles because of hardware limitations.

Software limitations on the other hand prevent the programmer from pipelining instructions and making use of existing processor hardware or capabilities. This occurs when the instruction set (i.e., instruction format) does not give the programmer the flexibility to (1) select from all of the available operand sources and destinations for data processing operations or from all of the available address sources and operand sources or destinations for data transfer operations, (2) select separate operand sources and destinations for data processing operations, or (3) implement many parallel operations with one instruction. In the case of (1) and (2), extra instructions must be used to move operands or addresses to or from desired sources or destinations. In the case of (3), extra instructions must be executed to perform those operations which could not be performed in parallel with the operations of other instructions.

OBJECTS OF INVENTION

It is an object of the present invention to provide a decoder that decodes instructions having type code fields with bit lengths that vary over a large range of bits depending on the instruction type.

It is another object of the present invention to provide a decoder that decodes both DSP and RISC class instructions that define the same data processing operations where the source and destination fields for the RISC class instructions have larger bit lengths than the source and destination fields of the DSP class instructions.

It is further an object of the present invention to provide a decoder that decodes both DSP and RISC class instructions that define the same data transfer operations where the address source and the transfer source and destination fields for the RISC class instructions have larger bit lengths than the source and destination fields of the DSP class instructions.

SUMMARY OF INVENTION

The foregoing and other objects of the invention are achieved by a digital signal processor that includes an instruction memory, a program control unit, and an instruction decoder. The instruction memory stores a sequence of instruction words including DSP instruction words and RISC instruction words. Each of the instruction words has a type code field identifying (a) whether the instruction is a RISC instruction or a DSP instruction, and (b) the type of operations to be performed by the DSP. Each instruction word further includes additional fields such as an operation code field, operand source fields, operand destination fields, and immediate data fields.

The program control unit outputs an instruction address to the instruction memory so as to select one instruction word in the instruction memory. Each RISC instruction word identifies operations to be performed. The identified operations to be performed corresponding to each RISC instruction word are selected form (A) one or more data processing operations and no data transfer operations, (B) one or more data transfer operations and no data processing operations, and (C) program control operations. Each DSP instruction word identifies a combination of operations to be performed selected from predefined combinations of data processing operations and data transfer operations. Every DSP instruction word identifies at least one data procession operation and at least one data transfer operation to be performed.

The DSP instruction words include a predefined DSP instruction word having separate source and destination fields for specifying register locations for data sources and data destinations. The RISC instruction words including a predefined RISC instruction word corresponding to the predefined DSP instruction word. The predefined RISC instruction word has separate source and destination fields for specifying register locations for data sources and data destinations. At least one of the source and destination fields in the predefined RISC instruction word has more bits than the corresponding field in the predefined DSP instruction word.

The instruction decoder decodes the selected instruction word. The instruction decoder includes decoder circuitry for decoding the type code field and any operation code field in the selected instruction word to identify a specific RISC or specific DSP operation to be performed by the digital signal processor. The instruction decoder also includes operand decoding circuitry for decoding the additional fields in accordance with the identified operation and for selecting different combinations of the selected instruction word's bits to generate source and destination operand control signals in accordance with the identified RISC or DSP operation.

BRIEF DESCRIPTION OF THE DRAWINGS

Additional objects and features of the invention will be more readily apparent from the following detailed description and appended claims when taken in conjunction with the drawings and tables, in which:

FIGS. 8(a)–8(f) list the instruction classes and the instruction types for the instruction set of the DSP of the present invention;

FIGS. 9(a)-(k) list the specific instructions of the instruction set of the DSP of the present invention;

DESCRIPTION OF THE PREFERRED EMBODIMENT

FIGS. 1-33 provide illustrations of the invention disclosed herein. In these figures, like components are designated by like numerals.

Figure 1:
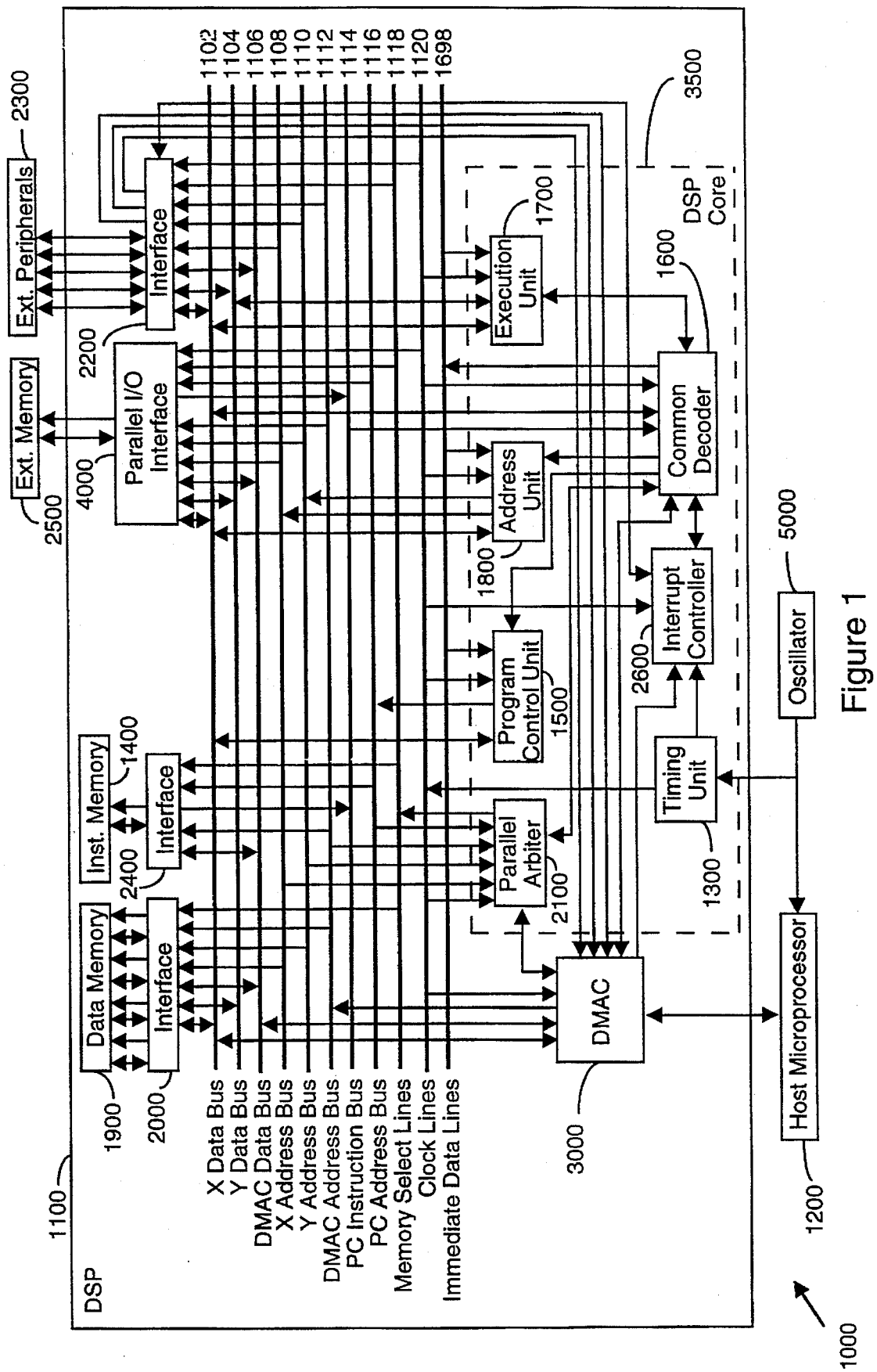
FIG. 1 is a block diagram of a digital signal processor (DSP) in accordance with the present invention.

Referring initially to FIG. 1, there is shown a data processing system 1000. The data processing system 1000 includes a digital signal processor (DSP) 1100, a host microprocessor 1200, an external memory 2500, external peripheral devices 2300, and an oscillator 5000. The DSP 1100 has a Harvard architecture in that it includes an instruction bus 1114 which is separate from the X data bus 1102 and the Y data bus 1104.

GENERAL OPERATION OF DSP

In general, the operation of the DSP 1100 involves a three stage pipeline. These three stages are an instruction fetch stage, a decoding stage, and an execution stage.

During the fetch stage the program control unit 1500 of the DSP core 3500 provides an address on the program control (PC) address bus 1116 for fetching an instruction from the instruction memory 1400 located at that address. In response, the instruction memory 1400 outputs the instruction on the program control (PC) instruction bus 1114. The common decoder unit 1600 of the DSP core 3500 receives the instruction from the PC instruction bus 1114.

The next stage is the decoding stage. During this stage, the common decoder unit 1600 decodes the received instruction. In response, it generates control signals which are provided to the execution unit (EXU) 1700, the address unit (AU) 1800, the program control unit (PCU) 1500, and the parallel arbiter 2100 of the DSP core 3500.

The last stage is the execution stage. During this stage, the control signals control the operations of the execution unit (EXU) 1700, the address unit (AU) 1800, and the program control unit (PCU) 1500 so that the functions defined by the instruction are executed.

BASIC TIMING

Figure 2:
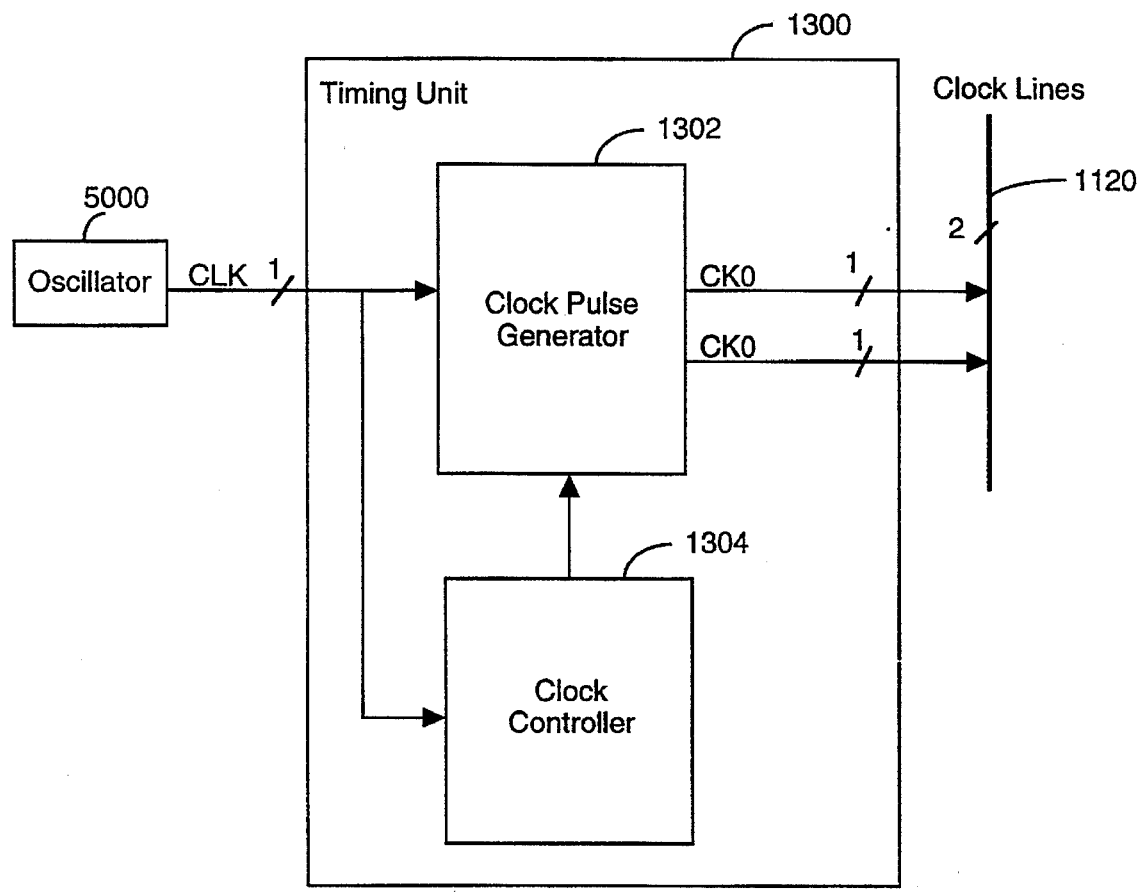
FIG. 2 is a block diagram of the timing unit and clock pulse generator of the DSP of the present invention.

The DSP core 3500 also includes a timing unit 1300 which provides the basic timing for the operation of the DSP 1100. As shown in FIG. 2, the timing unit 1300 includes a clock pulse generator 1302 whose operation is controlled by a clock controller 1304.

Clock Pulse Generator

The clock pulse generator 1302 receives a clock signal (CLK) from the oscillator 5000. In response, the clock pulse generator 1302 generates two clock signals CK0 and CK1 which are a quarter cycle out of phase with respect to each other. The clock signals CK0 and CK1 are provided to the clock bus 1120. From there, they are provided to the other components of the DSP 1100.

In the preferred embodiment, the frequency of the clock signal CLK received from the oscillator 5000 is 25 MHz and so are the frequencies of the clock signals CK0 and CK1 generated by the clock pulse generator 1302. As a result, each machine cycle is 40 ns long as is shown in FIGS. 3-7.

Timing

Figure 3:
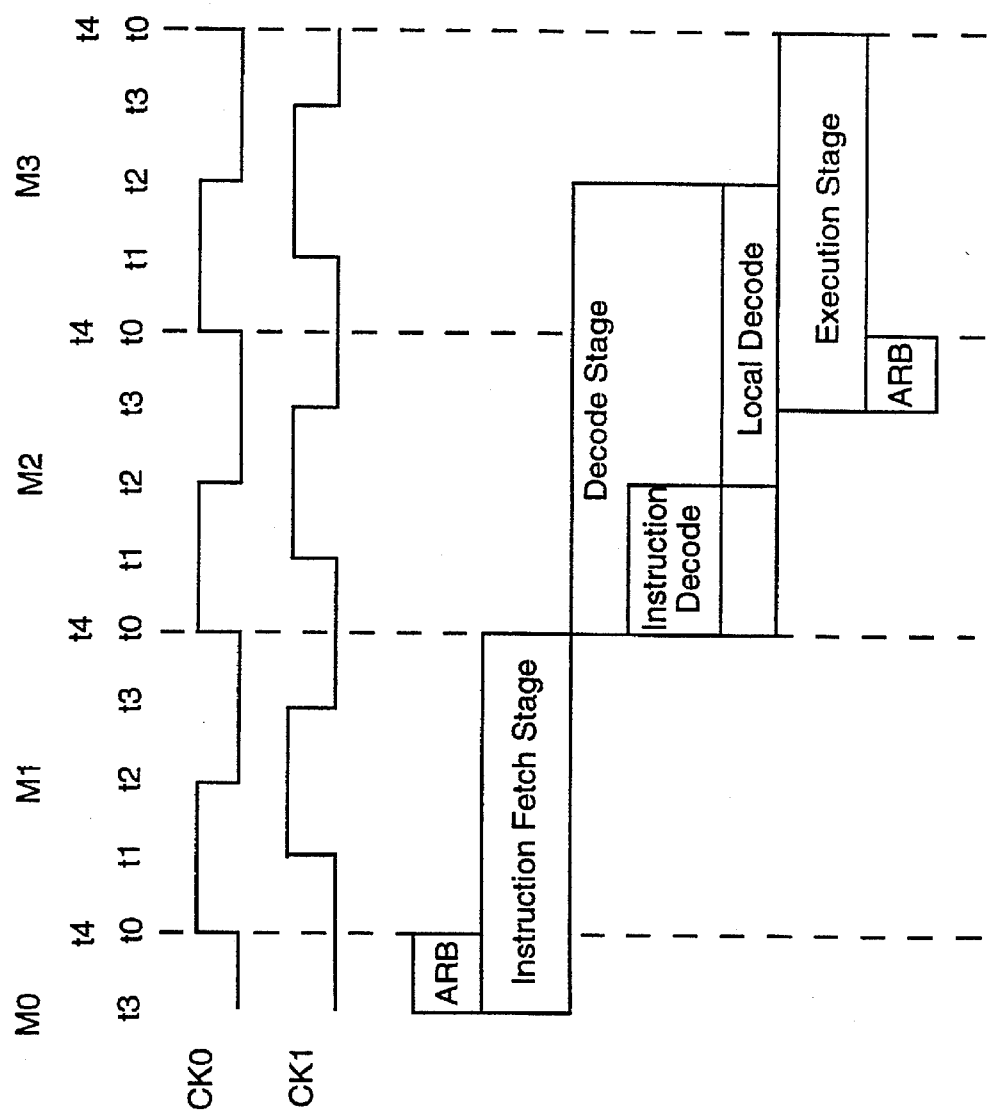
FIG. 3 is a timing diagram of the three stage instruction fetch, decode, and execute pipeline for single word and single cycle instructions of the DSP of the present invention under normal conditions.

FIG. 3 shows the basic timing for the operation of the DSP 1100 for most types of instructions and conditions. As shown, this operation involves the three stage pipeline described earlier. This pipeline is governed by the clock signals CK0 and CK1 so that each machine cycle M0-M3 begins at time t0 and ends at time t4 (i.e., time t0 of the next machine cycle). For most instructions and under normal conditions, the entire three stage pipeline is actually accomplished in 3¼ machine cycles (from time t3 of machine cycle M0 to time t4 of machine cycle M3). However, it is effectively accomplished in 3 machine cycles since the instruction fetch stage overlaps the preceding execution stage by a quarter machine cycle.

Figure 4:
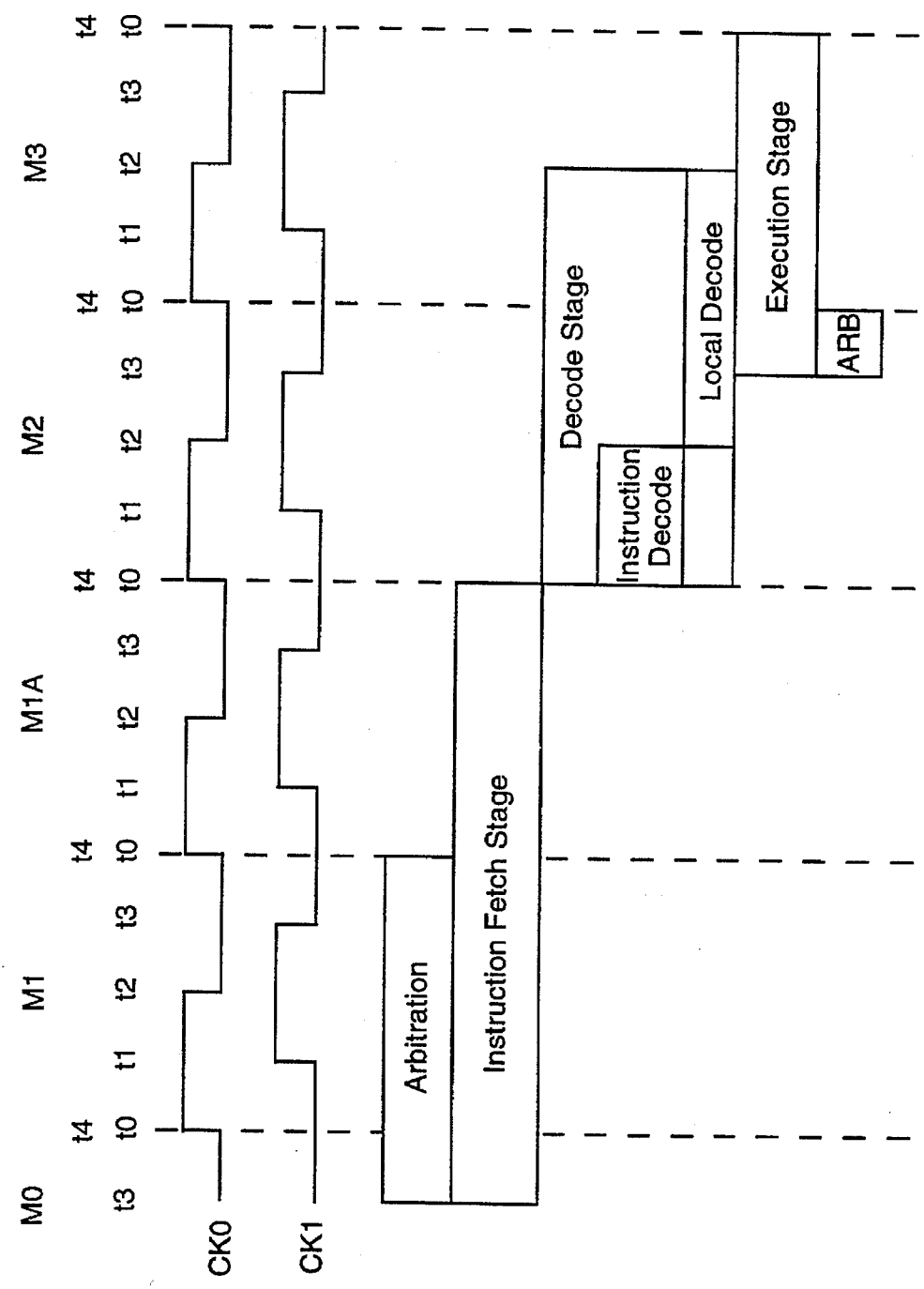
FIG. 4 is a timing diagram of the three stage instruction fetch, decode, and execute pipeline for single word instructions of the DSP of the present invention when there is a conflict in accessing the instruction memory.
Figure 5:
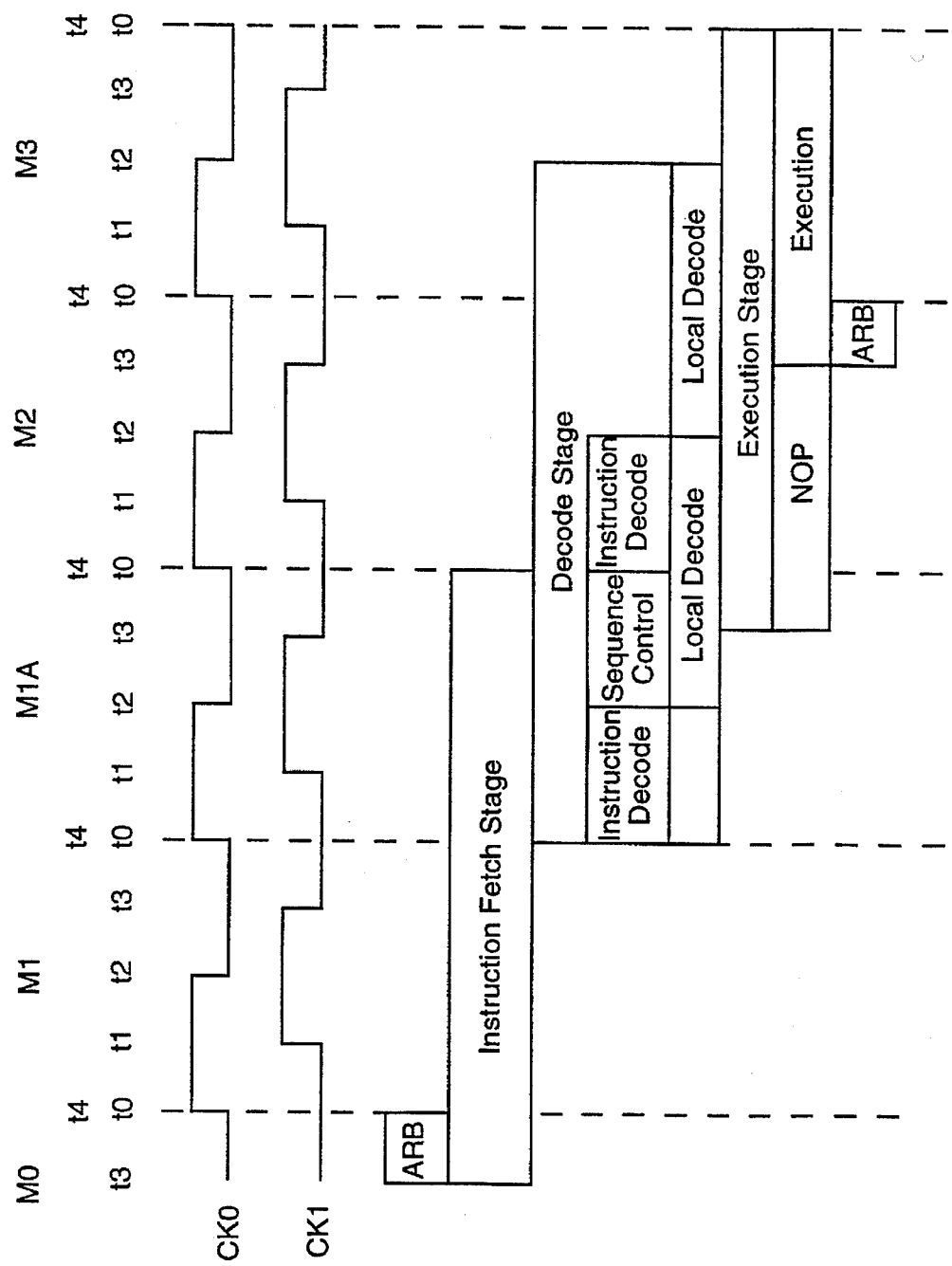
FIG. 5 is a timing diagram of the three stage instruction fetch, decode, and execute pipeline for a double word instruction of the DSP of the present invention under normal conditions.
Figure 6:
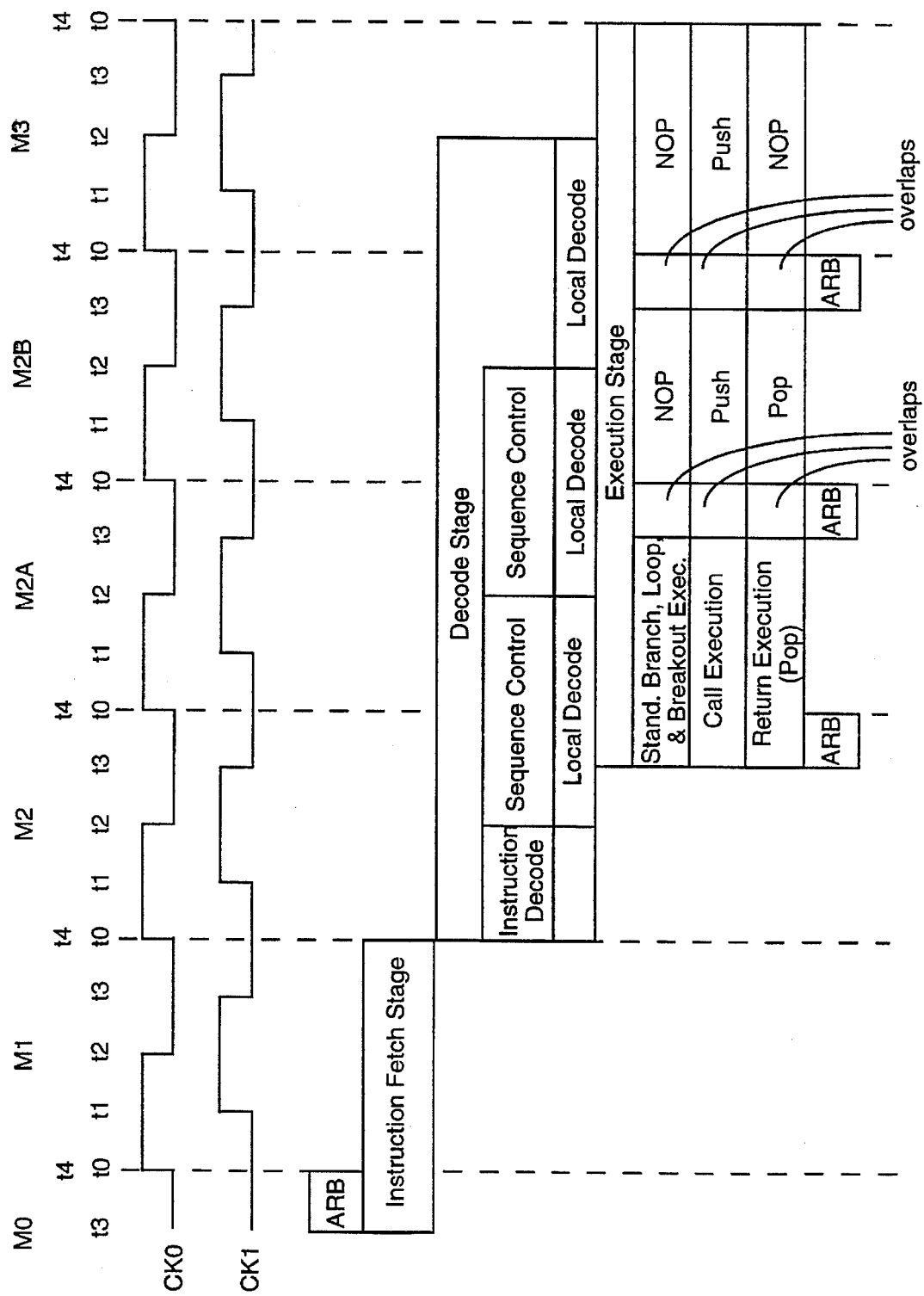
FIG. 6 is a timing diagram of the three stage instruction fetch, decode, and execute pipeline for plural cycle instructions of the DSP of the present invention.
Figure 7:
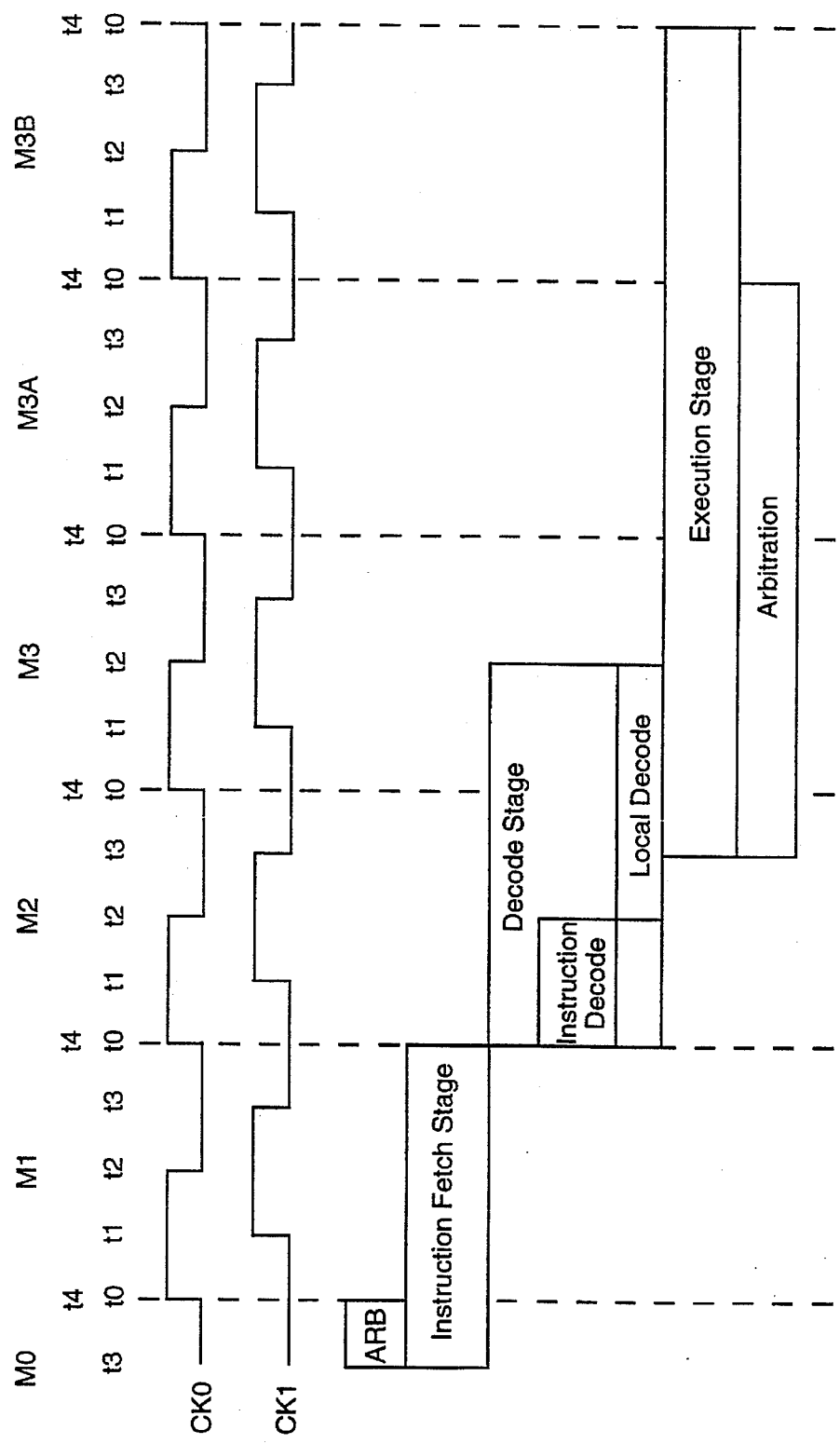
FIG. 7 is a timing diagram of the three stage instruction fetch, decode, and execute pipeline for single word instructions of the DSP of the present invention when there is a conflict in accessing the data memory.

For certain instructions and under certain circumstances the three stage pipeline may require additional machine cycles to be completed. For example, conflicts for accessing the instruction memory 1400 may arise during an instruction fetch stage. When this occurs, as shown in FIG. 4, an additional machine cycle M1A for the instruction fetch stage of the pipeline will be required. Furthermore, the instruction memory 1400 may store double word instructions. As shown in FIG. 5, an additional machine cycle M1A is needed for fetching the second word of the double word instruction. Moreover, as shown in FIG. 6, additional machine cycles M2A and M2B are required for the sequence control of standard branch, standard loop, call, and return instructions. Lastly, conflicts for accessing the data memory 1900 may arise during an execution stage. As shown in FIG. 7, when this occurs, an additional machine cycle or cycles M3A and M3B will be required for completing the execution stage.

INSTRUCTION SET

FIGS. 8(a)–8(f) show, at different levels of detail, a listing of the class and types of instructions included in the instruction set of DSP 1100. FIGS. 8(a)–8(f) also show the various kinds of fields included in the different types of instructions. The instructions are divided into classes labeled 1130 and 1132 and into instruction types labeled 1134–1170. FIGS. 9(a)–(i) show how the instruction types 1134–1170 are further subdivided into specific instructions.

RISC and DSP Class Instructions

The instruction set includes DSP class instructions 1130. As is evident from the instruction type column of FIGS. 8(a)–8(f), the DSP class 1130 instructions include (a) instruction types 1134 and 1135 that define parallel data processing operations in parallel with parallel data transfer operations, (b) instruction types 1136, 1137, 1140 and 1141 that define single data processing operations in parallel with parallel data transfer operations, (c) instruction types 1138 and 1139 that define parallel data processing operations in parallel with single data transfer operations, (d) instruction types 1142–1145 that define single data processing operations in parallel with single data transfer operations.

Furthermore, the instruction set includes RISC class instructions 1132. The RISC class instructions 1132 include (a) instructions types 1152–1154, 1162, 1163, and 1167–1169 that define program control operations, (b) instruction types 1149, 1151, 1157, 1159, and 1161 that define single data processing operations exclusively (i.e., not in parallel with data processing operations), (c) an instruction type 1146 that defines parallel data processing operations exclusively (i.e., not in parallel with data processing operations), (d) instruction types 1148, 1150, 1155, 1157, 1160, 1165, and 1165 that define single data transfer operations exclusively (i.e., not in parallel with data transfer operations), (e) an instruction type 1147 that defines parallel data transfer operations exclusively (i.e., not in parallel with data transfer operations), (f) an instruction type 1158 that defines the second word of a double word instruction, (g) an instruction type 1164 that defines special operations such as returns from subroutine calls, set flags, and software interrupts, and (h) an instruction type 1170 for no operations (NOPs).

Figure 8E:

Both the DSP class and the RISC class instructions 1130 and 1132 have a fixed bit length. In the preferred embodiment, each instruction includes 24 bits. However, in other embodiments, these fixed bit length instructions may have other fixed bit lengths including 16 and 32 bits. Type Code Field As shown in FIGS. 8(a) and 8(b), the DSP class and RISC class instructions 1130 and 1132 each include a type code field (TY). The type code field (TY) of each instruction identifies the type of instruction that it is. The various types of instructions 1134–1170 are listed in FIGS. 8(a)–8(f) in the instruction type column. As is evident from this column, the instruction types 1134–1170 are identified by the kinds of operations which they call on the DSP 1100 to perform.

As will be explained later in greater detail, the bit length of the type code field (TY) varies depending on the instruction type. In the preferred embodiment of a 24 bit instruction, the bit length of the type code (TY) ranges from a minimum of 2 bits for instruction types 1134 and 1146 up to a maximum of 15 bits for instruction type 1169. However, one skilled in the art will appreciate that this range may be different for other 24 bit instruction sets or instruction sets of other fixed bit lengths including 16 and 32 bits.

As shown in FIGS. 8(c) and 8(d), the type code field for each instruction includes a pre-transition bit field (PT) and a transition bit field (T). Furthermore, for some instruction types (1136–1141, 1147–1154, 1157–1164, 1166, and 1167), the type code field (TY) includes a hybrid field (H).

Referring to FIGS. 8(c)–8(f), in the case of DSP class instructions 1130, the pre-transition bit field (PT) is a "1" bit or a series of "1" bits that is followed by a "0" bit. In this case, the "0" bit is the transition bit field (T). However, for the RISC class instructions 1132, the pre-transition bit field (PT) is a "0" bit or a series of "0" bits that is followed by a "1" bit. The "1" bit in this case comprises the transition bit field (T).

In the preferred embodiment of a 24 bit instruction, the bit length of the pre-transition bit field (PT) for DSP class instructions 1130 ranges from 1 bit to 10 bits and for RISC class instructions 1132 the range is from a minimum of 1 bit to a maximum of 14 bits. Furthermore, the transition bit is only a single bit. However, one skilled in the art will appreciate that the ranges of lengths of the pre-transition bit field (PT) and the length of the transition bit field (T) may vary for other 24 bit instruction sets or instruction sets of other fixed bit lengths including 16 and 32 bits.

In most cases, the bit length of the pre-transition bit field (PT) varies for each type of instruction. However, when different types of instructions (1136–1141, 1147–1154, 1157–1164, 1166, and 1167) require the same number of bits for the remaining fields of the instruction, then the pre-transition bit field (PT) for these types of instructions will have the same bit length. In order to distinguish between these different types of instructions, the type code field (TY) includes a hybrid field (H). In the preferred embodiment, the hybrid field (H) is located immediately after the transition bit field (T) and has a bit length that depends on the number of different types of instructions that require the same number of bits for the remaining fields.

Operation Code Field

In addition to the type code field (TY), most instruction types (1134–1153, 1155–1166, 1168, and 1169) of the DSP class and RISC class instructions 1130 and 1132 include an operation code field (OP). However, several instruction types (1154 and 1167) do not include an operation code (OP) field. For those instruction types that do have an operation code field (OP), the bit length and the location of the operation code field (OP) varies for the different types of instructions.

FIGS. 9(a)–9(k) lists each instruction and the corresponding specific operations it defines. For those instructions which include a type code field (TY) and an operation code field (OP), these two fields together define the specific operations which the DSP 1100 is to perform. But, if the instruction only includes a type code field (TY), then as just stated this field alone defines the specific operations that DSP 1100 is called on to perform.

Operand Source and Destination Fields

Figure 10:
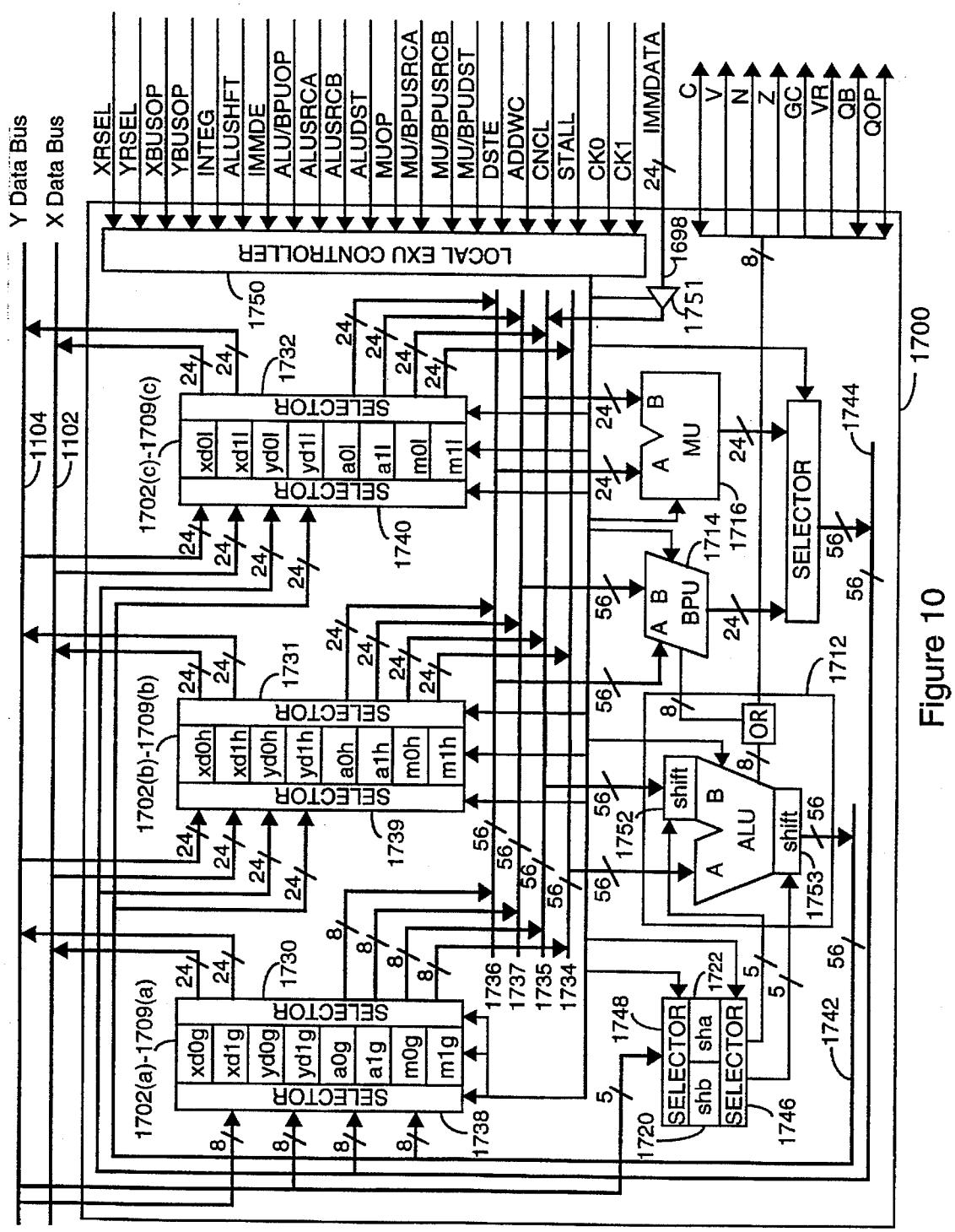
FIG. 10 is a block diagram of the execution unit of the DSP of the present invention.

Referring back to FIGS. 8(a)–8(c), the instruction set includes various instruction types 1134–1146, 1149, 1151, 1157, 1159, and 1161 that have operand source fields (SRC, SRC1 and SRC2, SRCX1, SRCY1, SRCX2, and SRCY2, or SX1, SX2, SY1, and SY2) and/or operand destination fields (DST or D1 and D2) for accomplishing data processing operations defined by these instructions types. Referring to FIG. 10, the sources and destinations can be selected from the various data register 1702–179 of the execution unit (EXU) 1700. As is evident from FIGS. 8(a)–8(f) and 9(a)–9(k), the number and the type of registers 1706–1710 that can be selected as an operand source or destination depends on the instruction type and the size of the particular source field (SRC, SRC1, SRC2, SX1, SX2, SY1, or SY2) or destination field (DST, D1, or D2). These fields vary in size from 1 to 3 bits.

Operand Address Source Fields

Figure 11:
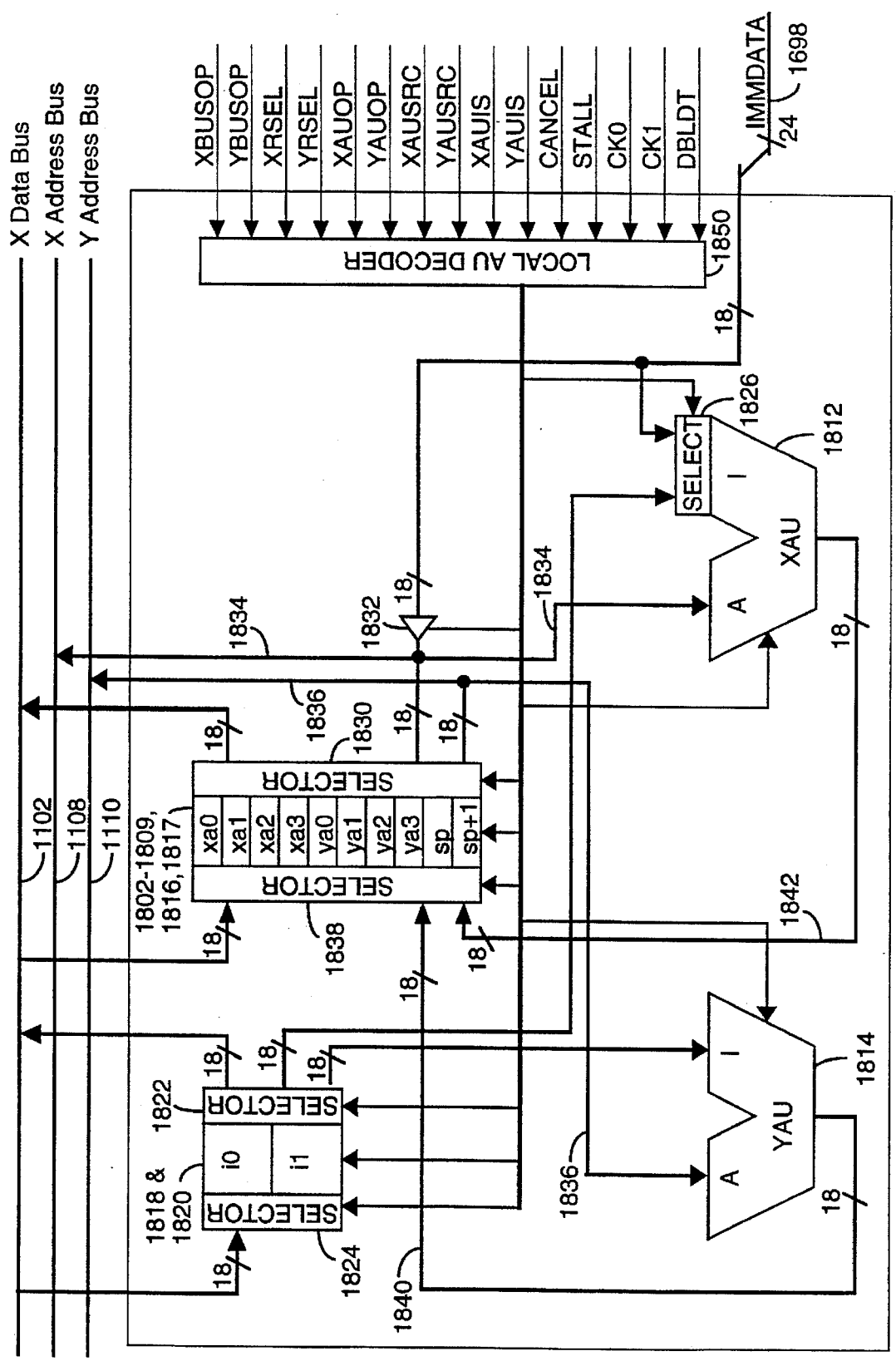
FIG. 11 is a block diagram of the address unit of the DSP of the present invention.

The instruction set may also include instruction types 1134–1145, 1147, 1156, and 1165 that have operand address source fields (Am, An, Aq and Ap, or Aa and Ab) for data transfer operations involving indirect accessing of data memory 1900. These fields provide the operand address sources of data to be transferred to or from the data memory 1900. Referring to FIG. 11, the operand address sources can be selected from the various address registers 1802–1809 of the address unit (AU) 1800. As suggested by FIGS. 8(a)–8(f) and 9(a)–9(k), the number and the type of address registers 1802–1809 that can be selected as operand address sources depends on the instruction type and the size of the operand address source field (Am, An, Aq and Ap, or Aa and Ab) which vary in size from 1 to 3 bits.

Operand Transfer Source Fields

The instruction set may also include instruction types 1134, 1136, 1139, 1140, 1143, 1145, 1147, 1148, 1155, 1156, and 1165 that have operand transfer source fields (Rp, Rs, Rn, Raa, or Rb) for data transfer operations involving indirect accessing of data memory 1900 or register to register transfers. In addition, the instruction set may include instruction types 1134–1138, 1140–1142, 1144, 1147, 1148, 1155, 1156, and 1165 that have operand transfer destination fields (Rq, Rl, Raa, Rn, Ra and/or Rb) for data transfer operations involving direct or indirect accessing of data memory 1900 or register to register transfers.

Figure 12:
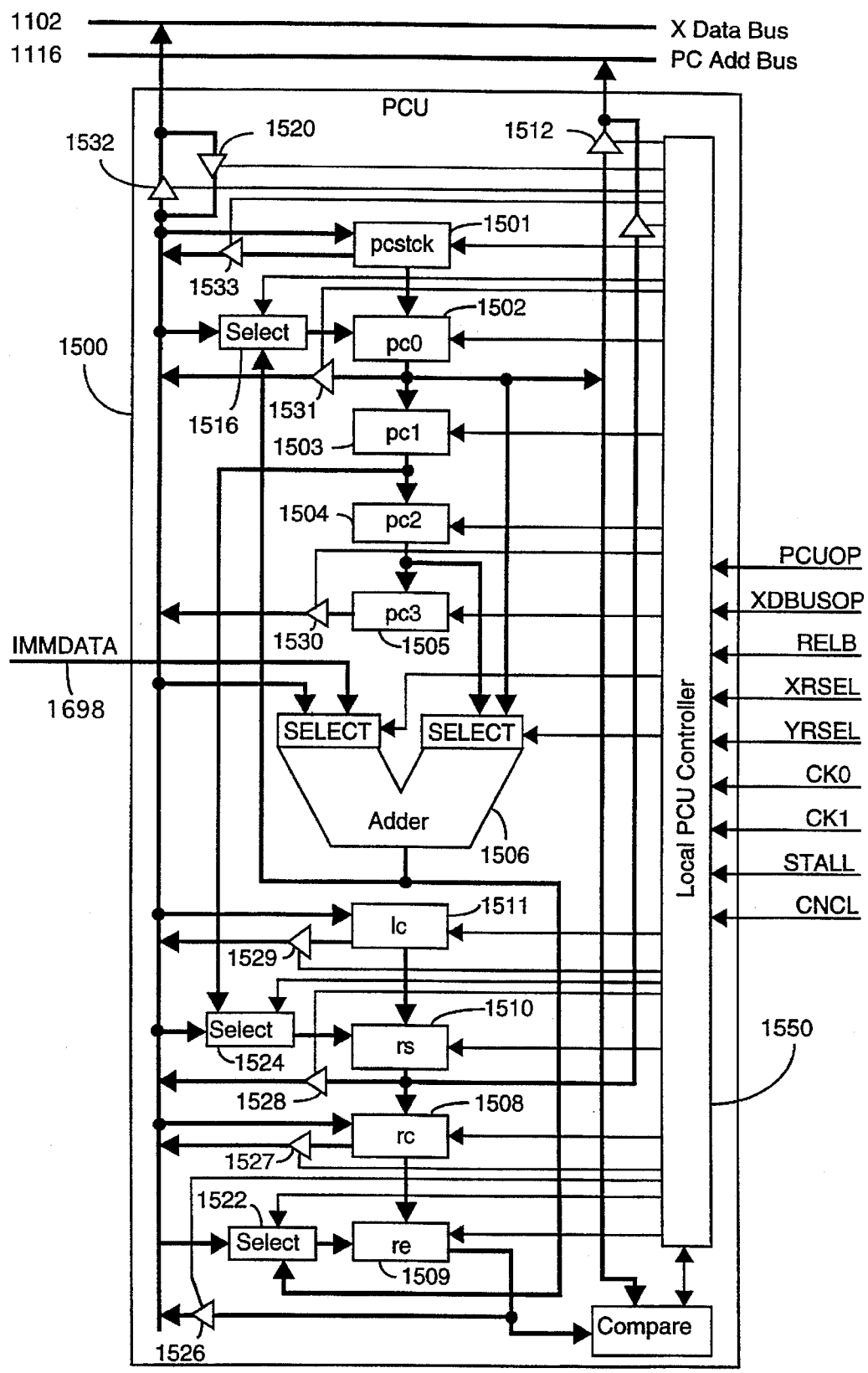
FIG. 12 is a block diagram of the program control unit of the DSP of the present invention.

Furthermore, the instruction set may include instruction types 1167–1169 that have operand transfer source fields (Rm) for data transfers necessary to carry out indirect branch (i.e., goto), loop, call, breakout, or repeat operations as shown in FIG. 9(k). Referring to FIG. 12, for branch, loop, call, and breakout instructions, the content of the register specified by the operand source field (Rm) is moved to the program control register 1502 (pc0) and is the target address of the program flow. But, in the case of a repeat instruction, the content of the register specified by the operand source field (Rm) is moved to the repeat counter register 1508 (rc).

Referring to FIGS. 10–13, 16, and 30 the operand transfer sources or destinations can be selected from a number of registers including (a) the address registers 1802–1809 (xa0–ya3) and the index registers 1818 and 1809 (i0 and i1) of the address unit (AU) 1800, (b) the individual data registers 1702(a)–179(c) (xd0g–m1I) and the shift control registers 1720 and 1722 (sha and shb) of the execution unit (EXU) 1700, (c) the program control registers 1502 and 1505 (pc0 and pc3), the repeat control registers 1508–1510 (rc, rs, and re), and the loop control register 1511 (lc) in the program control unit (PCU) 1500, (d) the instruction fetch registers 1604 and 1606 (if0 and if1) and the condition code register 1674 (ccr) in the common decoder unit 1600. As is evident from FIGS. 8(a)–8(f) and 9(a)–9(k), the number and the type of the registers just described that can be selected as an operand transfer source or destination depends on the instruction type and the size of the operand transfer source field (Rp, Rs, Rn, Rm, Raa, or Rb) or transfer destination field (Rq, Rl, Raa, Rn, Ra and/or Rb). These fields vary in size from 1 to 3 bits or 6 bits.

Address Update Fields

Moreover, the instruction set includes instruction types 1134–1145, 1147, and 1165 that have memory address update fields (MEMA, MEMB, or MEM) for indirect memory access data transfer operations. These fields provide information as to whether the address contained in the corresponding operand address source (Am or Aa and Ab) is to be updated simultaneously with the defined data transfer. As suggested by FIGS. 8(a)–8(f) and 9(a)–9(k), the number and the type of update operations that can be selected depend on the instruction type and the size of the operand transfer source field (Rp, Rs, Rn, Rm, Raa, or Rb) or transfer destination field (Rq, Rl, Raa, Rn, Ra and/or Rb). These fields vary in size from 1 to 3 bits.

X and Y Address Bus Option Field

Some instruction types 1134, 1136, and 1140 of the DSP class instructions 1130 also include an X and Y address bus option (St) field. This field identifies which of the operand address source fields (Aa or Ab) is to be used for providing an address on the X address bus 1108 for storing data to data memory 1900 over the X data bus 1102 and which is to be used for providing an address on the Y address bus 1110 for retrieving data from data memory 1900 over the Y data bus 1104.

Immediate Data Field

Some of the instruction types 1149, 1150, 1152–1158, 1160–1163, and 1167 of the RISC class instructions 1130 include immediate data fields ($Address, $Disp, Step Number M, Repeat Count N, $DATA, $Data, $D, $A, $Data/ $Address). These fields provide immediate data in order to effectuate data transfer operations involving direct memory accesses, indirect program control operations, direct register loading operations, or direct data processing operations.

Condition Code Field

Many of the RISC class instructions 1132 also include condition code fields (CC) for various program control, data processing, and direct register loading instructions. This field provides the condition on which the corresponding operation is to be performed.

Advantages of Variable Length of Type Code Field

The range of lengths (2 to 14 bits) for the type code field (TY) provides a number of advantages with respect to the fields just described. These advantages include the ability to provide (a) a wide range of DSP class instructions 1130, (b) separate and distinct source and destination fields for the data processing operations of each DSP class instruction 1130, and (c) RISC class instructions 1132 that define the same data processing or data transfer operations as do various DSP class instructions 1130 but include larger operand fields for performing these operations.

As is evident from FIGS. 8(a)–8(f), the range of lengths of the type code field (TY) results in a wide variety of DSP class instructions 1130. As was stated earlier these include (a) instruction types 1134 and 1135 that define parallel data processing operations in parallel with parallel data transfer operations, (b) instruction types 1136, 1137, 1140 and 1141 that define single data processing operations in parallel with parallel data transfer operations, (c) instruction types 1138 and 1139 that define parallel data processing operations in parallel with single data transfer operations, (d) instruction types 1142–1145 that define single data processing operations in parallel with single data transfer operations.

Furthermore, the range of lengths of the type code (TY) provides a great deal of flexibility not only in terms of being able to define multiple parallel operations with one instruction but also in performing these operations. For example, as was indicated earlier, the DSP class instructions 1130 include instruction types 1134–1145 that define data processing operations in parallel with data transfer operations. For each data processing operation defined by a DSP class instruction 1130, the instruction includes a single source field (SRC) or two source fields (SX1 and SX2 or SY1 and SY2) and a separate and distinct destination field (DST, D1, or D2). For each data transfer operation defined by a DSP class instruction 1130, the instruction includes an operand address source field (Aa, Ab, or Am) and an operand transfer source field (Rs or Rq) or a transfer destination field (Rl or Rp). The large number of separate and distinct fields (especially for the data processing operations) provides a great deal of flexibility in performing the various operations defined by the instruction.

The variable length of the type code (TY) also helps to provide a great deal of flexibility in performing RISC type data processing and data transfer operations. This increased flexibility aids greatly in the performance of the housekeeping (i.e., non-number crunching) portions of a program running on the DSP 1100.

As shown in FIGS. 8(a)–8(f) and FIGS. 9(a)–9(k), the RISC class instructions 1132 include instruction types 1151 and 1161 that can define exclusively single data processing operations (i.e., not in parallel with data transfer operations) which are identical to single data processing operations that can be defined by the various instruction types 1136, 1137, and 1140–1145 of the DSP class instructions 1130. The RISC class instructions 1132 also include instruction types 1146 that can define exclusively parallel data processing operations (i.e., not in parallel with data transfer operations) which are identical to parallel data processing operations that can be defined by the various instruction types 1134, 1135, 1138, and 1139 of the DSP class instructions 1130.

However, unlike the DSP class instructions 1130, these RISC class instructions 1132 do not include operand address source fields and operand transfer source and destination fields for data transfer operations in parallel with the data processing operations. Thus, the operand destination fields (DST or D1 and D2) and in some cases the operand source fields (SRC, SRC1 and SRC2, or SX1, SX2, SY1, and SY2) may be larger than those found in the DSP class instructions 1130 for the identical data processing operations. As a result, a greater number of registers can be selected for these fields than can be for a DSP class instruction 1130. This makes these RISC class instructions 1130 highly orthogonal.

Furthermore, the RISC class instructions 1132 includes an instruction type 1165 that can define exclusively a single data transfer operation (i.e., not in parallel with data processing operations) which is identical to a single data transfer operation that can be defined by the various instruction types 1138, 1139, and 1142–1145 of the DSP class instructions 1130. The RISC class instructions 1132 also include an instruction type 1147 that can define exclusively parallel data transfer operations (i.e., not in parallel with data processing operations) which are identical to parallel data transfer operations that can be defined by the various instruction types 1134–1137, 1140, and 1141 of the DSP class instructions 1130.

However, unlike the DSP class instructions 1130, these types of RISC class instructions 1132 do not include operand source and destination fields for data processing operations in parallel with the data transfer operations. Thus, the operand address source fields (Aq and Ap) and the operand transfer source fields (Raa) or transfer destination fields (Raa and Rbb) may be larger than those found in the DSP class instructions 1130 for the identical data processing operations. As a result, a greater number of registers can be selected for these fields than can be for a DSP class instruction 1130. This makes these types of RISC class instructions 1130 highly orthogonal.

INSTRUCTION FETCH STAGE

As shown in FIGS. 3–7, the instruction fetch stage for fetching an instruction from the instruction memory 1400 begins at time t3 of the preceding machine cycle M0. In most situations, the instruction fetch stage ends at time t4 of the next machine cycle M1, as shown in FIGS. 3 and 5–7. However, as is shown in FIG. 4 and as will be explained shortly, when a conflict for accessing the instruction memory 1400 or the external memory 2500 occurs, the instruction fetch stage will end at time t4 of an additional machine cycle M1A if the conflict is not resolved in favor of the address outputted onto the PC address bus 1116 by the program control unit 1500. But, if the conflict is resolved in favor of the address on the PC address bus 1116, then the instruction fetch stage will end at time t4 of the next machine cycle M1 as shown in the FIGS. 3 and 5–7.

Program Control Unit

Turning to FIG. 12, the program control unit (PCU) 1500 includes a program control (PC) register 1502 (pc0), a buffer 1512, and a local PCU controller 1550. The local PCU controller 1550 receives the clock signals CK0 and CK1 from the timing unit 1300. In response, the local PCU controller 1550 generates a control signal for controlling the buffer 1512 to output an address A17–0 stored by the PC register 1502 onto the PC address bus 1116.

Referring back to FIG. 5, the local PCU controller also generates control signals for (a) enabling the second program control register 1503 (pc1) to store the address that was just output and also stored by the first program control register 1502 (pc0) during the last machine cycle, (b) enabling the third program control register 1504 (pc2) to store the address that was just output and also stored by the second program control register 1503 (pc1) during the last machine cycle, and (c) enabling the fourth program control register 1505 (pc3) to store the address that was just output and also stored by the third program control register 1503 (pc2) during the last machine cycle. As will be evident later, this is done in order to keep track of addresses for subsequent program branching.

Figure 13A:
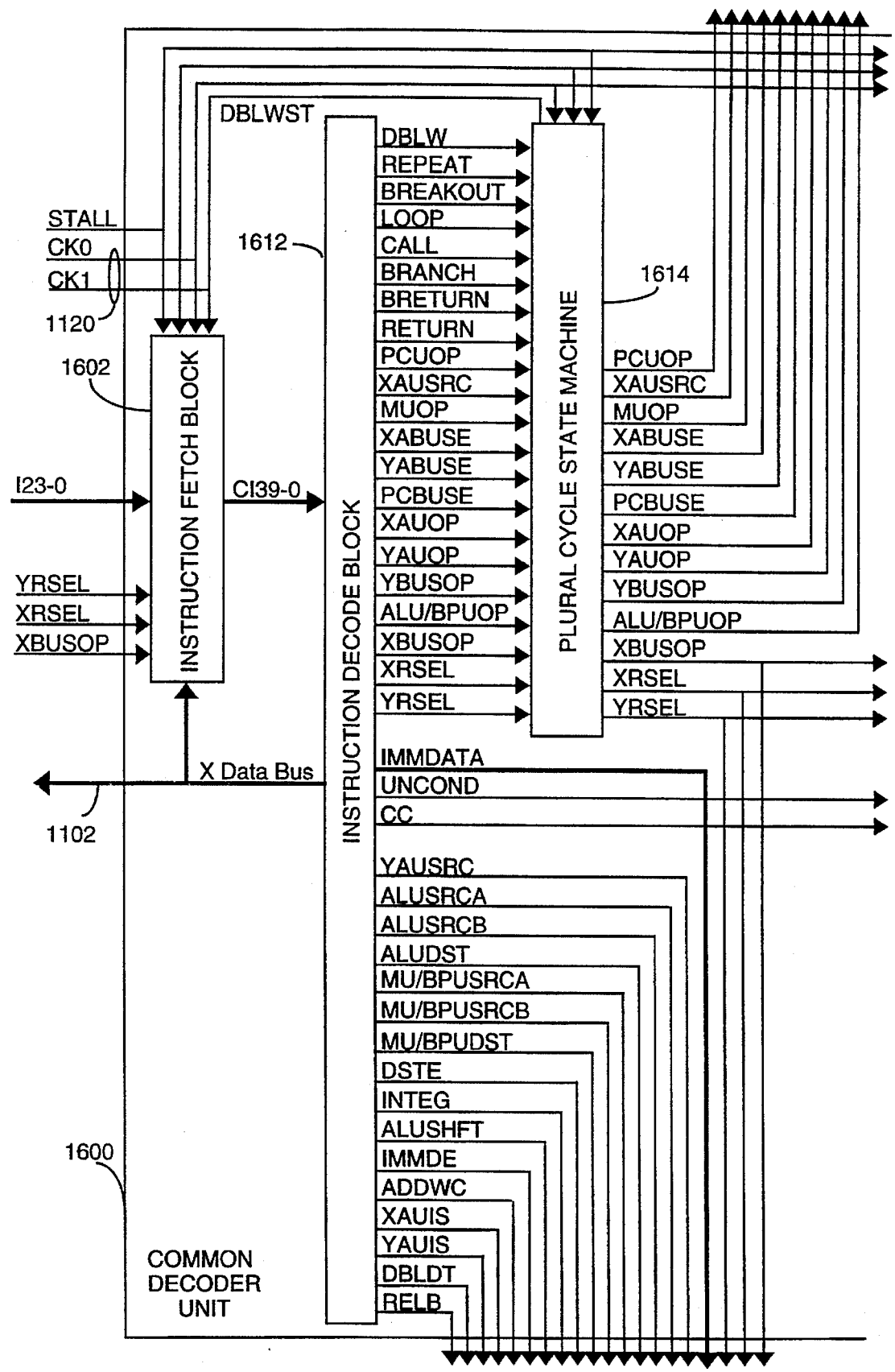
FIGS. 13(a) and 13(b) is a block diagram of the common decoder unit of the DSP of the present invention.
Figure 13B:
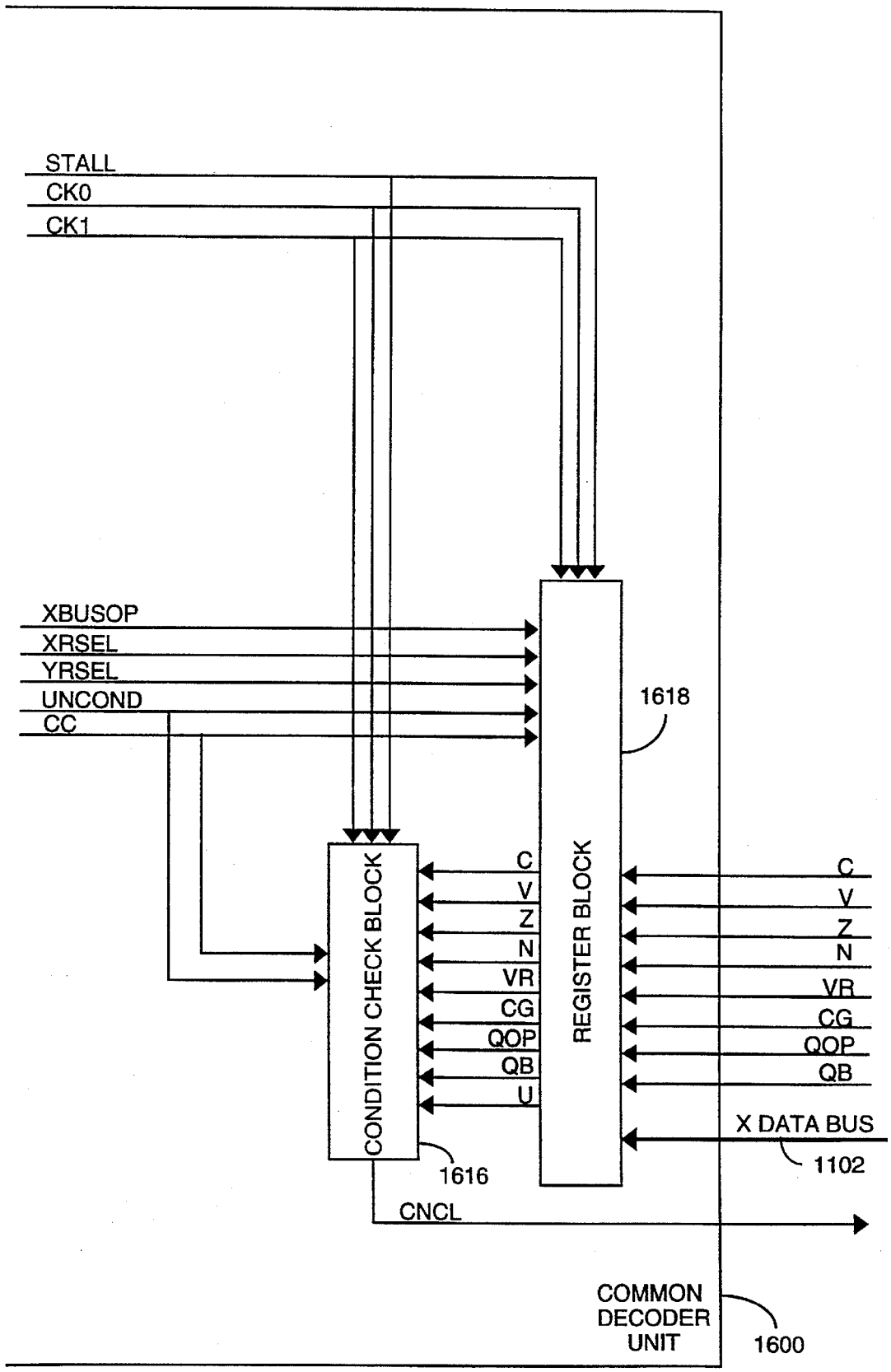

Also, as will be explained in greater detail later, at the same time that the address A17–0 is being outputted onto the PC address bus 1116, the common decoder unit 1600 generates and outputs a PC address bus enable (PCBUSE) signal as shown in FIG. 13(a). When a valid address A17–0 is not being outputted on the PC address bus 1116 by the program control register 1502 (pc0), the PCBUSE signal indicates this as well. The PCBUSE signals are provided to the parallel arbiter 2100.

In the preferred embodiment, the PC address bus 1116 is an 18 bit address bus and the PC register 1502 outputs an 18 bit address A17–0 onto this bus. However, one skilled in the art will realize that other bit lengths may be used as well.

Instruction and External Memory Arbiters

Figure 15:
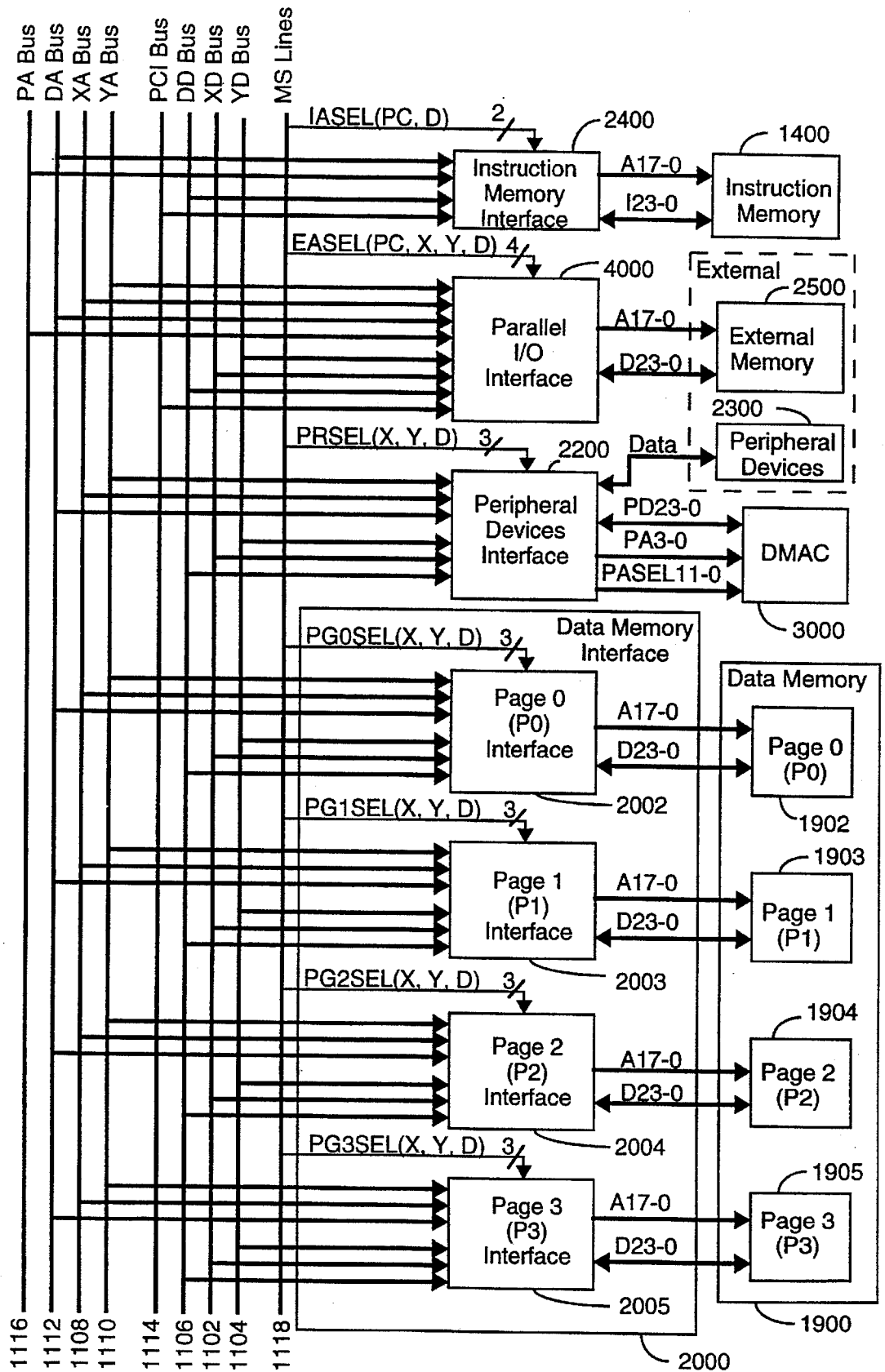
FIG. 15 is a block diagram of the interfaces of the DSP for controlling memory access.

Referring to FIG. 15, both the instruction memory 1400 and the external memory 2500 may store instructions of the instruction set shown in FIGS. 8(a)–8(f) and 9(a)–9(k). Thus, the address on the PC address bus 1116 will be an address either mapped to the instruction memory 1400 or mapped to the external memory 2500. Furthermore, the instruction memory 1400 and the external memory 2500 are single port memories. But, the interface 2400 for the instruction memory receives addresses from both the PC address bus 1116 and the DMAC address bus 1112 and the parallel I/O interface 4000 for the external memory 2500 receives addresses from the PC address bus 1116, the DMAC address bus 1112, the X address bus 1108, and the Y address bus 1110. As a result, conflicts in accessing the instruction memory 1400 or the external memory 2500 may result during the instruction fetch stage.

As shown in FIGS. 3–7, at time t3 of the preceding machine cycle M0, access arbitration for the instruction memory 1400 and the external memory 2500 begins. When no access conflicts arise, the arbitration ends at time t4 of the that machine cycle M0, as illustrated in FIGS. 3 and 5–7. However, when a conflict in accessing instruction memory 1400 or external memory 2500 for fetching an instruction does occur, then, as shown in FIG. 4, the arbitration ends at time t4 of the next machine cycle M1.

Figure 14:
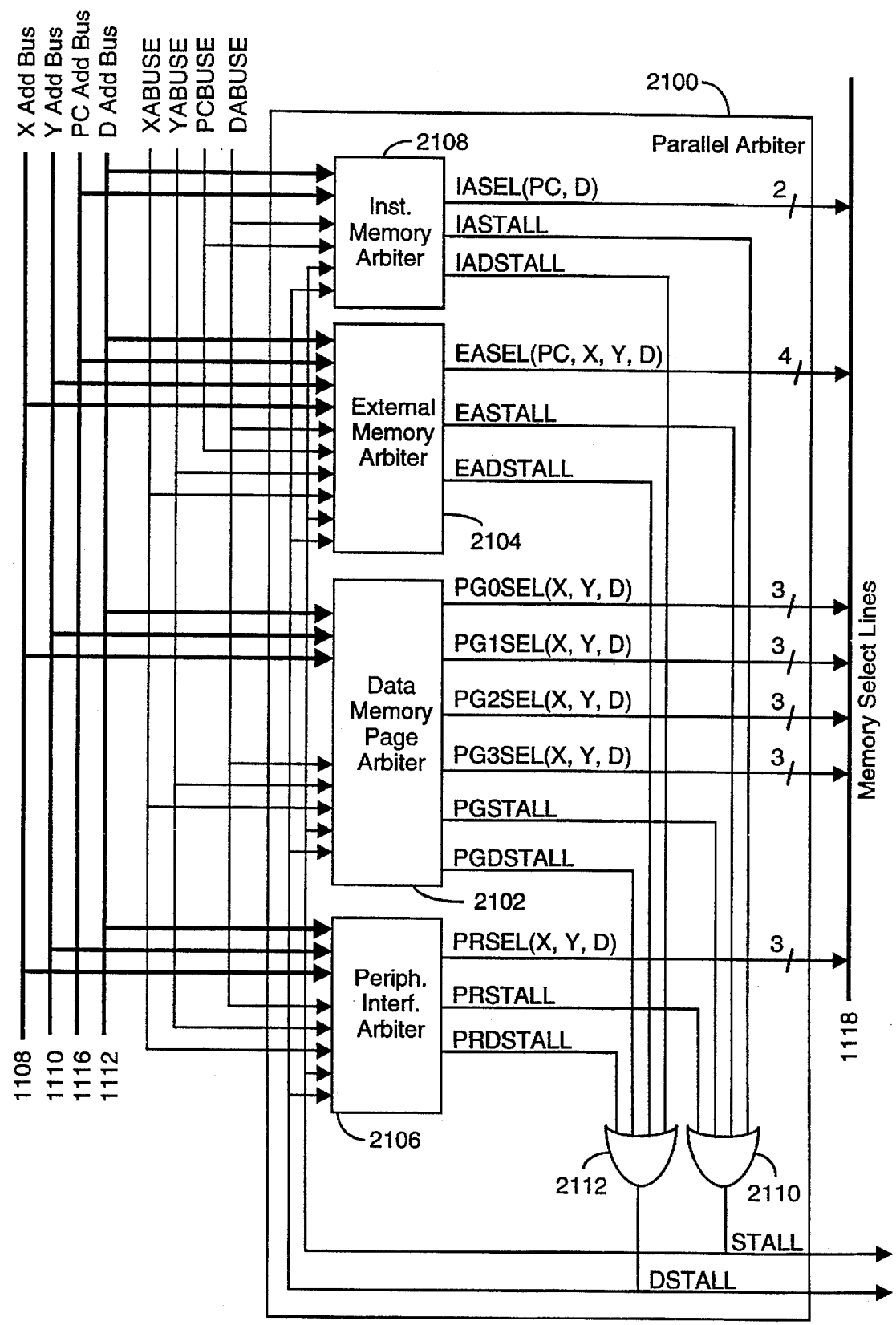
FIG. 14 is a block diagram of the parallel arbiter of the DSP of the present invention.

Referring to FIG. 14, the parallel arbiter 2100 includes an instruction memory arbiter 2108 which controls access to and resolves conflicts in accessing the instruction memory 1400 through the interface 2400. It also includes an external memory arbiter 2104 which controls access to and resolves conflicts in accessing the external memory 2500 through the parallel I/O interface 4000.

The instruction memory arbiter 2108 receives (a) addresses A17–0 from the PC address bus 1116 and the DMAC address bus 1112, and (b) a PC address bus enable (PCBUSE) signal from the common decoder unit 1600 and a DMAC address bus enable (DABUSE) signal from the DMAC 3000. The external memory arbiter 2104 receives (a) addresses A17–0 from the PC address bus 1116, the DMAC address bus 1112, the X address bus 1108, and the Y address bus 1110, and (b) the PCBUSE and DABUSE signals and an X address bus enable (XABUSE) signal and Y address bus enable (YABUSE) signal from the common decoder unit 1600.

As was indicated earlier, the PCBUSE signal indicates whether or not the PC address bus 1116 contains a valid address for accessing the instruction memory 1400 or the external memory 1900. The DABUSE signal indicates whether or not the DMAC address bus 1112 contains a valid address for accessing the instruction memory 1400, the external memory 1900, the data memory 1900, the peripheral devices interface 2300, or the DMAC 3000. Furthermore, the XABUSE and YABUSE signals respectively indicate whether or not the X address bus 1108 and Y address bus 1110 contain valid addresses for accessing the data memory 1900, the external memory 1900, the peripheral devices interface 2300, or the DMAC 3000.

The instruction memory arbiter 2108 decodes the addresses on the PC address bus 1116 and the DMAC address bus 1112 to determine if either or both of these addresses are located in the instruction memory 1400. Referring to FIGS. 14 and 15, if one or both of the PCBUSE and DABUSE signals are received and one or both of the addresses on the PC address bus 1116 and the DMAC address bus 1112 are located in the instruction memory 1400, then the instruction memory arbiter 2108 generates (a) a one bit PC address and instruction bus select (IASELPC) signal, and/or (b) a one bit DMAC address and instruction bus select (IASELD) signal. The IASELPC and IASELD signals are for respectively controlling the interface 2400 to select the PC address bus 1116 and instruction bus 1114 and the DMAC address bus 1112 and data bus 1106 for accessing the instruction memory 1400.

Similar to the instruction memory arbiter 2108, the external memory arbiter 2104 decodes the addresses on the PC address bus 1116, the DMAC address bus 1112, the X address bus 1108, and the Y address bus 1110 to determine if one or more of these addresses are located in the external memory 2500. Referring to FIGS. 14 and 15, if one or more of the PCBUSE, DABUSE, XABUSE, and the YABUSE signals are received and one or more of the addresses on the PC address bus 1116, DMAC address bus 1112, X address bus 1108, and the Y address bus 1110 are located in the external memory 2500, then the external memory arbiter 2104 generates (a) a one bit PC address and instruction bus select (EASELPC) signal, (b) a one bit DMAC address and data bus select (EASELD) signal, (c) a one bit X address and data bus select (EASELX) signal, and/or (d) a one bit Y address and data bus select (EASELY) signal. The EASLPC, EASELD, EASELX, and EASELY signals are for respectively controlling the interface 4000 to select the PC address bus 1116 and instruction bus 1114, the DMAC address bus 1112 and data bus 1106, the X address bus 1108 and data bus 1102, and the Y address bus 1110 and data bus 1104 for accessing the external memory 2500.

However, referring to FIG. 15, as mentioned earlier, the instruction memory 1400 and the external memory 2500 are single port memories. Thus, only one of the IASELPC and IASELD signals can be outputted at a time during a particular machine cycle to the interface 2400 by the instruction memory arbiter 2108. And, only one of the EASELPC, EASELD, EASELX, and EASELY signals can be outputted at a time during a particular machine cycle to the interface 4000 by the external memory arbiter 2104.

As a result, if only one of the IASELPC and IASELD signals is generated at a time during a particular machine cycle, it is directly outputted by the instruction memory arbiter 2108. Similarly, if only one of the EASELPC, EASELD, EASELX, and EASELY signals is generated at a time during a particular machine cycle, it is directly outputted by the external memory arbiter 2108. In this case, the three stage instruction, fetch, decode, and execute pipeline proceeds as shown in FIG. 3.

However, in the case where both the IASELPC and the IASELD signals are generated at the same time (i.e., a conflict in accessing instruction memory 1400, the instruction memory arbiter 2108 outputs during different machine cycles these signals based on the following priority scheme: (1) an asserted DABUSE signal held over from a previous arbitration is given first priority, (2) an asserted PCBUSE signal is given second priority, and (3) an asserted DABUSE signal not held over from a previous arbitration is given last priority. At the same time, the instruction memory arbiter 2108 issues a stall (IASTALL) signal for stalling during the access conflict the operation of the DSP core 3500 or a DMAC stall (IADSTALL) signal for stalling during the access conflict the operation of the DMAC 3000 based on the just discussed priority scheme.

And, in the case where more than one of the EASELPC, EASELD, EASELX and EASELY signals are generated at the same time (i.e., a conflict in accessing external memory 2500), the external memory arbiter 2104 outputs during different machine cycles these signals based on the following priority scheme: (1) an asserted DABUSE signal held over from a previous arbitration is given first priority, (2) an asserted XABUSE signal is given second priority, (3) an asserted YABUSE signal is given third priority, (4) an asserted PCBUSE signal is given fourth priority, and (5) an asserted DABUSE signal not held over from a previous arbitration is given last priority. Based on the same priority scheme, the external memory arbiter 2104 issues at the same time a stall (EASTALL) signal for stalling during the access conflict the operation of the DSP core 3500 or a DMAC stall (EADSTALL) signal for stalling during the access conflict the operation of the DMAC 3000.

Whenever an IASTALL signal or an EASTALL signal is issued, it is collected by the OR gate 2110 and outputted to the DSP core 3500 as the STALL signal. As a result, operation of the DSP core 3500 is stalled as shown in FIG. 4. However, when the IADSTALL signal or the EADSTALL signal is issued, it is collected by the OR gate 2112 and outputted to the DMAC 3000 as the DSTALL signal. In this case, the operation of the DMAC 3000 is stalled but the three stage pipeline of the DSP core 3500 proceeds as in FIG. 3.

Referring back to FIG. 12, the STALL signal is received by the local PCU controller 1550. When it does receive this signal, it generates a control signal for controlling the PC register 1502 (pc0) to not load the new instruction memory address A17–0 calculated by the program counter (PC) adder 1506 or supplied from the X data bus 1108. This is done so that the PC address bus 1116 will continue to provide during the next machine cycle M1A the instruction memory 1400 with the address A17–0 which was held over from the last machine cycle M1.

Instruction Memory

Referring to FIG. 15, as was mentioned earlier, the instruction memory 1400 and the external memory 2500 store a sequence of instructions selected from the instruction set described earlier and shown in FIGS. 8(a)–8(f) and 9(a)–9(k). This sequence of instructions defines a program to be executed by the DSP 1100. In the preferred embodiment, the instruction memory 1400 and the external memory 2500 are random access memories (RAM). However, one skilled in the art will appreciate that other types of memories may be used.

When the interface 2400 receives the IASELPC signal, it provides the address A17–0 on the PC address bus 1116 to the instruction memory 1400. In response, the instruction memory 1400 outputs to the interface 2400 the 24 bit instruction I23–0 located at the address A17–0 provided to the instruction memory 1400. The interface 2400 then outputs the instruction I23–0 onto the PC instruction bus 1114. Similarly, when the parallel I/O interface 4000 receives the EASELPC signal, it provides the address A17–0 on the PC address bus 1116 to the external memory 2500. In response, the external memory 2500 outputs to the interface 4000 the 24 bit instruction I23–0 located at the address A17–0 provided to the external memory 2500. The interface 4000 then outputs the instruction I23–0 onto the PC instruction bus 1114.

Referring to FIGS. 3 and 5–7, the instruction I23–0 continues to be provided on the PC instruction bus 1114 from time t1 to time t4 of the current machine cycle M1 when no access arbitration for the instruction memory occurs. Referring to FIG. 4, when an access conflict for instruction memory 1400 or external memory 2500 has not been resolved in favor of the address on the PC address bus 1116, the instruction I23–0 continues to be provided on the PC instruction bus 1114 until time t4 of the additional machine cycle M1A.

As was indicated earlier, in the preferred embodiment, the instruction memory 1400 and the external memory 2500 store and output 24 bit instructions I23–0. Thus, in the preferred embodiment, the PC instruction bus 1114 is a 24 bit data bus. However, one skilled in the art will realize that other bit lengths may be used as well including 16 and 32 bits.

Instruction Fetch Block

Figure 16:
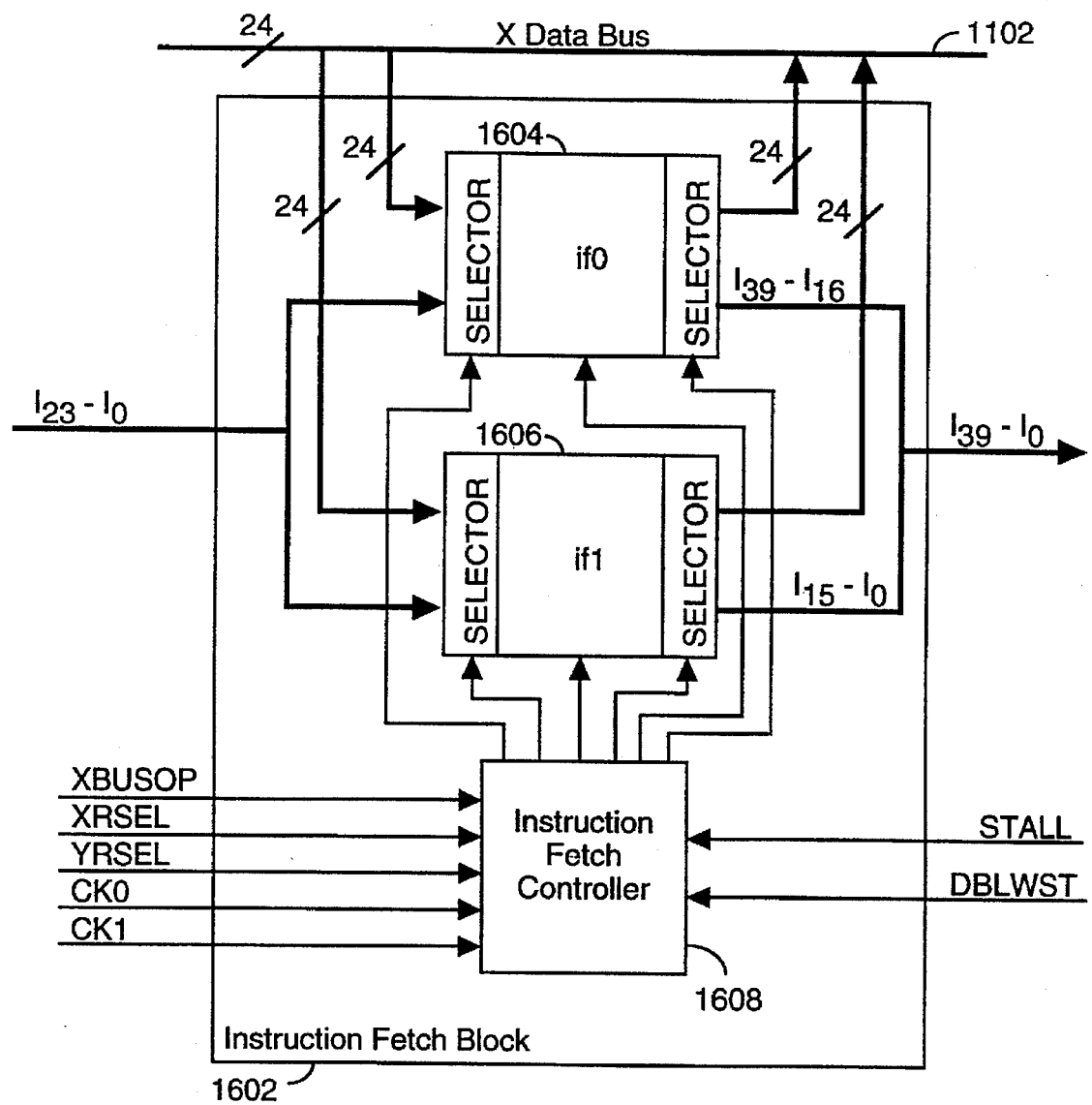
FIG. 16 is a block diagram of the instruction fetch block of the common decoder unit.

Turning to FIG. 13(a), the common decoder unit 1600 includes an instruction fetch block 1602. As shown in FIG. 16, the instruction fetch block includes two instruction fetch registers 1604 and 1606 and a local instruction fetch controller 1608.

The first instruction fetch register 1604 is coupled to the PC instruction bus 1114 to receive all of the bits of an instruction I23–0 on this bus. On the other hand, the second instruction fetch register 1606 is coupled to the PC instruction bus 1114 to receive only those bits I15–0 which will contain the immediate data field ($Data/$Address) of the second word of a double word instruction. As will be explained shortly, the first and second instruction fetch registers 1604 and 1606 in combination store a composite instruction CI39–0 with the first instruction fetch register 1604 storing the most significant bits CI39–16 of the composite instruction and the second instruction fetch register 1606 storing the least significant bits CI15–0.

The instruction fetch register controller 1608 receives as an input a double word instruction status (DBLWST) signal from the plural cycle state machine 1614 of the common decoder unit 1600. As shown in FIG. 13(a), and as will be explained in detail later, the DBLWST signal indicates that a double word instruction is being fetched when it receives from the instruction decode block 1612 a DBLW signal indicating that a double word instruction has been decoded. Furthermore, the DBLWST signal indicates that a single word instruction was fetched if the DBLW signal indicates that a single word instruction was decoded.

Referring to FIG. 16, if the DBLW signal indicates that a single word instruction was fetched, then the instruction fetch controller 1608 in response generates a control signal for controlling the first instruction fetch register 1604 to store the next instruction I23–0 provided on the PC instruction bus 1114. In addition, the instruction fetch controller 1608 generates a control signal for controlling the second fetch instruction register 1606 not to store the bits of the next instruction I23-0 that it receives. Thus, in this case, the relevant bits CI39-16 of the composite instruction CI39-0 are those contained in the first instruction fetch register 1604.

However, when the instruction fetch controller 1608 receives the DBLWST signal, it generates a control signal for enabling the second instruction register 1606 to input the bits I15-0 of the second word of the instruction which contain the immediate data field ($Data/$Address). In addition, it generates a control signal for preventing the first instruction register 1604 from storing this instruction. Thus, in this case, the first instruction fetch register 1604 continues to store the first word CI39-16 of the instruction and the second instruction fetch register 1606 stores the immediate data bits CI15-0 contained in the second word of the double word instruction.

The local instruction fetch controller 1608 is coupled to the timing unit 1300 for receiving the clock signals CK0 and CK1. Referring to FIGS. 3, 4, 6, and 7, for a single word instruction, the single word instruction CI39-16 is stored in the first instruction fetch register 1604 from time t2 to time t4 of the last machine cycle M1 of the instruction fetch stage. However, referring to FIG. 5, for a double word instruction, the first word CI39-16 of the instruction is stored in the first instruction fetch register 1604 from time t2 to time t4 of the machine cycle M1 of the instruction fetch stage and the second word CI15-0 is stored in the second instruction fetch register 1606 from time t2 to time t4 of the next machine cycle M1A.

As was mentioned earlier, in the preferred embodiment, a 24 bit instruction is used. Thus, in the preferred embodiment, the first instruction fetch register 1604 is a 24 bit register and is coupled to the PC instruction bus 1114 to receive all 24 bits I23-0 of an instruction on this bus. On the other hand, the second instruction fetch register 1606 is coupled to the PC instruction bus 1114 to receive only the 16 least significant bits I15-0 of an instruction on this bus. In combination, the first and second instruction fetch registers 1604 and 1606 store a composite 40 bit instruction CI39-0 the first instruction fetch register 1604 storing the 24 most significant bits CI39-16 and the second instruction fetch register 1606 storing the 16 least significant bits CI15-0.

Although the instruction fetch registers 1604 and 1606 together provide a 40 bit composite instruction CI39-0 for decoding, the only time when a fetched 24 bit instruction is actually lengthened for decoding is when a double word instruction is fetched. In other words, the least significant bits CI15-0 of the composite instruction CI39-0 are not relevant to the decoding process for single word instructions. This will become more apparent in the discussion for the instruction decode stage.

The instruction fetch register controller 1608 is also coupled to the parallel arbiter 2100 for receiving the STALL signal. When it receives this signal, it controls the two fetch registers 1602 and 1604 so that they do not input the instruction I23-0 on the PC instruction bus 1114.

INSTRUCTION DECODE STAGE

As shown in FIGS. 13(a) and (b), the common decoder unit 1600 includes the instruction fetch block 1602, an instruction decode block 1612, the plural cycle state machine 1614 (i.e., sequence controller), a condition check block 1616, and a register block 1618.

Referring back to FIG. 16 as well as FIGS. 3-7, from time t0 to time t2 of the first machine cycle M2 of the decoding stage, the instruction fetch registers 1604 and 1606 of the instruction fetch block 1602 output the composite instruction CI39-0 that was last stored by them. This composite instruction CI39-0 is then provided to the instruction decode block 1612 as shown in FIG. 13(a).

Referring to FIG. 16 again, as was suggested earlier, the bits CI39-16 output by the first instruction fetch register 1604 contain a single word instruction or the first word of a double word instruction. In the case of a single word instruction, the remaining bits CI15-0 output by the second instruction fetch register 1606 are not relevant to the decoding process. And, if the second word of the double word instruction has not been fetched into the second instruction fetch register 1606, then the remaining bits CI15-0 output by the second instruction fetch register 1606 are not relevant to the decoding process either. However, if the second word has been fetched into the second instruction fetch register 1606, then remaining bits CI15-0 contain the data provided by the second word and are relevant to the decoding process.

The decoding by the instruction decode block 1612 begins for each composite instruction CI39-0 at time t0 of the machine cycle M2. Under normal conditions, it ends at time t2 of the same machine cycle M2, as shown in FIGS. 3, 4, and 7. The local decoding by the program control unit (PCU) 1500, the execution unit (EXU) 1700, and the address unit (AU) 1800 occurs from time t2 of the machine cycle M2 and under normal conditions ends at time t2 of the next machine cycle M3, as shown in FIGS. 3, 4, and 7. This is so that the operations defined by the decoded instruction may be executed in machine cycle M3.

Referring to FIG. 5, for double word instructions, the first round of decoding by the instruction decode block 1612 begins at time t0 of machine cycle M1A and ends at time t2 of the same machine cycle. During this round of decoding, the instruction decode block 1612 simply determines if the instruction being decoded is a double or single word instruction and issues the DBLW signal to the plural cycle state machine 1614. In response to a DBLW signal indicating that the instruction is a double word instruction, the plural cycle state machine 1614 controls the program sequence from time t2 to time t4 of the machine M1A by generating no operation (NOP) control signals so that no operations occur in the machine cycle M2. These signals are locally decoded by the execution unit (EXU) 1700, address unit (AU) 1800, and program control unit (PCU) 1500 from time t2 of the machine cycle M1A to time t2 of the machine cycle M2.

Then, the second round of decoding by the instruction decode block 1612 takes place from time t0 to time t2 of machine cycle M2. During this round of decoding, the instruction decode block 1612 decodes the double word instruction and generates control signals so that the operations defined by the instruction are executed in the machine cycle M3. These signals are locally decoded from time t2 of machine cycle M2 to time t2 of machine cycle M3.

Furthermore, as shown in FIG. 6, for standard branch, loop, call, breakout, and return instructions the decoding by the instruction decode block 1612 takes place from time t0 to time t2 of machine cycle M2. The instruction decode block 1612 decodes the instruction and generates control signals so that the operations defined by the above described instructions are executed in the machine cycle M2A. In the case of standard branch, loop, call, and breakout instructions, these control signals will define a branching operation to be implemented the program control unit 1500. In the case of a return instruction, these control signals will define an operation for popping a return address from a stacking area in the data memory 1900 or the external memory 2500. These signals are locally decoded from time t2 of machine cycle M2 to time t2 of machine cycle M2A so that execution of the instruction will take place in machine cycle M2A.

Moreover, during the decoding by the instruction decode block 1612, it also generates a BRANCH, LOOP, CALL, BREAKOUT, or RETURN signal to indicate which type of branching instruction was decoded. Then, as will be described in detail later, if the BRANCH, LOOP, or BREAKOUT signals respectively indicate that a standard branch, loop, or breakout instruction was decoded, the plural cycle state machine 1614 controls the program sequence from time t2 of machine cycle M2 to time t2 of the machine M2A and then again from time t2 of machine cycle M2A to time t2 of machine cycle M2B by generating NOP control signals so that no operations take place in machine cycles M2B and M3.

However, if the CALL signal indicates that a call instruction was decoded, then the plural cycle state machine 1614 controls the program sequence from time t2 of machine cycle M2 to time t2 of machine cycle M2A by generating control signals so that the contents of the condition code register 1674 are pushed to data memory 1900 or external memory 2500 during machine cycle M2B. And, then from time t2 of machine cycle M2A to time t2 of machine cycle M2B, the plural cycle state machine 1614 controls the program sequence by generating control signals so that the return address is pushed to the stacking area of the data memory 1900 or the external memory 2500 during machine cycle M3.

Lastly, if the RETURN signal indicates that a return instruction was decoded, then the plural cycle state machine 1614 controls the program sequence from time t2 of machine cycle M2 to time t2 of the machine M2A by generating control signals so that the contents of the condition code register 1674 are popped from the stacking area of the data memory 1900 or external memory 2500 during the machine cycle M2B. And, the plural cycle state machine 1614 controls the program sequence from time t2 of machine cycle M2A to time t2 of machine cycle M2B by generating NOP control signals so that no operations take place in machine cycle M3.

Figure 17:
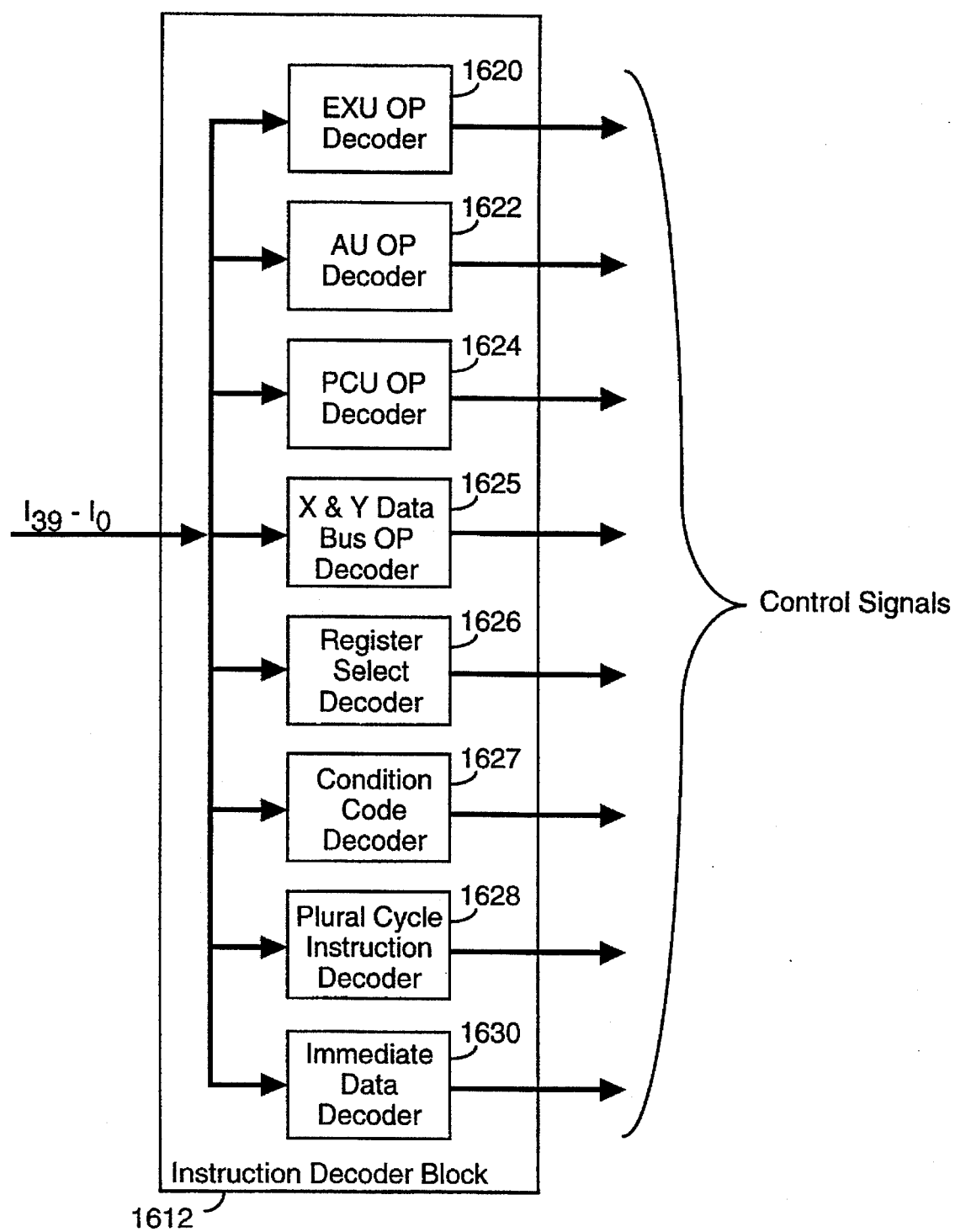
FIG. 17 is a block diagram of the instruction decode block of the common decoder unit.

In response to receiving the composite instruction CI39-0, the instruction decode block 1612 generates and outputs control signals for controlling the DSP 1100 to perform the operations defined by the instruction being decoded. As shown in FIG. 17, the instruction decode block 1612 includes an execution unit (EXU) operation decoder 1620, an address unit (AU) operation decoder 1622, a program control unit (PCU) operation decoder 1624, an X and Y data bus operation decoder 1625, a register select decoder 1626, a condition code decoder 1627, a plural cycle instruction decoder 1628, and an immediate data decoder 1630.

Execution Unit Operation Decoder

Figure 18:
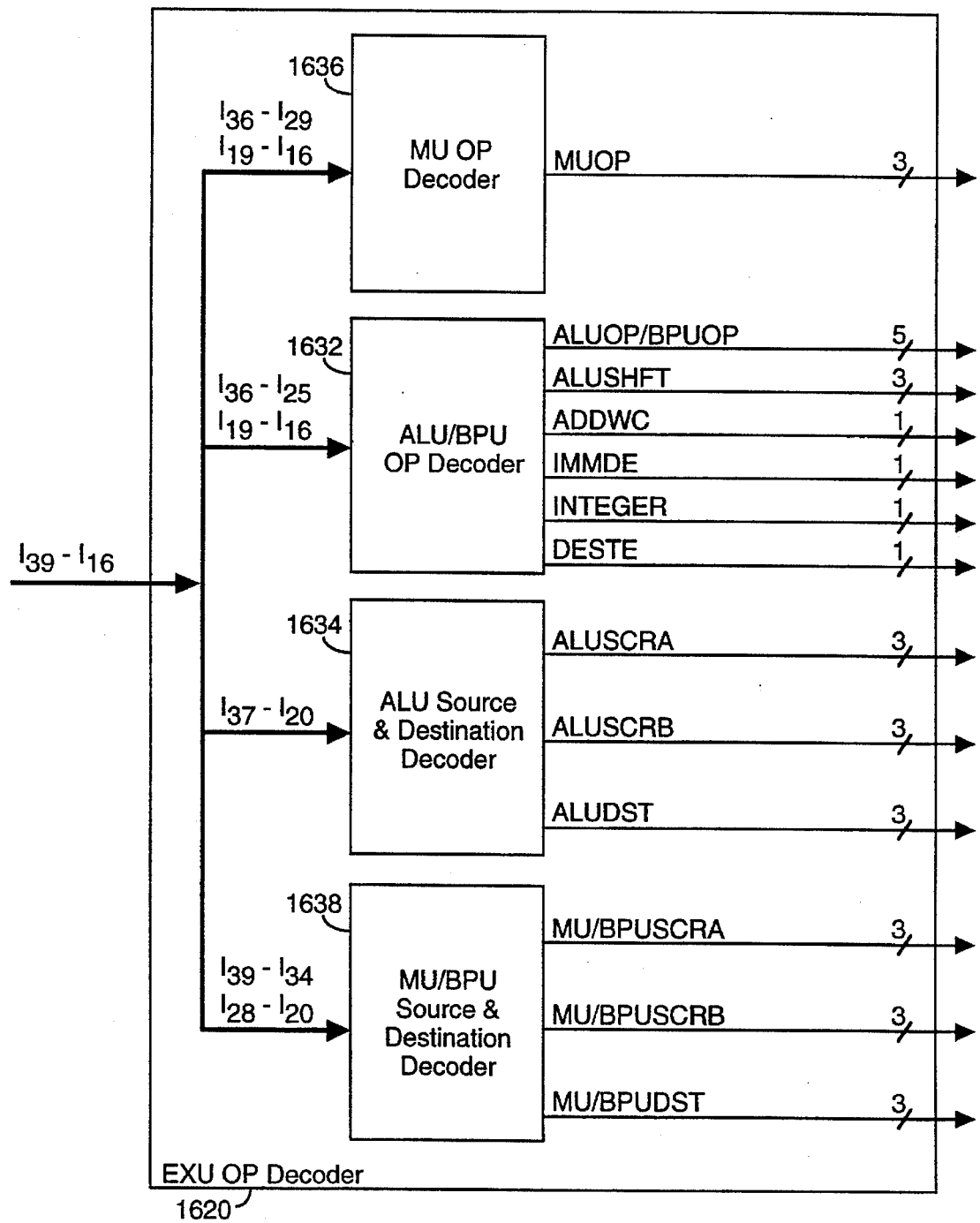
FIG. 18 is a block diagram of the execution unit operation decoder of the instruction decode block.

The execution unit (EXU) decoder 1620 is shown in FIG. 18. It receives the bits CI39-16 outputted by the first instruction fetch register 1604. In response to receiving these bits CI39-16, the EXU decoder 1620 generates and outputs a number of control signals for controlling operation of the execution unit (EXU) 1700. To generate these signals, the execution unit (EXU) decoder 1620 includes an ALU/BPU operation decoder 1632, an ALU source and destination decoder 1634, an MU operation decoder 1636, and an MU/BPU source and destination decoder 1638.

Figure 19:
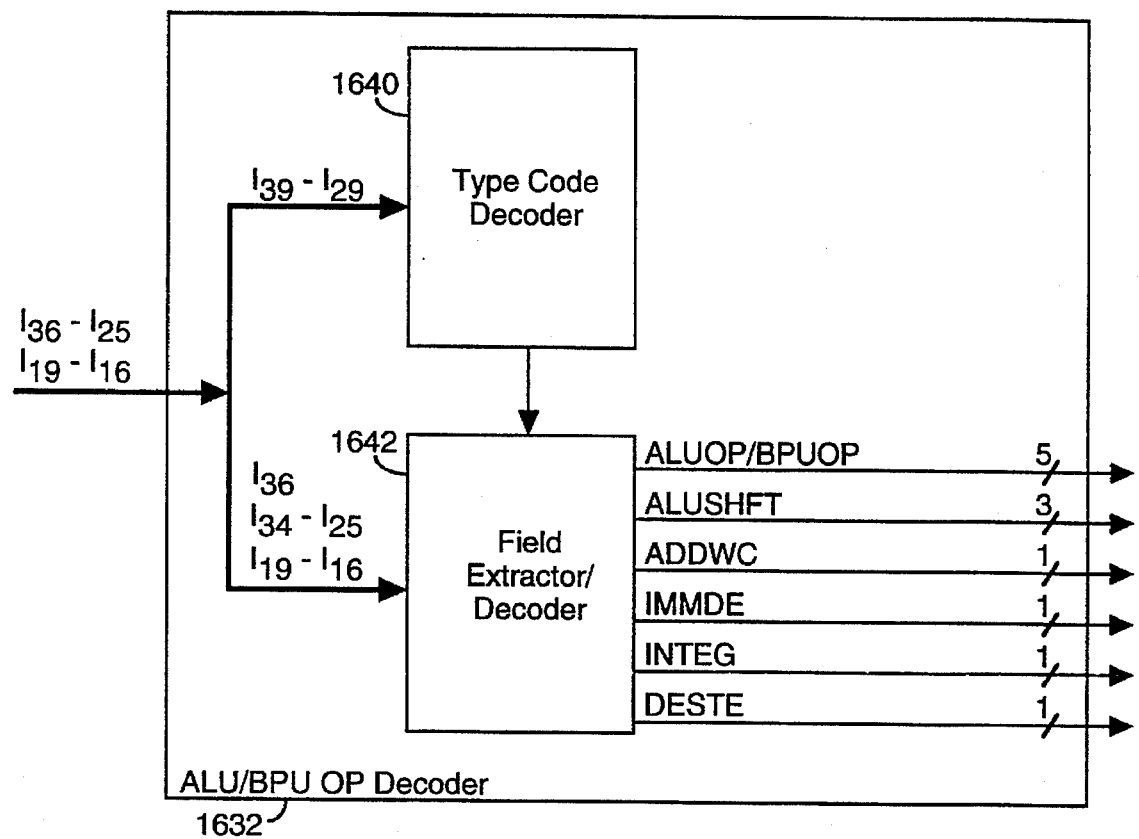
FIG. 19 is a block diagram of the ALU/BPU operation decoder of the execution unit operation decoder.

As shown in FIG. 19, the ALU/BPU operation decoder 1632 decodes the received instruction and in response generates and outputs various signals. Referring to FIG. 10, these signals control the operation of the arithmetic and logic unit (ALU) 1712 and the bit processing unit (BPU) 1714.

FIG. 19 also shows the conceptual architecture of the ALU/BPU operation decoder 1632. It includes a type code decoder 1640 and a field extractor/decoder 1642.

Referring to FIGS. 8(a)–8(f), the type code decoder 1640 receives all of the possible bits of the composite instruction which could include the type code field (TY) for the instruction types 1134–1146, 1149, 1151, 1157, 1159, and 1161. Referring to FIG. 10, these are the instruction types that involve data processing operations by the ALU 1712 or the BPU 1714. In the preferred embodiment, the type code decoder 1640 receives the first 10 bits CI39–29 of the composite instruction. This is due to the fact that instruction type 1161 has the largest type code (TY) field for an instruction type involving an ALU or BPU operation and its type code field (TY) is 10 bits long.

From the received bits CI39–29, the type code decoder 1640 decodes the type code field (TY) of the composite instruction to determine its instruction type from among the instruction types listed in FIGS. 8(a)–8(f). If the instruction is one of the instruction types 1134–1146, 1149, 1151, 1157, 1159, or 1161 that involves an ALU operation or combination ALU and BPU operation, then the type code decoder 1640 provides the field extractor/decoder 1642 with information indicating the location and size (i.e., bit length) of the operation code field (OP). If the determined instruction type does not involve an ALU or BPU data processing operation, then the type code field decoder provides this information to the field extractor/decoder 1642 as well.

The field extractor/decoder 1642 receives all of the possible bits of the composite instruction which could include the operation code field (OP) for the instruction types 1134–1146, 1149, 1151, 1157, 1159, and 1161. As is evident from FIGS. 8(a)–8(f), in the preferred embodiment this would be the 14 bits CI36, CI34–25, and CI19–16 of the composite instruction.

In response to the information provided by the type code decoder 1640, the field extractor/decoder 1642 outputs (a) a 5 bit ALU and BPU operation (ALU/BPUOP) signal, (b) a 3 bit ALU shift function (ALUSHFT) signal, (c) a 1 bit add with carry or subtract with borrow (ADDWC) signal, (d) a 1 bit immediate data enable or ALU source B enable (IMMDE) signal, (e) a 1 bit integer or fraction arithmetic operation (INTEG) signal, and (f) a 1 bit ALU/BPU destination update enable and disable (DSTE) signal.

Referring also to FIG. 10, the ALU/BPUOP signal is for controlling ALU 1712 and BPU 1714 to perform the ALU and BPU operations defined in FIGS. 9(a)–(i). The ALUSHFT signal is for controlling the ALU 1712 to perform shift functions for the operations defined by the ALU/BPUOP signal. The ADDWC signal is for controlling the ALU 1712 to perform either additions with a carry bit or subtractions with a borrow bit for additions and subtractions defined by the ALU/BPUOP signal. The IMMDE signal is for controlling the ALU 1712 to use as an operand source immediate data output by the immediate data decoder 1630 or data stored by the register designated by the ALUSRCB signal (discussed later) output by the ALU source and destination decoder 1634. The INTEG signal is for controlling the ALU 1712 to use integer or fraction arithmetic for the ALU operation defined by the ALU/BPUOP signal. The DSTE signal is for controlling the destination registers designated by the ALUDST signal to store or not store the result produced by the ALU 1712 for an operation.

When the type code decoder 1640 provides the field extractor/decoder 1642 with information as to the size and location of the operation code field (OP), the field extractor/decoder extracts the appropriate bits from the bits CI36, CI34–25, and CI19–16 it has received and decodes them. In response, the signals ALU/BPUOP, ALUSHFT, ADDWC, IMMDE, INTEG, DSTE that it generates control the ALU 1712 and BPU 1714 for performing the specific ALU operation that the decoded instruction defines. However, when the type code decoder 1640 provides the field extractor/decoder 1642 with information that the instruction type of the instruction being decoded does not involve an ALU operation or ALU/BPU operation, then the field extractor/decoder 1642 generates an ALU/BPUOP signal indicating a no operation (NOP) for the ALU 1712 and BPU 1714. As shown in FIG. 10, the ALU/BPUOP, ALUSHFT, ADDWC, IMMDE, INTEG, DSTE signals are received by the local EXU controller 1750. This controller decodes these signals during the local decoding process referred to in FIGS. 3–7 and generates in response control signals described later in the discussion of the execution stage.

As was indicated earlier, the architecture shown in FIG. 19 for the ALU/BPU operation decoder 1632 is conceptual. In the actual implementation, the logic of the type code decoder 1640 and the field extractor 1642 is minimized and combined for generating the signals ALU/BPUOP, ALUSHFT, ADDWC, IMMDE, INTEG, DSTE from the bits CI36, CI34–25, and CI19–16 of the received composite instruction. This is done so that the decoding by the common decoder unit 1600 can be done in 20 ns (one half of a machine cycle) as shown in FIG. 3. As a result, the ALU/BPU operation decoder 1632 decodes the type code field (TY) to determine the location and size of the operation code field (OP) and simultaneously extracts and decodes the operation code field (OP).

Figure 20:
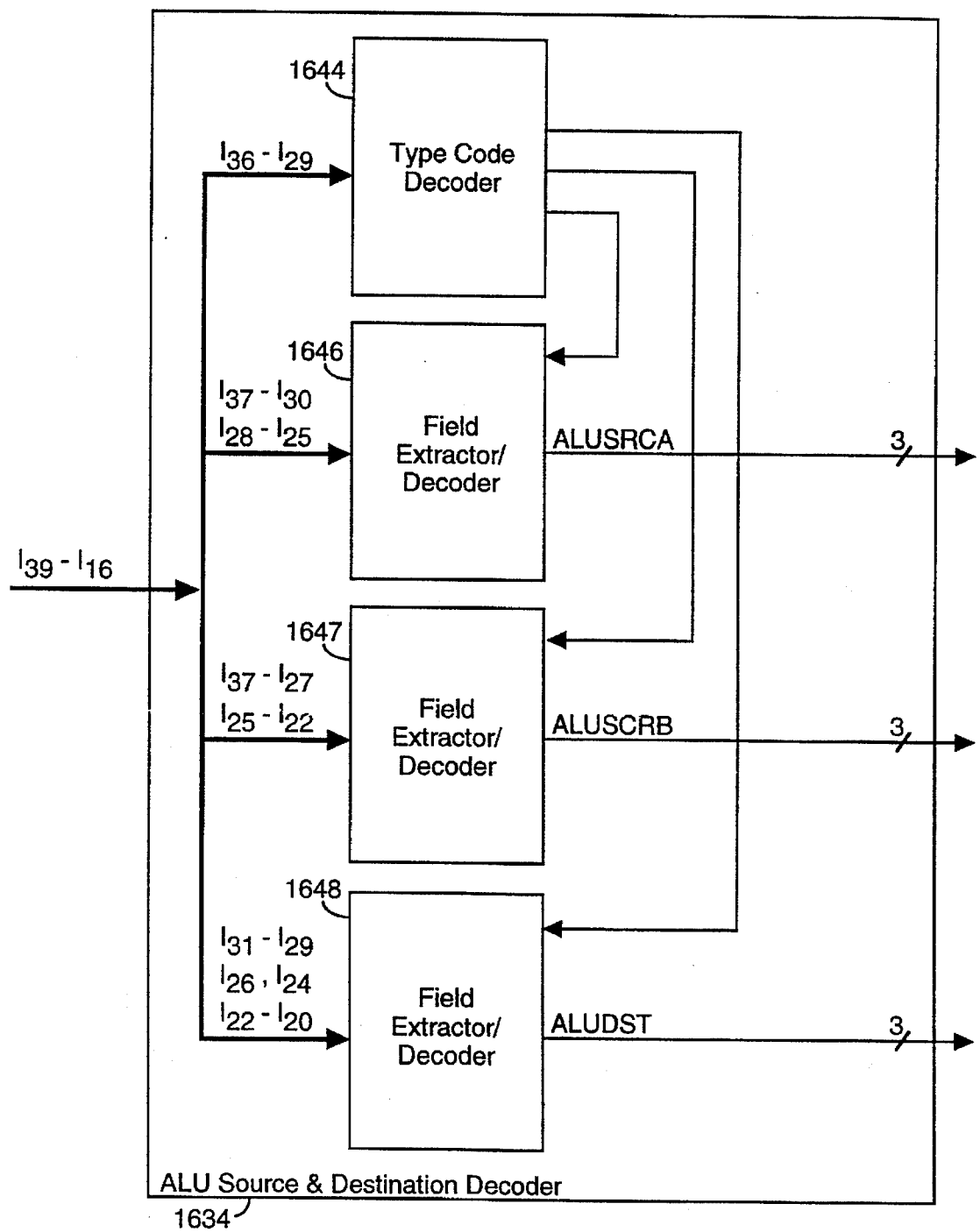
FIG. 20 is a block diagram of the ALU source and destination decoder of the execution unit operation decoder.

As shown in FIG. 20, the ALU source and destination decoder 1634 decodes the received instruction and in response generates and outputs various signals. Referring to FIG. 10, these signals are for controlling the data registers 1702–1709 of the execution unit (EXU) 1700 to act as sources or destinations for ALU operations controlled by the signals generated by the ALU/BPU operation decoder 1632.

FIG. 20 also shows the conceptual architecture of the ALU source and destination decoder 1634. It includes a type code decoder 1644 and three field extractor/decoders 1646–1648.

Referring also to FIGS. 8(a)–8(f), the type code decoder 1644 receives all of the possible bits of the composite instruction which could include the type code field (TY) for the instruction types 1134–1146, 1149, 1151, 1157, 1159, and 1161 which involve ALU data processing operations. As was indicated earlier for the type code decoder 1640 of the ALU/BPU operation decoder, in the preferred embodiment this would be the first 10 bits CI39–29 of the composite instruction.

From the received bits CI39–29, the type code decoder 1644 decodes the type code field (TY) of the composite instruction to determine its instruction type from among the instruction types listed in FIGS. 8(a)–8(f). If the instruction is one of the instruction types 1134–1146, 1151, 1157, 1159, and 1161 that involves an ALU operation, then the type code decoder 1644 provides (a) the field extractor/decoder 1646 with information indicating the location and size (i.e., bit length) of the first operand source fields (SX1, SRC1, or SRCX1), (b) the field extractor/decoder 1647 with information indicating the location and size of the only operand source field (SRC) or the second operand source field (SY1, SRCY1, or SRC1), and (c) the field extractor/decoder 1648 with information indicating the location and size of the operand destination field (D1, DST1, or DST). If the determined instruction type does not involve an ALU or ALU/BPU data processing operation or if the relevant source or destination fields are not present in the instruction, then the type code field decoder provides this information to the field extractor/decoders 1644–1646 as well.

The field extractor/decoder 1646 receives all of the possible bits of the composite instruction which could include the first source field (SX1, SCR1, SCRX1) for the instruction types 1134–1139, 1142, 1143, 1146, and 1151. These are the instruction types that include two source fields. As is evident from FIGS. 8(a)–8(f), in the preferred embodiment this would be the 12 bits CI37–30 and CI28–25 of the composite instruction.

In response to the information provided by the type code decoder 1644, the field extractor/decoder 1646 outputs a first ALU operand source (ALUSRCA) signal. Referring to FIG. 10, in the preferred embodiment, this is a three bit signal and is for controlling one of the eight data registers 1702–1709 (defined in FIGS. 9(a)–9(k)) of the execution unit (EXU) 1700 to output to source A of the ALU 1712 the operand stored in that register.

When the type code decoder 1644 provides the field extractor/decoder 1646 with information as to the size and location of the source fields (SX1, SRC1, or SRCX1), the field extractor/decoder extracts the appropriate bits from the bits CI37–30 and CI28–25 it has received and decodes them. In response, the field extractor 1646 generates the ALUSRCA signal which controls the one of the registers 1702–1709 designated in the source field (SX1, SRC1, or SRCX1) to output the operand that its stores to source A of the ALU 1712.

The field extractor/decoder 1647 receives all of the possible bits of the composite instruction which could include the only source field (SRC) for the instruction types 1140, 1141, 1144, 1145, and 1159 or the second source field (SY1, SRCY1, SRC2) for the instruction types 1134–1139, 1142, 1143, 1146, and 1151. As is evident from FIGS. 8(a)–8(f), in the preferred embodiment this would be the 15 bits CI37–27 and CI25–22 of the composite instruction.

In response to the information provided by the type code decoder 1644, the field extractor/decoder 1647 outputs a second ALU operand source (ALUSRCB) signal. Referring to FIG. 10, in the preferred embodiment, this is a three bit signal and is for controlling one of the eight data registers 1702–179 of the execution unit (EXU) 1700 to output to source B of the ALU 1712 the operand stored in that register.

When the type code decoder 1644 provides the field extractor/decoder 1647 with information as to the size and location of the source fields (SRC, SY1, SRCY1, or SRC2), the field extractor/decoder extracts the appropriate bits from the bits CI37–27 and CI25–22 it has received and decodes them. In response, the field extractor/decoder generates the ALUSRCB signal which controls the one of the registers 1702–1709 designated in the source field (SRC, SY1, SRCY1, or SRC2) of to output the operand that its stores to source B of the ALU 1712.

The field extractor/decoder 1648 receives all of the possible bits of the composite instruction which could include the operand destination field (D1, DST1, or DST) for the instruction types 1134–1146, 1149, 1151, 1157, 1159, and 1161. As is evident from FIGS. 8(a)–8(f), in the preferred embodiment this would be 8 bits CI31–29, CI26, CI24, and CI22–20 of the composite instruction.

In response to the information provided by the type code decoder 1644, the field extractor/decoder 1648 outputs an ALU operand destination (ALUDST) signal. Referring to FIG. 10, in the preferred embodiment, this is a three bit signal and is for controlling one of the eight data registers 1702–1709 of the execution unit (EXU) 1700 to store the output of the ALU 1712 in that register.

When the type code decoder 1644 provides the field extractor/decoder 1648 with information as to the size and location of the destination fields (D1, DST1, DST), the field extractor/decoder 1648 extracts the appropriate bits from the bits CI31–29, CI26, CI24, and CI22–20 it has received and decodes them. In response, the field extractor/decoder 1648 generates the ALUDST signal which controls the one of the registers 1702–1709 designated in the destination field (D1, DST1, DST) to store the output of the ALU 1712.

As shown in FIG. 10, the ALUSRCA, ALUSRCB, and ALUDST signals are received by the local execution unit (EXU) controller 1750. This controller decodes these signals during the local decoding process referred to in FIGS. 3–7 and generates in response control signals described later in the discussion of the execution stage.

The architecture shown in FIG. 20 for the ALU source and destination decoder 1634 is conceptual, as was alluded to earlier. In the actual implementation, the logic of the type code decoder 1644 and the field extractors 1646–1648 are minimized and combined for generating the signals ALUSRCA, ALUSRCB, and ALUDST from the bits CI37–20 of the received composite instruction. As was mentioned earlier for the ALU/BPU operation decoder, this is done for timing purposes. Therefore, in the actual implementation, the ALU source and destination decoder 1634 decodes the type code field (TY) to determine the location and size of the described ALU operation source and destination fields and simultaneously extracts and decodes these fields.

Figure 21:
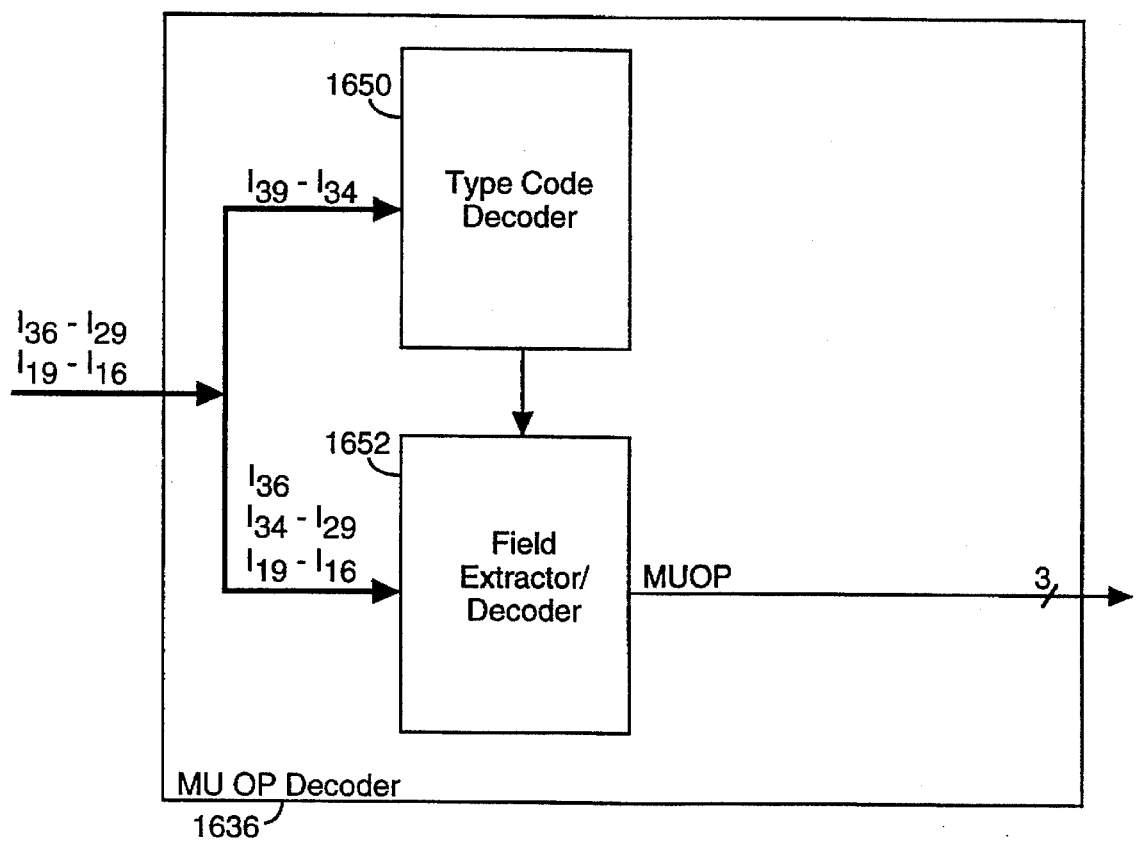
FIG. 21 is a block diagram of the multiplier unit (MU) operation decoder of the execution unit operation decoder.

As shown in FIG. 21, the multiplier unit (MU) operation decoder 1636 decodes the received instruction and in response generates and outputs various signals. Referring to FIG. 10, these signals are for controlling the operation of the multiplier unit (MU) 1716.

FIG. 21 also shows the conceptual architecture of the multiplier unit (MU) operation decoder 1636. It includes a type code decoder 1650 and a field extractor/decoder 1652.

Referring also to FIGS. 8(a)–8(f), the type code decoder 1650 receives all of the possible bits of the composite instruction which could include the type code field (TY) for the instruction types 1134–1139, 1146, and 1151. Referring to FIG. 10, these are the instruction types that can define data processing operations by the multiplier unit (MU) 1716. In the preferred embodiment, the type code decoder 1650 receives the first 6 bits CI39–34 of the composite instruction. This is due to the fact that instruction type 1139 has the largest type code (TY) field for an instruction type involving an MU operation and its type code field (TY) is 6 bits long.

From the received bits CI39–34, the type code decoder 1650 decodes the type code field (TY) of the composite instruction to determine its instruction type from among the instruction types listed in FIGS. 8(a)–8(f). If the instruction is one of the instruction types 1134–1139, 1146 or 1151 that involves MU operations, then the type code decoder 1650 provides the field extractor/decoder 1652 with information indicating the location and size (i.e., bit length) of the operation code field (OP). If the determined instruction type does not involve an MU data processing operation, then the type code field decoder provides this information to the field extractor/decoder 1652 as well.

The field extractor/decoder 1652 receives all of the possible bits of the composite instruction which could include the operation code field (OP) for the instruction types 1134–1139, 1146 and 1151. As is evident from FIGS. 8(a)–8(f), in the preferred embodiment this would be 11 bits CI36, CI34–29, and CI19–16 of the composite instruction.

In response to the information provided by the type code decoder 1650, the field extractor/decoder 1652 outputs a 3 bit MU operation (MUOP) signal. Referring also to FIG. 10, the MU signal is for controlling the multiplier unit (MU) 1716 to perform the MU operations defined in FIGS. 9(a)–(k) for the instruction types 1134–1139, 1146, and 1151.

When the type code decoder 1650 provides the field extractor/decoder 1652 with information as to the size and location of the operation code field (OP), the field extractor/decoder extracts the appropriate bits from the bits CI36, CI34–29, and CI19–16 it has received and decodes them. In response, the generated signal MUOP controls the multiplier unit (MU) 1716 for performing the specific MU operation that the decoded instruction defines. However, when the type code decoder 1650 provides the field extractor/decoder 1652 with information that the instruction type of the instruction being decoded does not involve an MU operation, then the field extractor/decoder 1652 generates an MUOP signal indicating a no operation (NOP) for the multiplier unit (MU) 1716. As shown in FIG. 10, the MUOP signal is received by the local execution unit (EXU) controller 1750. This controller decodes these signals during the local decoding process referred to in FIGS. 3–7 and generates in response control signals described later in the discussion of the execution stage.

In the actual implementation of the multiplier unit (MU) operation decoder 1636, the logic of the type code decoder 1650 and the field extractor 1652 are minimized and combined for generating the MUOP signal from the bits CI36–29 and CI19–16 of the received composite instruction. As was mentioned earlier, this is done for timing purposes so that the decoding by the common decoder unit 1600 can be done in 20 ns (one half of a machine cycle) as shown in FIG. 3. As a result, the multiplier unit (MU) operation decoder 1636 decodes the type code field (TY) to determine the location and size of the operation code field (OP) and simultaneously extracts and decodes the operation code field (OP).

Figure 22:
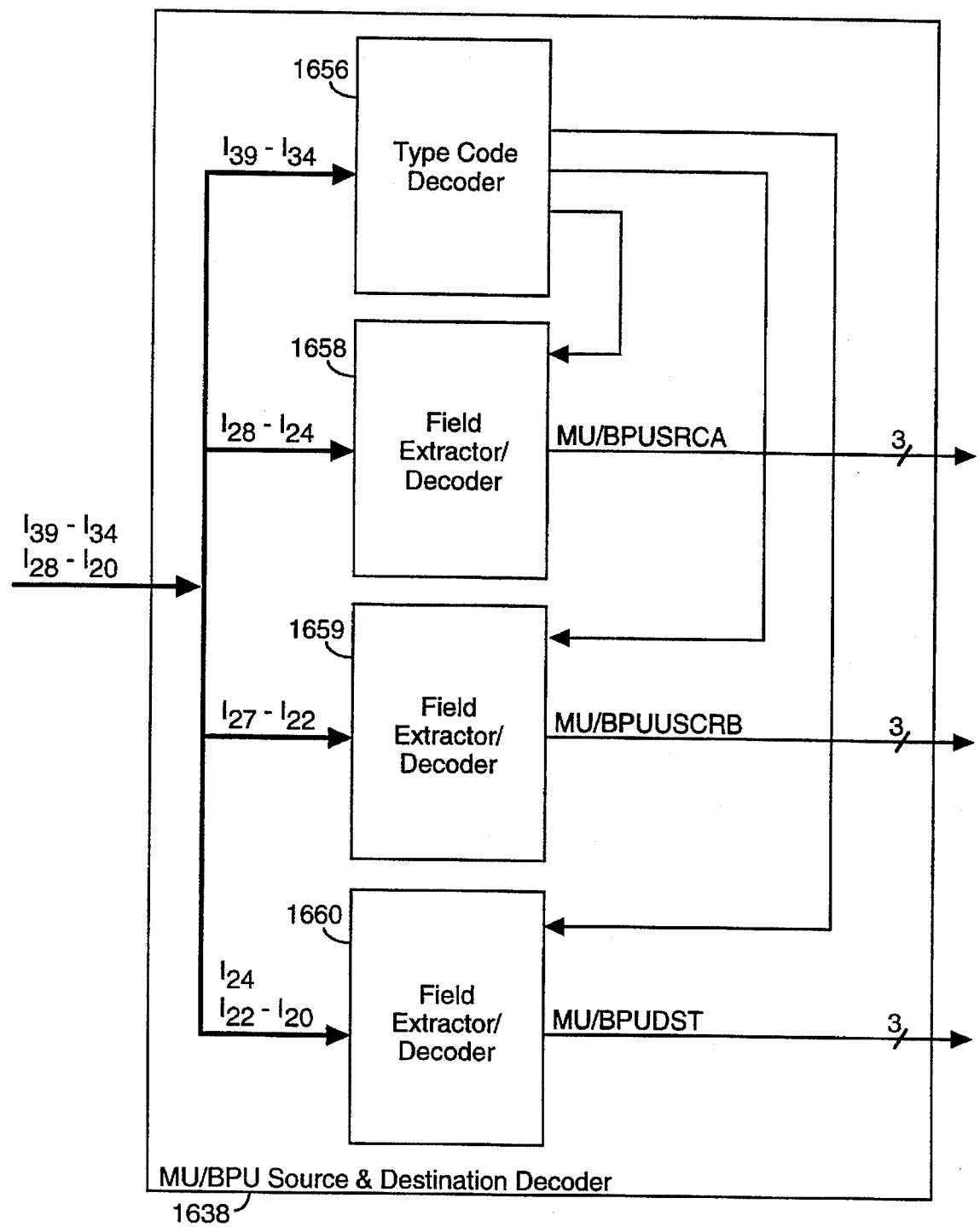
FIG. 22 is a block diagram of the MU/BPU source and destination decoder of the execution unit operation decoder.

As shown in FIG. 22, the MU/BPU source and destination decoder 1638 decodes the received instruction and in response generates and outputs various signals. Referring to FIG. 10, these signals are for controlling selected ones of the data registers 1702–1709 of the execution unit (EXU) 1700 to act as sources or destinations for MU or BPU operations.

FIG. 22 also shows the conceptual architecture of the MU/BPU source and destination decoder 1638. It includes a type code decoder 1656 and three field extractor/decoders 1658–1660.

Referring also to FIGS. 8(a)–8(f), the type code decoder 1656 receives all of the possible bits of the composite instruction which could include the type code field (TY) for the instruction types 1134–1139, 1146, and 1151 which involve MU or BPU data processing operations. As was indicated earlier for the type code decoder 1650 of the multiplier (MU) operation decoder, in the preferred embodiment this would be the first 6 bits CI39–34 of the composite instruction.

From the received bits CI39–34, the type code decoder 1656 decodes the type code field (TY) of the composite instruction to determine its instruction type from among the instruction types listed in FIGS. 8(a)–8(f). If the instruction is one of the instruction types 1134–1139, 1146, or 1151 then the type code decoder 1656 provides (a) the field extractor/decoder 1658 with information indicating the location and size (i.e., bit length) of the first operand source fields (SX2, SRC1, or SRCX2), (b) the field extractor/decoder 1659 with information indicating the location and size of the second operand source field (SY2, SRC2, or SRCY2), and (c) the field extractor/decoder 1660 with information indicating the location and size of the operand destination field (D2, DST2, or DST). If the determined instruction type does not involve an MU or BPU data processing operation or if the relevant source or destination fields are not present in the instruction, then the type code field decoder provides this information to the field extractor/decoders 1658–1660 as well.

The field extractor/decoder 1658 receives all of the possible bits of the composite instruction which could include the first source field (SX2, SCR1, SCRX2) for the instruction types 1134–1139, 1146, and 1151. As is evident from FIGS. 8(a)–8(f), in the preferred embodiment this would be the 5 bits CI28–24 of the composite instruction.

In response to the information provided by the type code decoder 1656, the field extractor/decoder 1658 outputs a first MU/BPU operand source (MU/BPUSRCA) signal. Referring to FIG. 10, in the preferred embodiment, this is a three bit signal and is for controlling one of the eight data registers 1702–1709 of the execution unit (EXU) 1700 to output the operand stored in that register to source A of the MU 1716 or source A of the BPU 1714.

When the type code decoder 1656 provides the field extractor/decoder 1658 with information as to the size and location of the source fields (SX2, SRC1, or SRCX2), the field extractor/decoder extracts the appropriate bits from the bits CI28–24 it has received and decodes them. In response, the field extractor/decoder generates and outputs the MU/BPUSRCA signal which controls whichever of the registers 1702–1709 was designated in the source field (SX2, SRC1, or SRCX2) to output the operand that it stores to source A of the MU 1716 or source A of the BPU 1714.

The field extractor/decoder 1659 receives all of the possible bits of the composite instruction which could include the second source field (SY2, SRCY2, SRC2) for the instruction types 1134–1139, 1146, and 1151. As is evident from FIGS. 8(a)–8(f), in the preferred embodiment this would be the 6 bits CI27–22 of the composite instruction.

In response to the information provided by the type code decoder 1656, the field extractor/decoder 1659 outputs a second MU/BPU operand source (MU/BPUSRCB) signal. Referring to FIG. 10, in the preferred embodiment, this is a three bit signal and is for controlling one of the eight data registers 1702–1709 of the execution unit (EXU) 1700 to output to source B of the MU 1716 or source B of the BPU 1714 the operand stored in that register.

When the type code decoder 1656 provides the field extractor/decoder 1659 with information as to the size and location of the source fields (SY2, SRCY2, or SRC2), the field extractor/decoder extracts the appropriate bits from the bits CI27–22 it has received and decodes them. In response, the field extractor/decoder 1659 generates the MU/BPUSRCB signal which controls the one of the registers 1702–1709 designated by the source field (SY2, SRCY2, or SRC2) to output the operand that its stores to source B of the MU 1716 or to source B of the BPU 1714.

The field extractor/decoder 1660 receives all of the possible bits of the composite instruction which could include the operand destination field (D2, DST2, or DST) for the instruction types 1134–1139, 1146, and 1151. As is evident from FIGS. 8(a)–8(f), in the preferred embodiment this would be the 4 bits CI24 and CI22–20 of the composite instruction.

In response to the information provided by the type code decoder 1656, the field extractor/decoder 1660 outputs an MU/BPU operand destination (MU/BPUDST) signal. Referring to FIG. 10, in the preferred embodiment, this is a three bit signal and is for controlling one of the eight data registers 1702–1709 of the execution unit (EXU) 1700 to store the output of the multiplier unit (MU) 1716 or the bit processing unit (BPU) 1714 in that register.

When the type code decoder 1656 provides the field extractor/decoder 1660 with information as to the size and location of the destination fields (D2, DST2, DST), the field extractor/decoder 1648 extracts the appropriate bits from the bits CI24 and CI22–20 it has received and decodes them. In response, the field extractor/decoder 1660 generates the MU/BPUDST signal for controlling the one of the registers 1702–1709 designated by the destination field (D2, DST2, DST) to store the output of the MU 1716 or the BPU 1714.

As shown in FIG. 10, the MU/BPUSRCA, MU/BPUSRCB, and MU/BPUDST signals are received by the local execution unit (EXU) controller 1750. This controller decodes these signals during the local decoding process referred to in FIGS. 3–7 and generates in response control signals described later in the discussion of the execution stage.

In the actual implementation of the MU/BPU source and destination decoder 1638, the logic of the type code decoder 1656 and the field extractors/decoders 1658–1660 is minimized and combined for generating the signals MU/BPUSRCA, MU/BPUSRCB, and MU/BPUDST from the bits CI39–34 and CI28–20 of the received composite instruction. This is done for timing purposes, as was indicated earlier. As a result, the MU/BPU source and destination decoder 1638 decodes the type code field (TY) to determine the location and size of the described source and destination fields for MU and BPU operations and simultaneously extracts and decodes these fields.

Address Unit Operation Decoder

Figure 23:
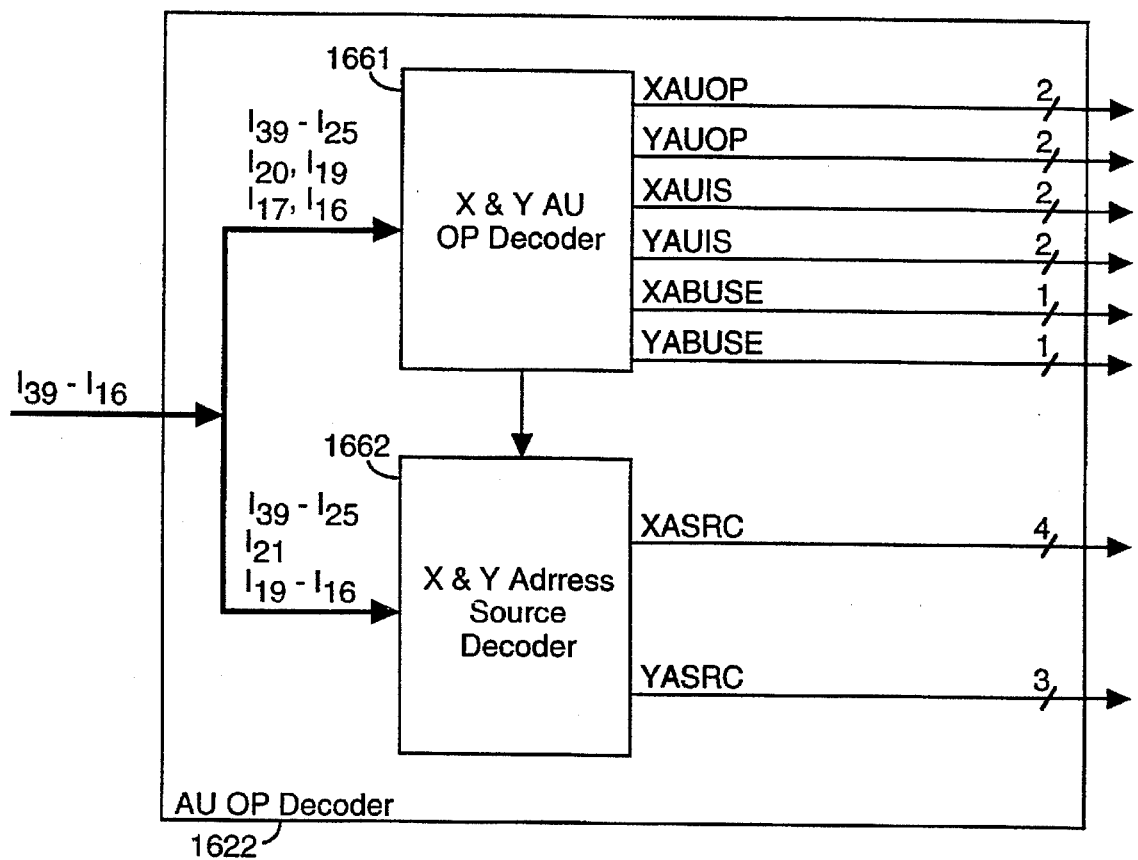
FIG. 23 is a block diagram of the address unit (AU) operation decoder of the instruction decode block.

The address unit (AU) operation decoder 1622 is shown in FIG. 23. It receives the bits CI39–16 outputted by the first instruction fetch register 1604. In response to receiving these bits CI39–16, the address unit decoder 1618 generates and outputs a number of control signals for controlling operation of the address unit (AU) 1800. For generating these signals, the address unit (AU) operation decoder 1622 includes an X and Y address unit (XAU and YAU) operation decoder 1661 and an X and Y operand address source decoder 1662.

Figure 24:
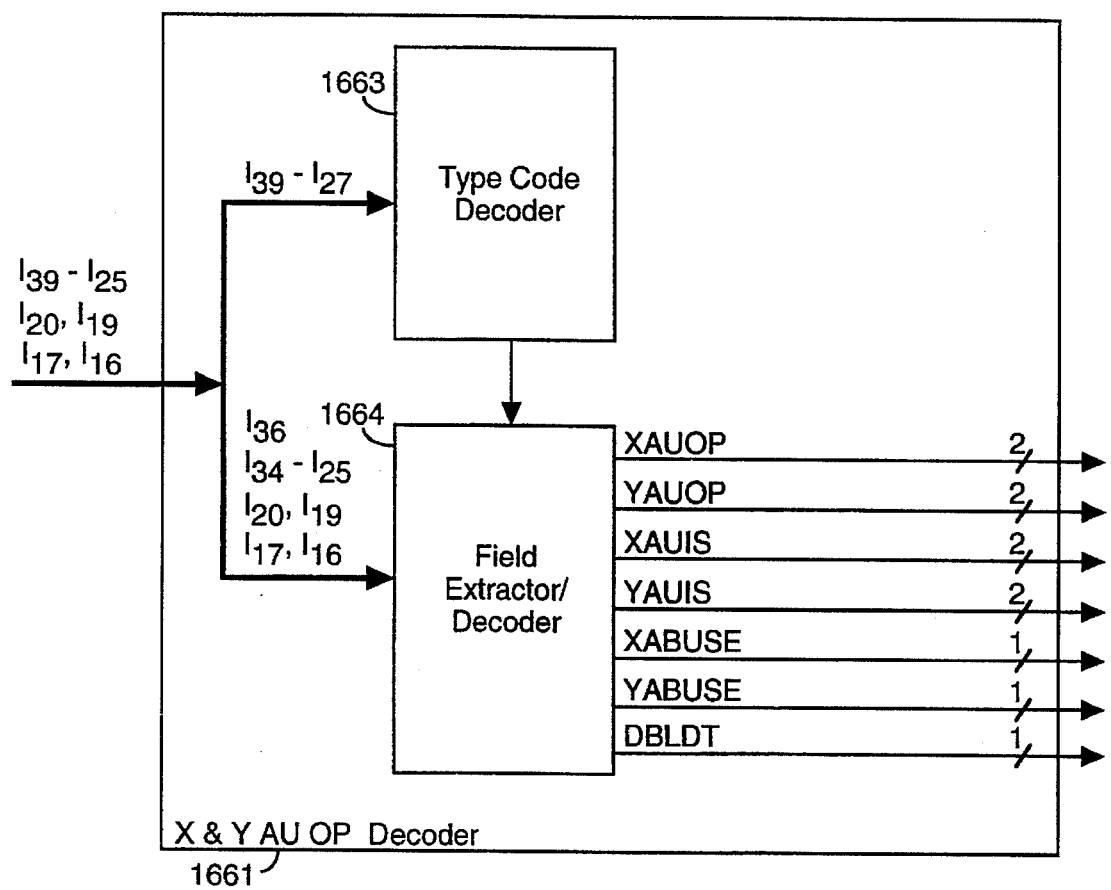
FIG. 24 is a block diagram of the X and Y address units (XAU and YAU) operation decoder of the address unit operation decoder.

As shown in FIG. 24, the X and Y address unit (XAU and YAU) operation decoder 1661 decodes the received instruction and in response generates and outputs various signals. Referring to FIG. 11, these signals are for controlling the operation of the X address unit (XAU) 1812 and the Y address unit (YAU) 1814.

FIG. 24 also shows the conceptual architecture of the X and Y address unit (XAU and YAU) decoder 1661. It includes a type code decoder 1663 and a field extractor/decoder 1664.

Referring also to FIGS. 8(a)–8(f), the type code decoder 1663 receives all of the possible bits of the composite instruction which could include the type code field (TY) for the instruction types 1134–1145, 1147, 1155, 1156, 1160, 1165, and 1166. Referring to FIG. 1, these are the instruction types that can involve accessing data memory 1900 for data transfers. In the preferred embodiment, the type code decoder 1663 receives the first 13 bits CI39–27 of the composite instruction. This is due to the fact that instruction type 1166 has the largest type code (TY) field for an instruction type involving accessing data memory 1900 for a data transfer operation and its type code field (TY) is 13 bits long.

From the received bits CI39–27, the type code decoder 1663 decodes the type code field (TY) of the composite instruction to determine its instruction type from among the instruction types listed in FIGS. 8(a)–8(f). If the instruction is one of the instruction types 1134–1145, 1147, 1155, 1156, 1160, 1165, and 1166 that involves accessing data memory 1900, then the type code decoder 1663 provides the field extractor/decoder 1664 with information indicating the location and size (i.e., bit length) of the operation code field (OP) and any address update fields (MEMA, MEMB, and MEM). If the determined instruction type does not involve accessing data memory 1900, then the type code field decoder 1663 provides this information to the field extractor/decoder 1664 as well.

The field extractor/decoder 1664 receives all of the possible bits of the composite instruction which could include the operation code field (OP) and any address update fields (MEMA, MEMB, or MEM) for the instruction types 1134–1145, 1147, 1155, 1156, 1160, 1165, and 1166. As is evident from FIGS. 8(a)–8(f), in the preferred embodiment this would be 15 bits CI36, CI34–25, CI20, CI19, CI17, and CI16 of the composite instruction.

In response to the information provided by the type code decoder 1663, the field extractor/decoder 1664 outputs (a) a 2 bit X AU operation (XAUOP) signal, (b) a 2 bit Y AU operation (YAUOP) signal, (c) a 2 bit X AU indexing source select (XAUIS) signal, (d) a 1 bit Y AU indexing source select (YAUIS) signal, (e) a 1 bit X address bus enable/disable (XABUSE) signal, (f) a 1 bit Y address bus enable/disable (YABUSE) signal, and (g) a 1 bit double data transfer or single data transfer (DBLDT) signal.

Referring also to FIG. 11, the XAUOP signal is for controlling the X address unit (XAU) 1812 to perform the address update operations defined in FIGS. 9(a)–(k). The YAUOP signal is for controlling the Y address unit (YAU) 1814 to perform the address update operations defined in FIGS. 9(a)–(k). The XAUIS signal is for selecting the source of the indexing operand used for various types of address updates defined by the XAUOP signal and performed by the X address unit 1812. The YAUIS signal is for selecting the source of the indexing operand used for various types of address updates defined by the XAUOP signal and performed by the Y AU 1814. The XABUSE signal and the YABUSE signal are used by the parallel arbiter 2100 for controlling access to the data memory 1900. The DBLDT signal is for indicating to the address unit (AU) 1800 whether the decoded instruction involves one or two data transfers that require accessing data memory 1900.

When the type code decoder 1663 provides the field extractor/decoder 1664 with information as to the size and location of the operation code field (OP), the field extractor/decoder extracts the appropriate bits from the bits CI36, CI34–25, CI20, CI19, CI17, and CI16 it has received and decodes them. In response, it generates the signals XAUOP, YAUOP, XAUIS, YAUIS, XABUSE, YABUSE, and DBLDT. As shown in FIG. 11, the XAUOP, YAUOP, XAUIS, YAUIS, and DBLDT signals are received by the local address unit (AU) controller 1850. This controller decodes these signals during the local decoding process referred to in FIGS. 3–7 and in response generates control signals described later in the discussion of the execution stage. The XABUSE and YABUSE signals are received by the parallel arbiter 2100 and used for controlling access to data memory 1900 during the execution stage.

As was indicated earlier, the architecture shown in FIG. 24 for the X and Y address unit (AU) operation decoder 1661 is conceptual. In the actual implementation, the logic of the type code decoder 1663 and the field extractor/decoder 1664 is minimized and combined for generating the signals XAUOP, YAUOP, XAUIS, YAUIS, XABUSE, YABUSE, DBLDT from the bits CI36, CI34–25, CI20, CI19, CI17, and CI16 of the received composite instruction. Once again, this is for timing purposes. Therefore, the X and Y address unit (XAU and YAU) operation decoder 1661 decodes the type code field (TY) to determine the location and size of the operation code field (OP) and any address update fields (MEMA, MEMB, or MEM) while simultaneously extracting and decoding these fields.

Figure 25:
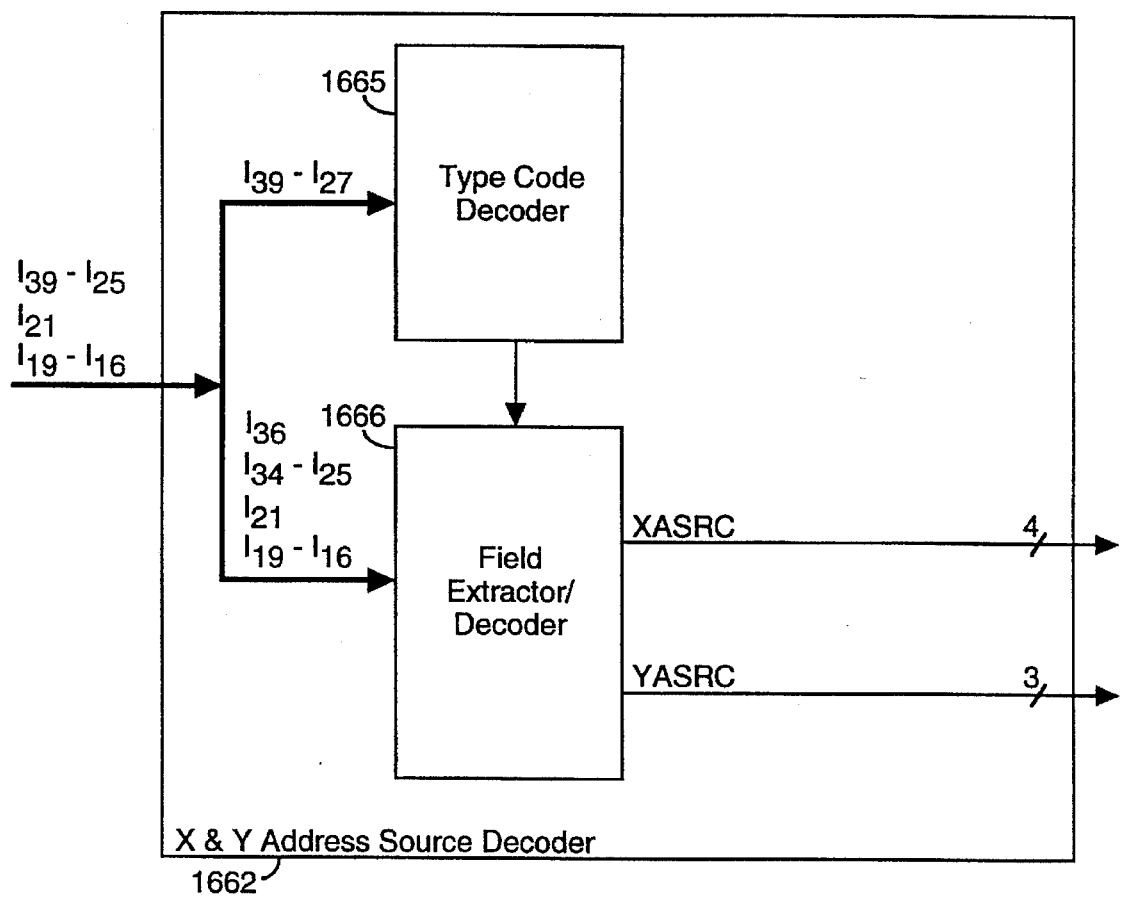
FIG. 25 is a block diagram of the X and Y address source decoder of the address unit operation decoder.

As shown in FIG. 25, the X and Y operand address source decoder 1662 decodes the received instruction and in response generates and outputs various signals. Referring to FIG. 11, these signals are for controlling selected ones of the address registers 1802–1809 of the address unit (AU) 1800 to act as operand address sources for data transfers involving the data memory 1900.

FIG. 25 also shows the conceptual architecture of the X and Y operand address source decoder 1662. It includes a type code decoder 1665 and a field extractor/decoder 1666.

Referring also to FIGS. 8(a)–8(f), the type code decoder 1665 receives all of the possible bits of the composite instruction which could include the type code field (TY) for the instruction types 1134–1145, 1147, 1155, 1156, 1160, 1165, and 1166. These are the instruction types that can involve accessing data memory 1900 for data transfers. In the preferred embodiment, the type code decoder 1665 receives the first 13 bits CI39–27 of the composite instruction. This is because the instruction type 1166 has the largest type code (TY) field for an instruction type involving accessing data memory 1900 and its type code field (TY) is 13 bits long.

From the received bits CI39–27, the type code decoder 1665 decodes the type code field (TY) of the composite instruction to determine its instruction type from among the instruction types listed in FIGS. 8(a)–8(f). If the instruction is one of the instruction types 1134–1145, 1147, 1155, 1156, 1160, 1165, and 1166 that involves accessing data memory 1900, then the type code decoder 1665 provides the field extractor/decoder 1666 with information indicating the location and size (i.e., bit length) of the operation code field (OP) and the operand address source field or fields (Aa, Ab, Am, Ap, Aq, and An). If the determined instruction type does not involve accessing data memory 1900, then the type code field decoder 1665 provides this information to the field extractor/decoder 1664 as well.

The field extractor/decoder 1666 receives all of the possible bits of the composite instruction which could include the operation code field (OP) and the operand address source field or fields (Aa, Ab, Am, Ap, Aq, and An) for the instruction types 1134–1145, 1147, 1155, 1156, 1160, 1165, and 1166. As is evident from FIGS. 8(a)–8(f), in the preferred embodiment this would be 15 bits CI36, CI34–25, CI21, and CI19–16 of the composite instruction.

In response to the information provided by the type code decoder 1665, the field extractor/decoder 1666 outputs (a) a 4 bit X operand address source (XAUSRC) signal, and (b) a 3 bit Y operand address source (YAUSRC) signal. Referring also to FIG. 11, the XAUSRC signal is for controlling (a) one of the eight address registers 1802–1809 of the address unit (AU) 1800 to output an address onto the X address bus 1108, (b) one of the stack pointer registers 1816 (sp) or 1817 (sp+1) to output an address onto the X address bus 1108, or (c) loading immediate data extracted by the immediate data decoder 1630 onto the X address bus 1108. The YAUSRC signal is for controlling one of the eight address registers 1802–1809 of the address unit (AU) 1800 to output an address onto the Y address bus 1110.

When the type code decoder 1665 provides the field extractor/decoder 1666 with information as to the size and location of the operation code field (OP) and the operand address source field or fields (Aa, Ab, Am, Ap, Aq, and An), the field extractor/decoder extracts the appropriate bits from the bits CI36, CI34–25, CI21, and CI19–16 it has received and decodes them. In response, the signals XAUSRC and YAUSRC are generated. As shown in FIG. 11, the XAUSRC and YAUSRC signals are received by the local address unit (AU) controller 1850. This controller decodes these signals during the local decoding process referred to in FIGS. 3–7 and in response generates control signals described later in the discussion of the execution stage.

In the actual implementation of the X and Y operand address source decoder 1662, the logic of the type code decoder 1665 and the field extractor 1666 are minimized and combined for generating the signals XASRC and YARSC from the bits CI39–25, CI34–25, CI21, and CI19–16 of the received composite instruction. Therefore, the X and Y operand address source decoder 1662 decodes the type code field (TY) to determine the location and size of the operation code field (OP) and the operand address source fields (Aa, Ab, Am, Ap, Aq, and An) while simultaneously extracting and decoding these fields.

PCU operation Decoder

Figure 26:
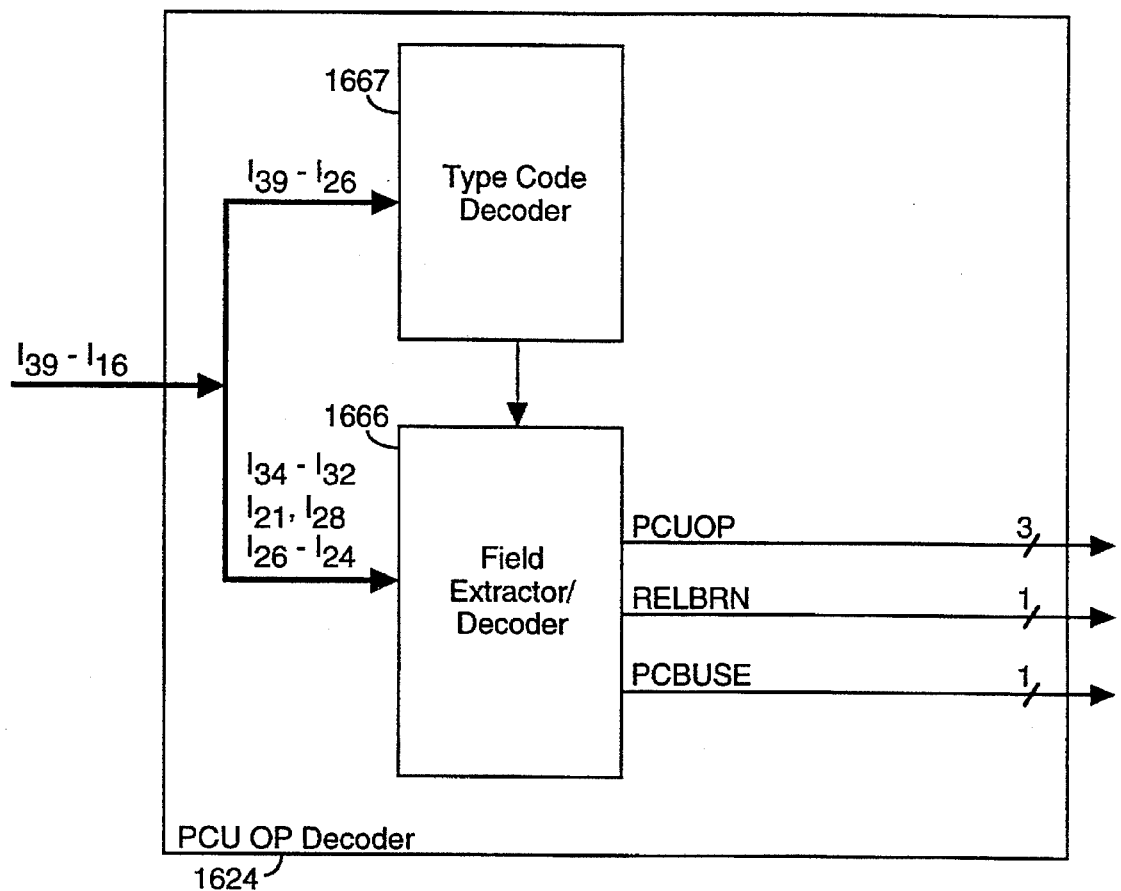
FIG. 26 is a block diagram of the program control unit (PCU) operation decoder of the instruction decode block.

The PCU operation decoder 1624 is shown in FIG. 26. It receives the bits CI39–16 outputted by the first instruction fetch register 1604. In response to receiving these bits CI39–16, the PCU operation decoder 1624 generates and outputs a number of control signals for controlling operation of the program control unit (PCU) 1500. For generating these signals, the program control unit (PCU) operation decoder 1624 conceptually includes a type code decoder 1667 and a field extractor/decoder 1668.

Referring also to FIGS. 8(a)–8(f), the type code decoder 1667 receives all of the possible bits of the composite instruction which could include the type code field (TY) for the instruction types 1152–1154, 1162, 1163, and 1167–1169. These are the instruction types that involve program control. In the preferred embodiment, the type code decoder 1663 receives the first 14 bits CI39–26 of the composite instruction. This is due to the fact that instruction type 1169 has the largest type code (TY) field for an instruction type involving program control and its type code field (TY) is 14 bits long.

From the received bits CI39–26, the type code decoder 1667 decodes the type code field (TY) of the composite instruction to determine its instruction type from among the instruction types listed in FIGS. 8(a)–8(f). If the instruction is one of the instruction types 1152–1154, 1162, 1163, and 1167–1169, then the type code decoder 1667 provides the field extractor/decoder 1668 with information indicating the location and size (i.e., bit length) of the operation code field (OP). However, if the instruction is a repeat type instruction 1154 or 1167, then the type code decoder 1667 indicates this to the field extractor 1668 since these types of instructions do not include an operation code field (OP). Furthermore, if the determined instruction type does not involve program control, then the type code field decoder 1667 provides this information to the field extractor/decoder 1668 as well.

The field extractor/decoder 1668 receives all of the possible bits of the composite instruction which could include the operation code field (OP) for the instruction types 1152–1154, 1162, 1163, and 1167–1169. As is evident from FIGS. 8(a)–8(f), in the preferred embodiment this would be the 8 bits CI34–32, CI29, CI28, and CI26–24 of the composite instruction.

In response to the information provided by the type code decoder 1667, the field extractor/decoder 1668 outputs (a) a 3 bit program control operation (PCUOP) signal, (b) a relative branch or not (RELB) signal, and (c) the 1 bit PCBUSE signal described earlier. Referring also to FIG. 12, the PCUOP and RELB signals are for controlling the program control unit (PCU) 1500 to perform the program control operations defined in FIGS. 9(a)–(k). The PCBUSE signal is for resolving conflicts in accessing the instruction memory 1400.

When the type code decoder 1667 provides the field extractor/decoder 1668 with information as to the size and location of the operation code field (OP), the field extractor/decoder extracts the appropriate bits from the bits CI34–32, CI29, CI28, and CI26–24 it has received and decodes them. In response, it generates the PCUOP, RELB, and PCBUSE signal. As shown in FIG. 12, the PCUOP and the RELB signals are received by the local program control unit (PCU) controller 1550. This controller decodes these signals during the local decoding process referred to in FIGS. 3–7 and generates in response control signals described later in the discussion of the execution stage. The PCBUSE signal is provided to the parallel arbiter 2100 for the arbitration process described earlier.

As was indicated earlier, the architecture shown in FIG. 26 for the PCU operation decoder 1624 is conceptual. In the actual implementation, the logic of the type code decoder 1667 and the field extractor/decoder 1668 is minimized and combined for generating the signals PCUOP, RELB, and PCBUSE from the bits CI39–24 of the received composite instruction. As a result, the program control (PCU) operation decoder 1624 decodes the type code field (TY) to determine the location and size of the operation code field (OP) while simultaneously extracting and decoding the operation code field (OP).

Data Bus Operation Decoder

Figure 27:
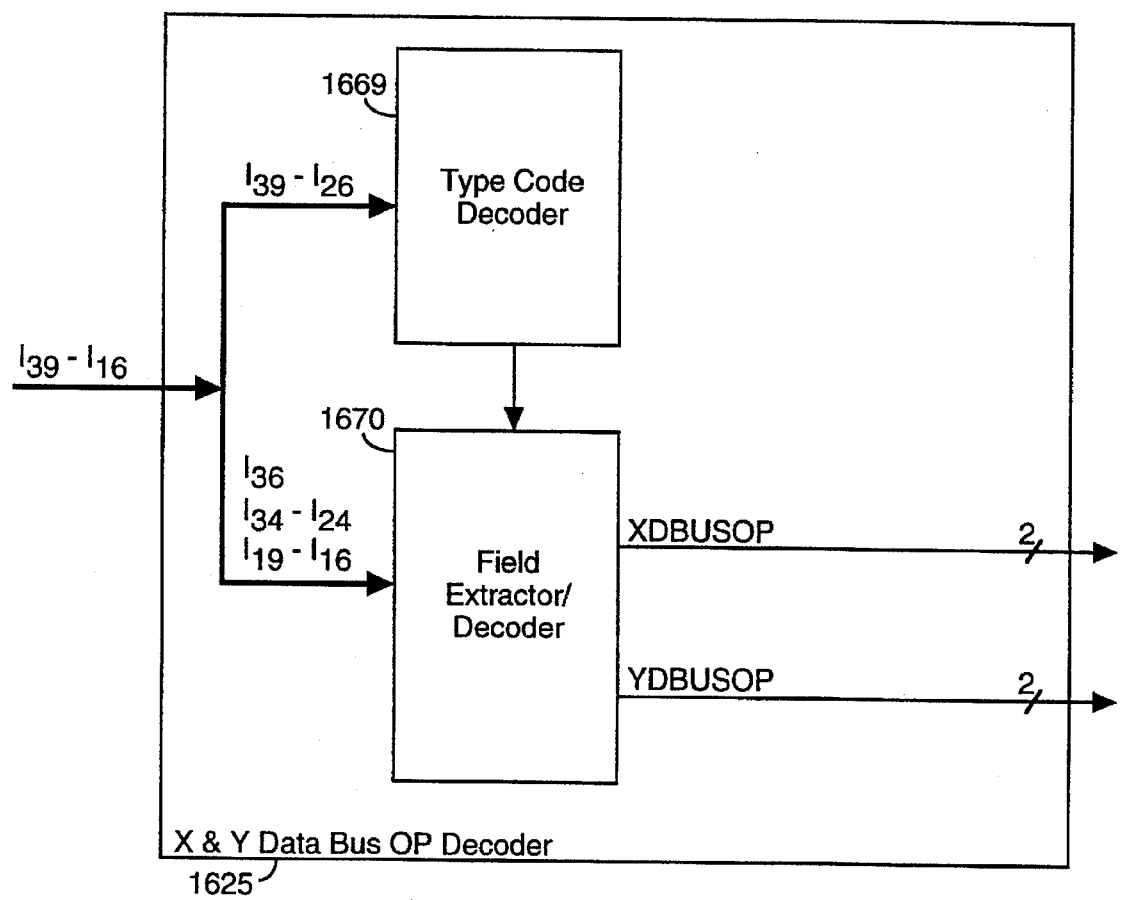
FIG. 27 is a block diagram of the data bus operation decoder of the instruction decode block.

The X and Y data bus operation decoder 1625 is shown in FIG. 27. It receives the bits CI39–16 outputted by the first instruction fetch register 1604. In response to receiving these bits CI39–16, the data bus operation decoder 1625 generates and outputs a number of control signals for controlling operation of the X and Y data buses 1108 and 1110. For generating these signals, the data bus operation decoder 1625 conceptually includes a type code decoder 1669 and a field extractor/decoder 1670.

Referring also to FIGS. 8(a)–8(f), the type code decoder 1669 receives all of the possible bits of the composite instruction which could include the type code field (TY) for the instruction types 1134–1148, 1150, 1154, 1155, 1160, 1165, 1166–1169. These are the instruction types that involve operation of the X data bus 1108 and/or the Y data bus 1110. In the preferred embodiment, the type code decoder 1669 receives the first 14 bits CI39–26 of the composite instruction. This is due to the fact that instruction type 1169 has the largest type code (TY) field for an instruction type involving data bus operation and its type code field (TY) is 14 bits long.

From the received bits CI39–26, the type code decoder 1669 decodes the type code field (TY) of the composite instruction to determine its instruction type from among the instruction types listed in FIGS. 8(a)–8(f). If the instruction is one of the instruction types 1134–1148, 1150, 1154, 1155, 1160, 1165, and 1166–1169, then the type code decoder 1669 provides the field extractor/decoder 1670 with information indicating the location and size (i.e., bit length) of the operation code field (OP). However, if the determined instruction type does not involve data bus operation, then the type code field decoder 1669 provides this information to the field extractor/decoder 1670 as well.

The field extractor/decoder 1670 receives all of the possible bits of the composite instruction which could include the operation code field (OP) for the instruction types 1134–1148, 1150, 1154, 1155, 1160, 1165, and 1166–1169. As is evident from FIGS. 8(a)–8(f), in the preferred embodiment this would be 16 bits CI36, CI34–24, and CI19–16 of the composite instruction.

In response to the information provided by the type code decoder 1669, the field extractor/decoder 1670 outputs (a) a 2 bit X data bus operation (XDBUSOP) signal, (b) a 2 bit Y data bus operation (YDBUSOP) signal. Referring to FIGS. 10–12, the XDBUSOP signal is for controlling data transfers on the X data bus 1108 while the YDBUSOP signal is for controlling data transfers on the Y data bus 1110.

When the type code decoder 1669 provides the field extractor/decoder 1670 with information as to the size and location of the operation code field (OP), the field extractor/decoder extracts the appropriate bits from the bits CI36, CI34–24, and CI19–16 it has received and decodes them. In response, it generates the XDBUSOP and YDBUSOP signals. As shown in FIGS. 10–12, 16, and 29(b) the XDBUSOP signal is received by the local execution unit (EXU) controller 1750, the local address unit (AU) controller 1850, the local program control (PCU) controller 1550, the instruction fetch register controller 1608, and the condition code register controller 1685. The YDBUSOP signal is received by the local execution unit (EXU) controller 1750 and the local address unit (AU) controller 1850. These controllers decode the XDBUSOP and YDBUSOP signals during the local decoding process shown in FIGS. 3–7 and generate in response control signals described later in the discussion regarding the execution stage.

In the actual implementation of the data bus operation decoder 1625, the logic of the type code decoder 1669 and the field extractor/decoder 1670 is minimized and combined for generating the signals XDBUSOP and YDBUSOP from the bits CI39–24 and CI19–16 of the received composite instruction. As a result, the data bus operation decoder 1625 decodes the type code field (TY) to determine the location and size of the operation code field (OP) while simultaneously extracting and decoding the operation code field (OP).

Register Select Decoder

Figure 28:
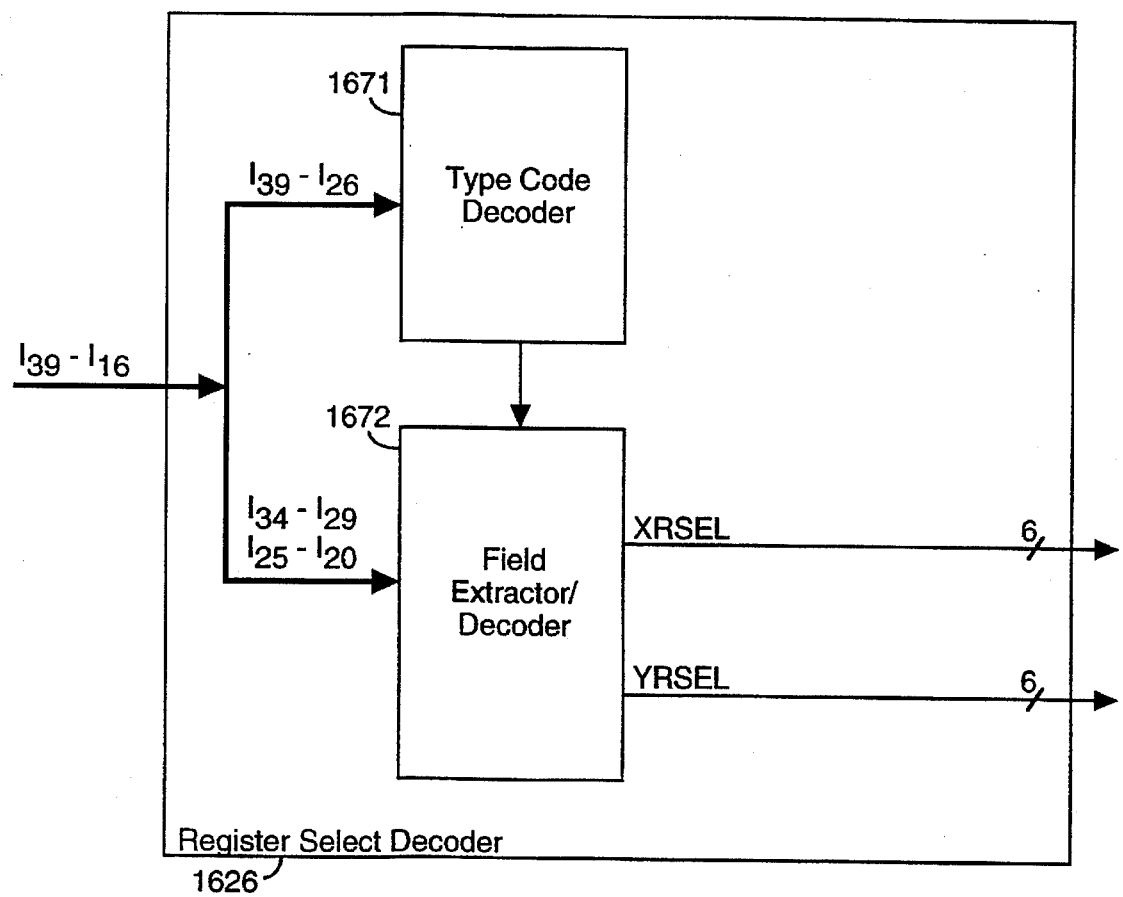
FIG. 28 is a block diagram of the register select decoder of the instruction decode block.

The register select decoder 1626 is shown in FIG. 28. It receives the bits CI39–16 outputted by the first instruction fetch register 1604. In response to receiving these bits CI39–16, the register select decoder 1626 generates and outputs a number of control signals for controlling the use of the various registers of the DSP 1100 for data transfers. For generating these signals, the register select decoder 1626 conceptually includes a type code decoder 1671 and a field extractor/decoder 1672.

Referring also to FIGS. 8(a)–8(f), the type code decoder 1671 receives all of the possible bits of the composite instruction which could include the type code field (TY) for the instruction types 1134–1148, 1150, 1154, 1155, 1160, 1164, 1165, and 1166–1169. Referring to FIGS. 10–12 and 29(b), these are the instruction types that may involve data transfer operations with the individual data registers 1702 (a)–1709(c) (xd0g–m1I), the shift control registers 1720 and 1722 (sha and shb), the address registers 1802–1809 (xa0–ya3), the stack pointer regsiters 1816 (sp) and 1817 (sp+1), the indexing registers 1818 and 1820 (i0 and i1), the program control registers 1502 and 1505 (pc0 and pc3), the repeat control registers 1508–1511 (rc, re, and rs), the loop control register (lc), or the condition code register 1674 (ccr). In the preferred embodiment, the type code decoder 1671 receives the first 14 bits CI39–26 of the composite instruction. This is due to the fact that instruction type 1169 has the largest type code (TY) field for an instruction type involving data bus operation and its type code field (TY) is 14 bits long.

From the received bits CI39–26, the type code decoder 1671 decodes the type code field (TY) of the composite instruction to determine its instruction type from among the instruction types listed in FIGS. 8(a)–8(f). If the instruction is one of the instruction types 1134–1148, 1150, 1154, 1155, 1160, 1164, 1165, and 1166–1169 then the type code decoder 1671 provides the field extractor/decoder 1672 with information indicating the location and size (i.e., bit length) of the data operand transfer source field or fields (Rp, Rs, Rn, Rm, Raa, or Rb) and/or the transfer destination field or fields (Rq, Rl, Raa, Rn, Ra and/or Rb). However, if the determined instruction type does not involve data bus operation, then the type code field decoder 1671 provides this information to the field extractor/decoder 1672 as well.

The field extractor/decoder 1672 receives all of the possible bits of the composite instruction which could include an operand transfer source field (Rp, Rs, Rn, Rm, Raa, or Rb) or transfer destination field (Rq, Rl, Raa, Rn, Ra and/or Rb) for the instruction types 1134–1148, 1150, 1154, 1155, 1160, 1165, and 1166–1169. As is evident from FIGS. 8(a)–8(f), in the preferred embodiment this would be the 12 bits CI34–29 and CI25–20 of the composite instruction.

In response to the information provided by the type code decoder 1671, the field extractor/decoder 1672 outputs (a) a first 6 bit register select (XRSEL) signal for data transfers using the X data bus 1102, (b) a second 6 bit register select (YRSEL) signal for memory access data transfers using the Y data bus 1104 and for register to register (i.e., move) data transfers using the X data bus.

When the type code decoder 1671 provides the field extractor/decoder 1672 with information as to the size and location of the operand transfer source field or fields (Rp, Rs, Rn, Rm, Raa, or Rb) or transfer destination field or fields (Rq, Rl, Raa, Rn, Ra and/or Rb), the field extractor/decoder extracts the appropriate bits from the bits CI34–29 and CI25–20 it has received and decodes them. In response, it generates the XRSEL and YRSEL signals. As shown in FIGS. 10–12, 16, and 29(b), the XRSEL and YRSEL signals are received by the local execution unit (EXU) controller 1750, the local address unit (AU) controller 1850, the local program control unit (PCU) controller 1550, the instruction fetch register controller 1608, and the condition code register controller 1685. These controllers decode these signals during the local decoding process referred to in FIGS. 3-7 and generate in response control signals described later in the discussion of the execution stage.

In the actual implementation of the register select decoder 1626, the logic of the type code decoder 1671 and the field extractor/decoder 1672 is minimized and combined for generating the signals XRSEL and YRSEL from the bits CI39-20 of the received composite instruction. As a result, the register select decoder 1626 decodes the type code field (TY) to determine the location and size of operand transfer source field or fields (Rp, Rs, Rn, Rm, Raa, or Rb) and transfer destination field or fields (Rq, Rl, Raa, Rn, Ra and/or Rb) while simultaneously extracting and decoding these fields.

Condition Code Decoder

Figure 29A:
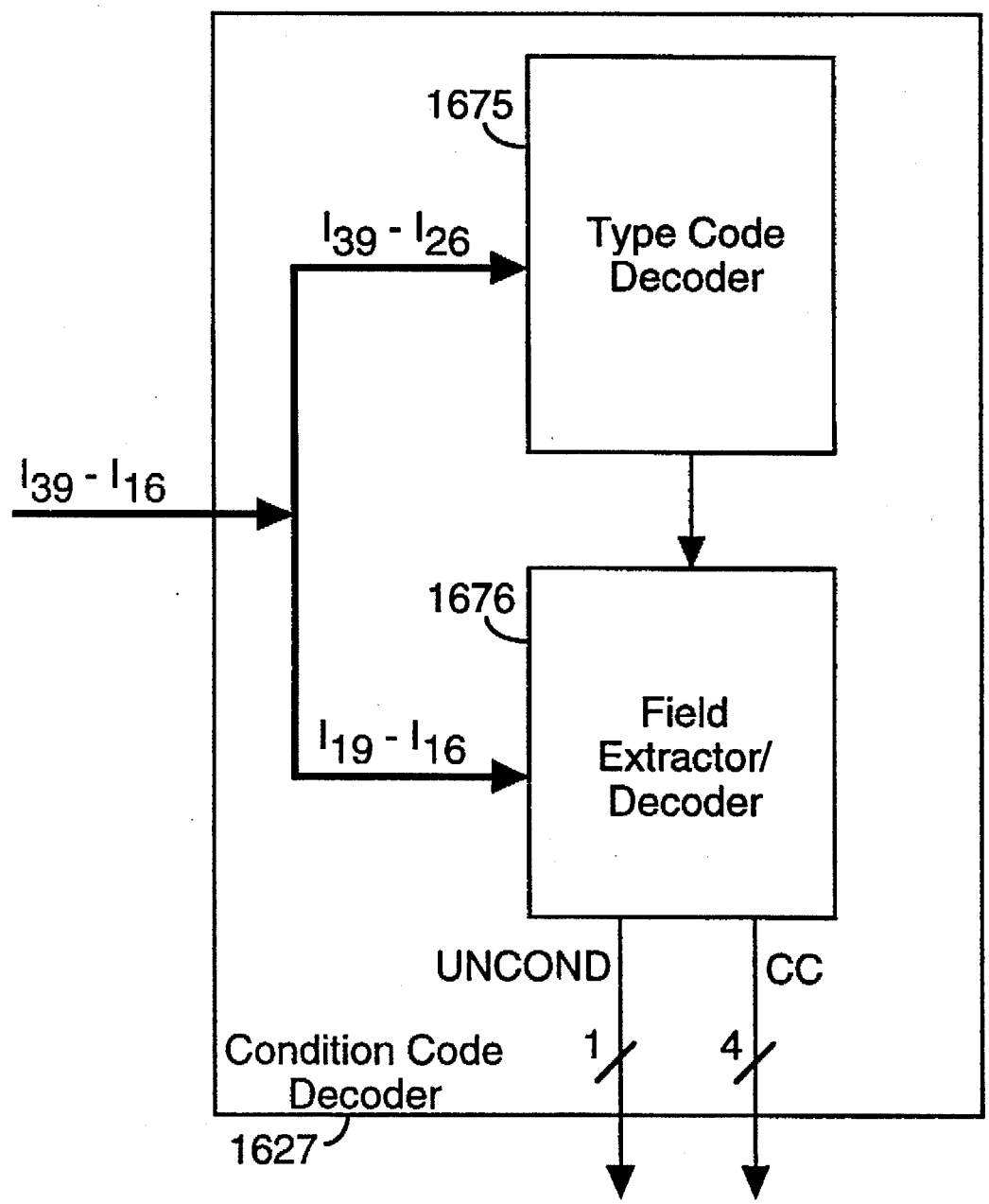
FIGS. 29(a) and (b) are a block diagram of the condition code decoder of the instruction decode block and the register block of the common decoder unit.

The condition code decoder 1627 is shown in FIG. 29(a). It receives the bits CI39-16 outputted by the first instruction fetch register 1604. In response to receiving these bits CI39-16, the condition code decoder 1627 extracts the condition code (CC) of the decoded instruction. For doing so, the condition code decoder 1627 conceptually includes a type code decoder 1675 and a field extractor/decoder 1676.

Referring also to FIGS. 8(a)-8(f), the type code decoder 1675 receives all of the possible bits of the composite instruction which could include the type code field (TY) for the instruction types 1149, 1153, 1157, 1159, 1161-1163, 1168, and 1169. These are the instruction types that may involve conditional operations. In the preferred embodiment, the type code decoder 1675 receives the first 14 bits CI39-26 of the composite instruction. This is due to the fact that instruction type 1169 has the largest type code (TY) field for an instruction type involving data bus operation and its type code field (TY) is 14 bits long.

From the received bits CI39-26, the type code decoder 1675 decodes the type code field (TY) of the composite instruction to determine its instruction type from among the instruction types listed in FIGS. 8(a)-8(f). If the instruction is one of the instruction types 1149, 1153, 1157, 1159, 1161-1163, 1168, and 1169, then the type code decoder 1675 provides the field extractor/decoder 1676 with information indicating the location and size (i.e., bit length) of the condition code field (CC). However, if the determined instruction type does not include a condition code field (CC), then the type code field decoder 1675 provides this information to the field extractor/decoder 1676 as well. The field extractor/decoder 1676 receives all of the possible bits of the composite instruction which could include the condition code field (CC). As is evident from FIGS. 8(a)-8(f), in the preferred embodiment this would be the 4 bits CI19-16 of the composite instruction.

In response to the information provided by the type code decoder 1675, the field extractor/decoder 1676 outputs (a) a 4 bit condition code (CC) signal, and (b) a 1 bit unconditional or conditional instruction (UNCOND) signal. The CC signal is simply the extracted condition code field (CC). However, as will be explained shortly, when the UNCOND signal is asserted, it indicates that the decoded instruction does not have a condition code field (CC).

When the type code decoder 1675 provides the field extractor/decoder 1676 with information as to the size and location of the condition code field (CC), the field extractor/ decoder extracts the appropriate bits from the bits CI39-16. In response, it outputs the CC signal and the UNCOND signal. Also, if the type code decoder 1675 provides the field/extractor decoder 1676 with information that the decoded instruction does not have a condition code field (CC), then the the UNCOND signal indicates this. Otherwise, the UNCOND signal indicates that the decoded instruction has a condition code field (CC). The CC and UNCOND signals are received by the condition code register (CCR) controller 1685 of the register block 1618.

In the actual implementation of the condition code decoder 1627, the logic of the type code decoder 1675 and the field extractor/decoder 1676 is minimized and combined for generating the CC and UNCOND signals from the bits CI39-26 and CI19-16 of the received composite instruction. As a result, the condition code decoder 1627 decodes the type code field (TY) to determine the location and size of condition code field (CC) while simultaneously extracting the condition code field (CC).

Plural Cycle Instruction Decoder

Figure 30:
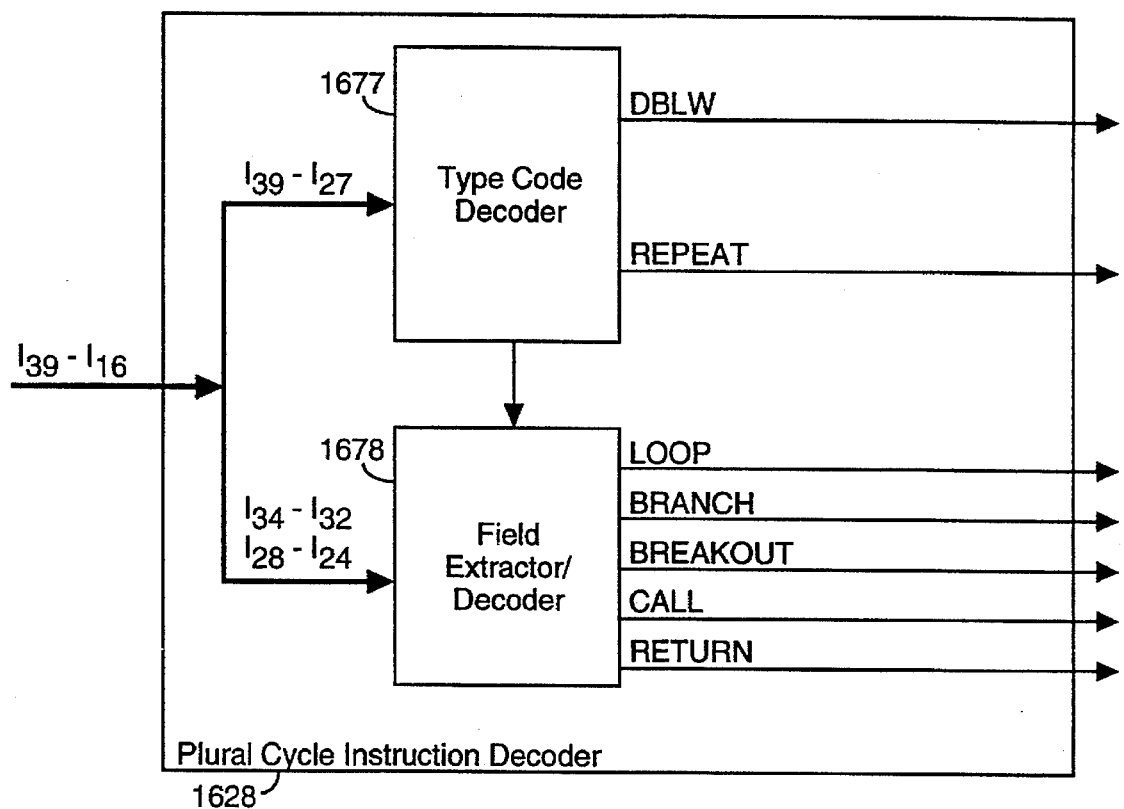
FIG. 30 is a block diagram of the plural cycle instruction decoder of the instruction decode block.

The plural cycle instruction decoder 1628 is shown in FIG. 30. It receives the bits CI39-16 outputted by the first instruction fetch register 1604. In response to receiving these bits CI39-16, the plural cycle instruction decoder 1628 generates and outputs a number of control signals for controlling the operation of the plural cycle state machine 1614. For generating these signals, the data bus operation decoder 1625 conceptually includes a type code decoder 1677 and a field extractor/decoder 1678.

Referring also to FIGS. 8(a)-8(f), the type code decoder 1677 receives all of the possible bits of the composite instruction which could include the type code field (TY) for the instruction types 1149, 1150, 1152, 1160, 1162-1164, 1167, and 1168. These are the instruction types that involve plural cycle instructions. Specifically, referring to FIGS. 9(a)-9(k), these plural cycle instructions include repeat instructions, standard branch (i.e., goto) and loop instructions, breakout instructions, call instructions, return instructions, and double word instructions. In the preferred embodiment, the type code decoder 1677 receives the first 13 bits CI39-27 of the composite instruction. This is due to the fact that instruction type 1168 has the largest type code (TY) field for an instruction type requiring plural machine cycles for fetching, decoding, and/or execution.

From the received bits CI39-27, the type code decoder 1677 decodes the type code field (TY) of the composite instruction to determine its instruction type from among the instruction types listed in FIGS. 8(a)-8(f). If the instruction is one of the instruction types 1149, 1150, 1160, 1162, and 1163 that define a double word instruction, then the type code decoder 1677 generates and outputs the DBLW signal so that it indicates this to the plural cycle state machine 1614. Otherwise, the DBLW signal indicates that a single word instruction was decoded. Furthermore, if the instruction is one of the instruction types 1154 or 1167 that define a repeat instruction, then the type code decoder 1677 generates and outputs a repeat instruction (REPEAT) signal to the plural cycle state machine 1614. However, if the instruction is one of the instruction types 1152, 1164, or 1168 that can define a standard branch (i.e., goto), standard loop, breakout, call, or return instruction, then the type code decoder 1677 provides the field extractor/decoder 1678 with information indicating the location and size (i.e., bit length) of the operation code field (OP). But, if the determined instruction type is not one the types just described, then the type code field decoder 1677 provides this information to the field extractor/decoder 1678 as well.

The field extractor/decoder 1678 receives all of the possible bits of the composite instruction which could include the operation code field (OP) for the instruction types 1152, 1164, or 1168. As is evident from FIGS. 8(a)–8(f), in the preferred embodiment this would be the 8 bits CI34–32 and CI28–24 of the composite instruction.

The field extractor/decoder 1678 generates and outputs (a) a LOOP instruction (LOOP) signal, (b) a branch instruction (BRANCH) signal, (c) a breakout (BREAKOUT) signal, (d) a call instruction (CALL) signal, and (e) a return instruction (RETURN) signal. These signal are provided to the plural cycle status machine 1618.

When the type code decoder 1677 provides the field extractor/decoder 1678 with information as to the size and location of the operation code field (OP), the field extractor/decoder extracts the appropriate bits from the bits CI34–32 and CI28–24 it has received and decodes them. In response, it generates the LOOP, BRANCH, BREAKOUT, CALL, and RETURN signals.

In the actual implementation of the plural cycle instruction decoder 1628, the logic of the type code decoder 1677 and the field extractor/decoder 1678 is minimized and combined for generating the signals DBLW, REPEAT, LOOP, BRANCH, BREAKOUT, CALL, and RETURN from the bits CI39–24 and CI19–16 of the received composite instruction. As a result, for certain plural cycle instructions (i.e., branch, loop, breakout, call, and return), the plural cycle instruction decoder 1628 decodes the type code field (TY) to determine the location and size of the operation code field (OP) while simultaneously extracting and decoding the operation code field (OP).

Plural Cycle State Machine

In addition to the signals output by the plural instruction cycle decoder 1628, the plural cycle state machine 1614 receives the PCUOP, ALU/BPUOP, MUOP, XBUSOP, YBUSOP, XAUSRC, XAUOP, YAUOP, PCBUSE, XABUSE, YABUSE, XRSEL, and YRSEL signals. This is shown in FIG. 16.

Referring also to FIG. 5, the first word of a double word instruction is decoded during the first half of machine cycle M1A and the instruction decode block 1612 outputs the DBLW signal. In response to the DBLW signal, the plural cycle state machine 1614 takes control of the sequence in the second half of the machine cycle M1A and inserts NOPs for the signals PCUOP, ALU/BPUOP, MUOP, XBUSOP, YBUSOP, XAUOP, YAUOP, XAUSRC, PCBUSE, XABUSE, YABUSE, XRSEL, and YRSEL during the machine cycle M1A. Since only the first word of the instruction has been fetched at this point, the NOPs are inserted so that the double word instruction will not be executed until the second word of the instruction has been fetched in machine cycle M1A. Referring also to FIG. 16, in response to the DBLW signal, the plural cycle state machine 1614 also generates the earlier described DBLWST signal during the machine cycle M1A so that the second word of the double word instruction can be fetched into the second instruction fetch register 1606 and the first word retained in the first instruction fetch register 1604.

By the next machine cycle M2, the double word instruction will have been fetched into the first and second fetch registers 1604 and 1606. As a result, the plural cycle state machine 1614 does not modify the signals ALU/BPUOP, MUOP, XBUSOP, YBUSOP, XAUOP, YAUOP, XAUSRC, PCBUSE, XABUSE, and YABUSE generated during this machine cycle in response to decoding the double word instruction. The double word instruction is then finally executed in the machine cycle M3.

If in machine cycle M1A the DBLW signal indicates that a single word instruction has been decoded, then the DBLWST signal outputted by the plural cycle state machine 1614 simply indicates that the next instruction can be fetched into the first instruction fetch register 1604 shown in FIG. 16. Furthermore, the plural cycle state machine 1614 in this case does not modify the signals ALU/BPUOP, MUOP, XBUSOP, YBUSOP, XAUOP, YAUOP, XAUSRC, PCBUSE, XABUSE, and YABUSE.

Referring to FIGS. 16 and 6, when a repeat, breakout, standard loop, or standard branch instruction is decoded during the machine cycle M2, the plural cycle state machine 1614 modifies the signals ALU/BPUOP, MUOP, XBUSOP, YBUSOP, XAUOP, YAUOP, XAUSRC, PCBUSE, XABUSE, and YABUSE by inserting NOPs for these signals in the following two machine cycles M2A and M2B of the decoding stage. This is done so that no data processing, data transfer, or program control operations are executed for the next two machine cycles M2B and M3 after the machine cycle M2A when the repeat, loop, or branch operation of the instruction is actually executed.

However, in response to the CALL signal generated when a call instruction is decoded during the machine cycle M2, the plural cycle state machine 1614 inserts NOPs only for the signals ALU/BPUOP, MUOP, YBUSOP, YAUOP, PCBUSE, and YABUSE in the following two machine cycles M2A and M2B of the decoding stage. The plural cycle state machine 1614 inserts values for the XAUSRC, XABUSE and XAUOP signals during these two machine cycles M2A and M2B for pushing to data memory 1900 the contents of the condition code register 1674 shown in FIG. 29 and the contents of the fourth program control register 1505 (pc3) shown in FIG. 12. As a result, after the actual call operation of the instruction is executed in the machine cycle M2A, the contents of the condition code register 1674 are pushed to data memory 1900 during the machine cycle M2B and the contents of the program control register 1505 (pc3) are pushed to data memory 1900 during the machine cycle M3.

When a return instruction is decoded during the machine cycle M2, the instruction decode block 1612 outputs XAUSRC, XABUSE, and XAUOP signals for popping to the first program control register 1502 (pc0) shown in FIG. 12 the contents of the data memory 1900 at the location specified by the stack pointer register 1816 (sp+1). Furthermore, the instruction decode block 1612 outputs the RETURN signal and in response the plural cycle state machine 1614 inserts NOPs for the signals ALU/BPUOP, MUOP, YBUSOP, YAUOP, PCBUSE, and YABUSE in the following two machine cycles M2A and M2B of the decoding stage. However, the plural cycle state machine 1614 inserts XAUSRC, XABUSE, and XAUOP signals during the following machine cycle M2A for popping to the condition code register 1674 (ccr) shown in FIG. 29 the contents of data memory 1900 at the location specified by the stack pointer register 1817 (sp+1). And, in the following machine cycle M2B, the plural cycle state machine 1614 inserts NOPs for the XAUSRC, XABUSE, and XAUOP signals as well.

Immediate Data Decoder

Figure 31:
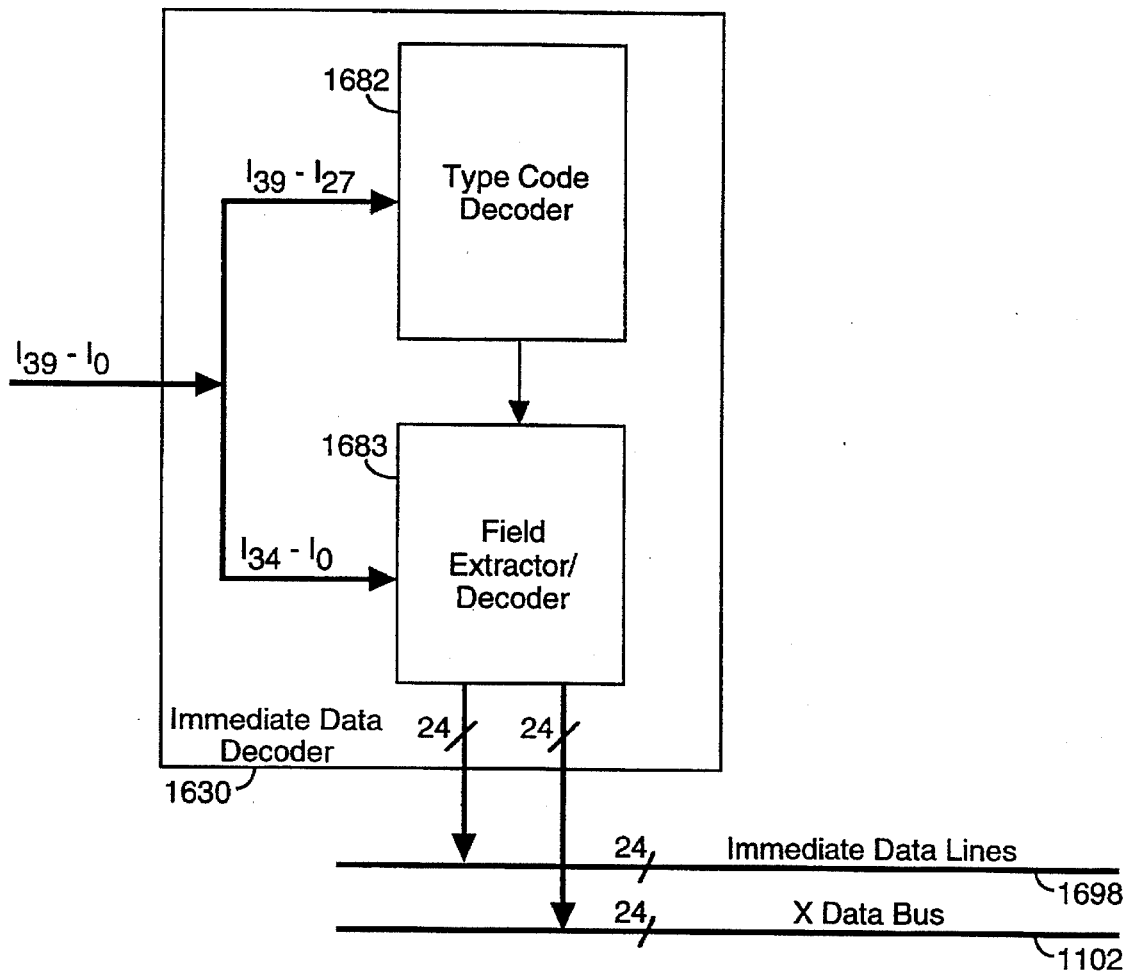
FIG. 31 is a block diagram of the immediate data decoder of the instruction decode block.

The immediate data decoder 1630 is shown in FIG. 31. It receives the bits CI39–16 outputted by the first instruction fetch register 1604 and the bits CI15-CI0 outputted by the second instruction fetch register 1606. In response to receiving these bits CI39-0, the immediate data decoder 1630 extracts and outputs immediate data on the immediate data lines 1698 or the X data bus 1102. For doing so, the immediate data decoder 1630 conceptually includes a type code decoder 1682 and a field extractor/decoder 1683.

Referring also to FIGS. 8(a)-8(f), the type code decoder 1682 receives all of the possible bits of the composite instruction which could include the type code field (TY) for the instruction types 1149, 1150, 1152–1158, 1160–1163, and 1167. These are the instruction types that involve immediate data operations. In the preferred embodiment, the type code decoder 1682 receives the first 13 bits CI39-27 of the composite instruction. This is due to the fact that instruction type 1167 has the largest type code (TY) field for an instruction type involving immediate data operations and its type code field (TY) is 13 bits long.

From the received bits CI39-27, the type code decoder 1682 decodes the type code field (TY) of the composite instruction to determine its instruction type from among the instruction types listed in FIGS. 8(a)-8(f). If the instruction is one of the instruction types 1149, 1150, 1152–1158, 1160–1163, and 1167, then the type code decoder 1682 provides the field extractor/decoder 1683 with information indicating the location and size (i.e., bit length) of the immediate data fields ($Address, $Disp, Step Number M, Repeat Count N, $DATA, $Data, $D, $A) that can be extracted from the bits CI33-16 received from the first instruction fetch decoder. In other words, the type code decoder 1682 provides the field extractor/decoder 1683 with location and size of the immediate data found in a single word instruction or the immediate data found in the first word of a double word instruction.

The type code decoder 1682 also provides the field extractor/decoder 1683 with information as to whether a double or single word instruction and with information as to whether the extracted immediate data is to be outputted onto the immediate data lines 1698 and/or the X data bus 1102. However, if the determined instruction type does not involve an immediate data operation, then the type code field decoder 1682 provides information to the field extractor/decoder 1683 as well.

The field extractor/decoder 1683 receives all of the possible bits of the composite instruction which could include the immediate data fields ($Address, $Disp, Step Number M, Repeat Count N, $DATA, $Data, $D, $A, $Address/$Data) for the instruction types 1149, 1150, 1152–1158, 1160–1163, and 1167. As is evident from FIGS. 8(a)-8(f), in the preferred embodiment this would be the 35 bits CI34-0 of the composite instruction.

In the case of the single word instruction types 1152, 1153–1157, 1161, and 1167, the field extractor/decoder 1683 receives from the type code decoder information indicating (a) that a single word instruction is being decoded, (b) the size and location of the immediate data field ($Address, $Disp, Step Number M, $Data) in the received bits CI34-16 that is to be output onto the immediate data lines 1698, and (c) for instruction type 1154, the size and location of the immediate data field (Repeat Count N) in the received bits CI34-16 that is to be output onto the X data bus 1102. In response, the field extractor/decoder 1683 (a) extracts and outputs the bits contained in the $Address, $Disp, Step Number M, $Data immediate data fields onto the immediate data lines 1698, and (b) extracts and outputs the bits contained in the Repeat Count N immediate data field not the X data bus 1102.

In the case of the double word instruction types 1149, 1150, 1160, 1162, and 1163, the field extractor/decoder 1683 receives from the type code decoder information indicating (a) that a double word instruction is being decoded, (b) for the instruction types 1149, 1160, 1162, and 1163 the size and location of the immediate data field ($A and $DATA) in the received bits CI34-16 that is to be combined with the immediate data field ($Data/$Address) in the received bits CI15-0 and output onto the immediate data lines 1698, and (c) for the instruction type 1150 the size and location of the immediate data field ($DATA) in the received bits CI34-16 that is to be combined with the immediate data field ($Data/$Address) in the received bits CI15-0 and output onto the X data bus 1102. In response, the field extractor/decoder 1683 (a) extracts and outputs the bits contained in the $A or $DATA and $Address/$Data immediate data fields of a double word instruction type 1149, 1160, 1162, and 1163 onto the immediate data lines 1698, and (b) extracts and outputs the bits contained in the $DATA and $Address/$Data immediate data fields of a double word instruction type 1150 onto the X data bus 1102.

In the actual implementation of the immediate data decoder 1630, the logic of the type code decoder 1682 and the field extractor/decoder 1683 is minimized and combined for extracting and outputting immediate data from the bits CI39-0 of the received composite instruction. As a result, the immediate data decoder 1630 decodes the type code field (TY) to determine the location and size of the immediate data fields ($Address, $Disp, Step Number M, Repeat Count N, $DATA, $Data, $D, $A, and $Address/$Data) while simultaneously extracting the these fields.

EXECUTION STAGE

As shown in FIGS. 3 and 4, the execution stage for executing the operations defined by the instruction types decoded instruction normally begins at time t3 of the preceding machine cycle M2. For most single word instructions, the execution stage ends at time t4 of the next machine cycle M3 as shown in FIGS. 3 and 4. However, as shown in FIG. 6, in the case of a standard branching instruction or return instruction, then the execution stage continues through the extra machine cycles M2A and M2B and ends at time t4 of the machine cycle M3. Referring to FIG. 5, for a double word instruction, the execution stage begins at time t3 of the machine M1A and ends at time t4 of the machine cycle M3. And, if any conflicts in accessing the data memory 1900 occur, then the execution stage ends at time t4 of the machine cycle M3B.

Register Block

Figure 29B:
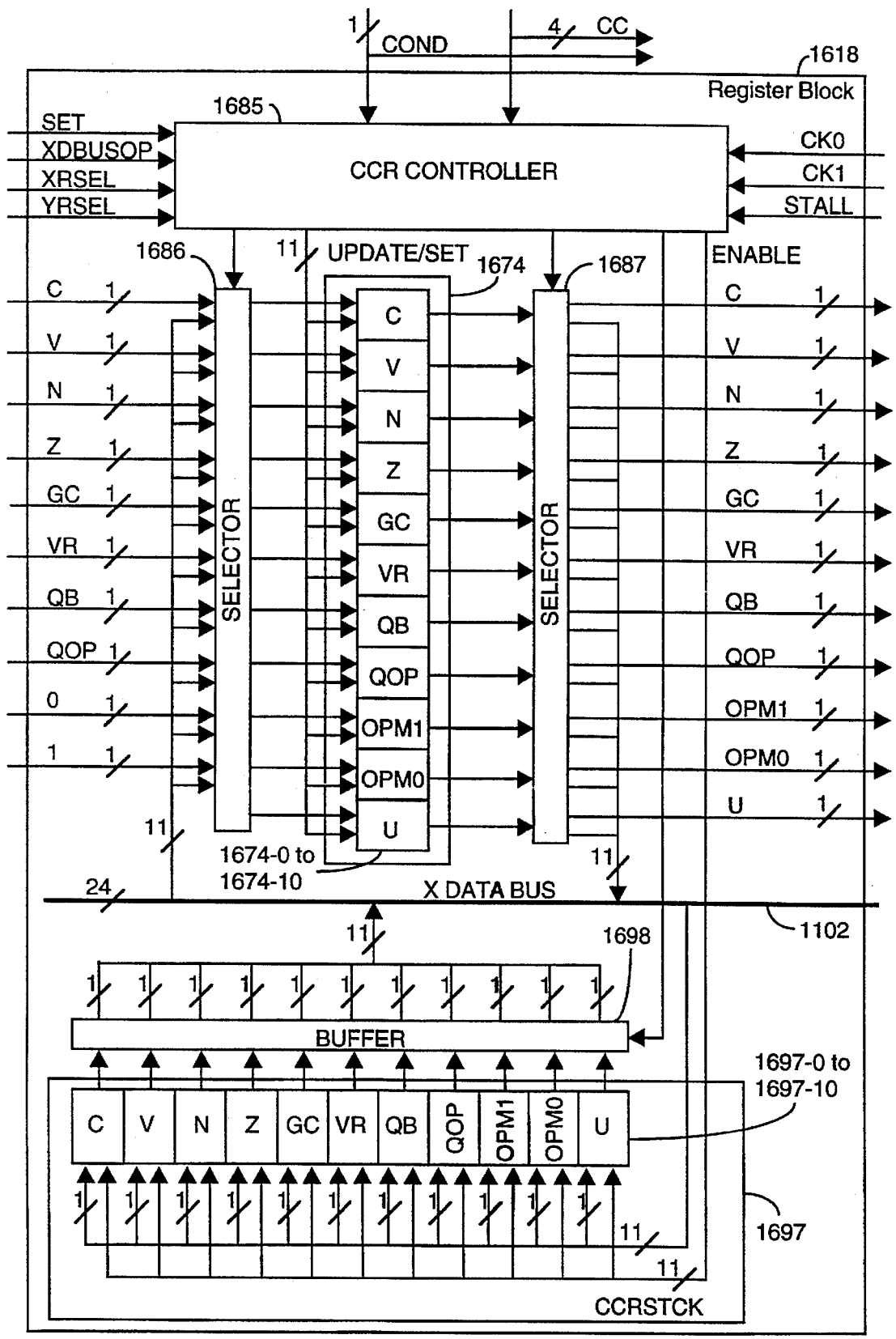

As shown in FIG. 29(b), the register block includes the condition code register 1674 (ccr), the condition code register (CCR) controller 1685, and the selectors 1686 and 1687. The condition code register (CCR) controller 1685 receives from the condition code decoder 1627 the CC, UNCOND, XRSEL, YRSEL, and XDBUSOP signals.

Referring to FIG. 10, the data registers 1702–1709 (xd0–m1) are subdivided into three sub-registers, namely a guard bit register 1702(a)–1709(a) (xd0g–m1g), a base precision register 1702(b)–1709(b) (xd0h–m1h), and an extended precision register 1702(c)–1709(c) (xd0l–m1l). Thus, for data processing operations, the ALU 1712 and the BPU 1714 both receive 56 bit operands at sources A and B from the data registers 1702–1709 (xd0–m1) for ALU or BPU operations.

Referring to FIG. 29(b), as a result of these data processing operations, the register block 1618 receives from the execution unit (EXU) 1700 (a) a 1 bit carry or borrow (C) flag for the base bits in an ALU or BPU operations, (b) a 1 bit overflow (V) flag for the base bits in an ALU or BPU operations, (c) a 1 bit zero result (Z) flag for ALU or BPU operations that provide a zero result, (d) a 1 bit negative result (N) flag for ALU or BPU operations that result in a negative result, (e) a carry or borrow (GC) flag for the guard bits in an ALU or BPU operation, and (f) an over range (VR) flag for the guard bit parts in an ALU or BPU operation. As shown in FIG. 10, the C, N, Z, V, VR, or GC flags may be generated by either the ALU 1712 or the BPU 1714.

When the XDBUSOP signal does not indicate a register to register data transfer, the condition code register (CCR) controller 1685 generates control signals for controlling the selector 1686 to provide the bit regsiters 1674-0 to 1674-5 of the condition code register 1674 (ccr) respectively with the C, V, N, Z, GC, or VR flags generated by the execution unit (EXU) 1700 and control signals for controlling the selector 1687 to output the stored C, V, N, Z, GC, or VR. However, when the condition code register (CCR) controller 1685 receives an XDBUSOP signal that indicates a register to register move and the XRSEL specifies the condition code register 1674 (ccr), then the bit registers 1674-0 to 1674-5 and 1674-10 of the condition code register 1674 (ccr) respectively can be set via the X data bus 1102 with the C, V, N, Z, GC, VR or user settable (U) flags.

If the UNCOND signal indicates that the decoded instruction does not have a condition code field (CC), then the condition code register (CCR) controller 1685 generates an UPDATE signal for updating the condition code register 1674 (ccr). As a result, if any of the flags C, V, N, Z, GC, or VR are generated by the ALU 1712 or BPU 1714 during the execution stage for the current instruction, then the condition code register 1674 (ccr) stores these flags.

However, the UNCOND signal may indicate that the decoded instruction has a condition code field (CC). Table 1 lists the 2 non-conditions 0000 and 0001, the 14 conditions 0010-1111 which can be identified by the 4 bit condition code field (CC), and gives a description of each.

TABLE 1

| CC | Description |
|---|---|
| 0000 | (a) ccr updated with flags generated during execution stage of current instruction; (b) operation executed in execution stage of current instruction completed unconditionally |
| 0001 | (a) ccr not updated with flags generated during execution stage of current instruction; (b) operation executed in execution stage of current instruction completed unconditionally |
| 0010 | (a) ccr not updated with flags generated during execution stage of current instruction; (b) operation executed in execution stage of current instruction completed only if C = 0 |
| 0011 | (a) ccr not updated with flags generated during execution stage of current instruction; (b) operation executed in execution stage of current instruction completed only if C = 1 |
| 0100 | (a) ccr not updated with flags generated during execution stage of current instruction; (b) operation executed in execution stage of current instruction completed only if N = 0 |
| 0101 | (a) ccr not updated with flags generated during execution stage of current instruction; (b) operation executed in execution stage of current instruction completed only if N = 1 |
| 0110 | (a) ccr not updated with flags generated during execution stage of current instruction; (b) operation executed in execution stage of current instruction completed only if |

TABLE 1-continued

| CC | Description |
|---|---|
| | Z = 0 |
| 0111 | (a) ccr not updated with flags generated during execution stage of current instruction; (b) operation executed in execution stage of current instruction completed only if Z = 1 |
| 1000 | (a) ccr not updated with flags generated during execution stage of current instruction; (b) operation executed in execution stage of current instruction completed only if N XOR VR = 0 |
| 1001 | (a) ccr not updated with flags generated during execution stage of current instruction; (b) operation executed in execution stage of current instruction completed only if N XOR VR = 1 |
| 1010 | (a) ccr not updated with flags generated during execution stage of current instruction; (b) operation executed in execution stage of current instruction completed only if (N XOR VR) OR Z = 0 |
| 1011 | (a) ccr not updated with flags generated during execution stage of current instruction; (b) operation executed in execution stage of current instruction completed only if (N XOR VR) OR Z = 1 |
| 1100 | (a) ccr not updated with flags generated during execution stage of current instruction; (b) operation executed in execution stage of current instruction completed only if GC OR Z = 0 |
| 1101 | (a) ccr not updated with flags generated during execution stage of current instruction; (b) operation executed in execution stage of current instruction completed only if GC = 1 |
| 1110 | (a) ccr not updated with flags generated during execution stage of current instruction; (b) operation executed in execution stage of current instruction completed only if V = 1 |
| 1111 | (a) ccr not updated with flags generated during execution stage of current instruction; (b) operation executed in execution stage of current instruction completed only if U = 1 |

As is indicated in the table, the 14 conditions 0010-1111 and the second non-condition 0001 specify that the condition code register 1674 (ccr) will not be updated with any of the C, V, N, Z, GC, or VR flags that are generated by the ALU 1712 or BPU 1714 when the current instruction containing this condition code field (CC) is executed. On the other hand, the non-condition 0000 specifies that the condition code register 1674 (ccr) will be updated with any of the C, V, Z, N, GC, or VR flags that are generated when the instruction containing this condition code field (CC) is executed.

When the condition code register (CCR) controller 1685 receives an UNCOND signal indicating that the decoded instruction has a condition code field (CC), it decodes the condition code (CC) signal produced by the condition code decoder 1627. In response, it generates an UPDATE signal for not updating the condition code register 1674 (ccr) when the condition code (CC) signal identifies one of the 14 conditions 0000 or the second non-condition 0001. On the other hand, it generates an UPDATE signal for updating the condition code register 1674 (ccr) when the CC signal identifies the first non-condition 0000.

There is a distinct advantage to utilizing a condition code that indicates that the flags C, N, Z, V, GC, or VR generated by the ALU 1712 or the BPU 1714 are not to be updated. In short, the advantage is that it reduces the number of branching instructions and other instructions which would otherwise be used in implementing a program.

Condition Check Block

Figure 32:
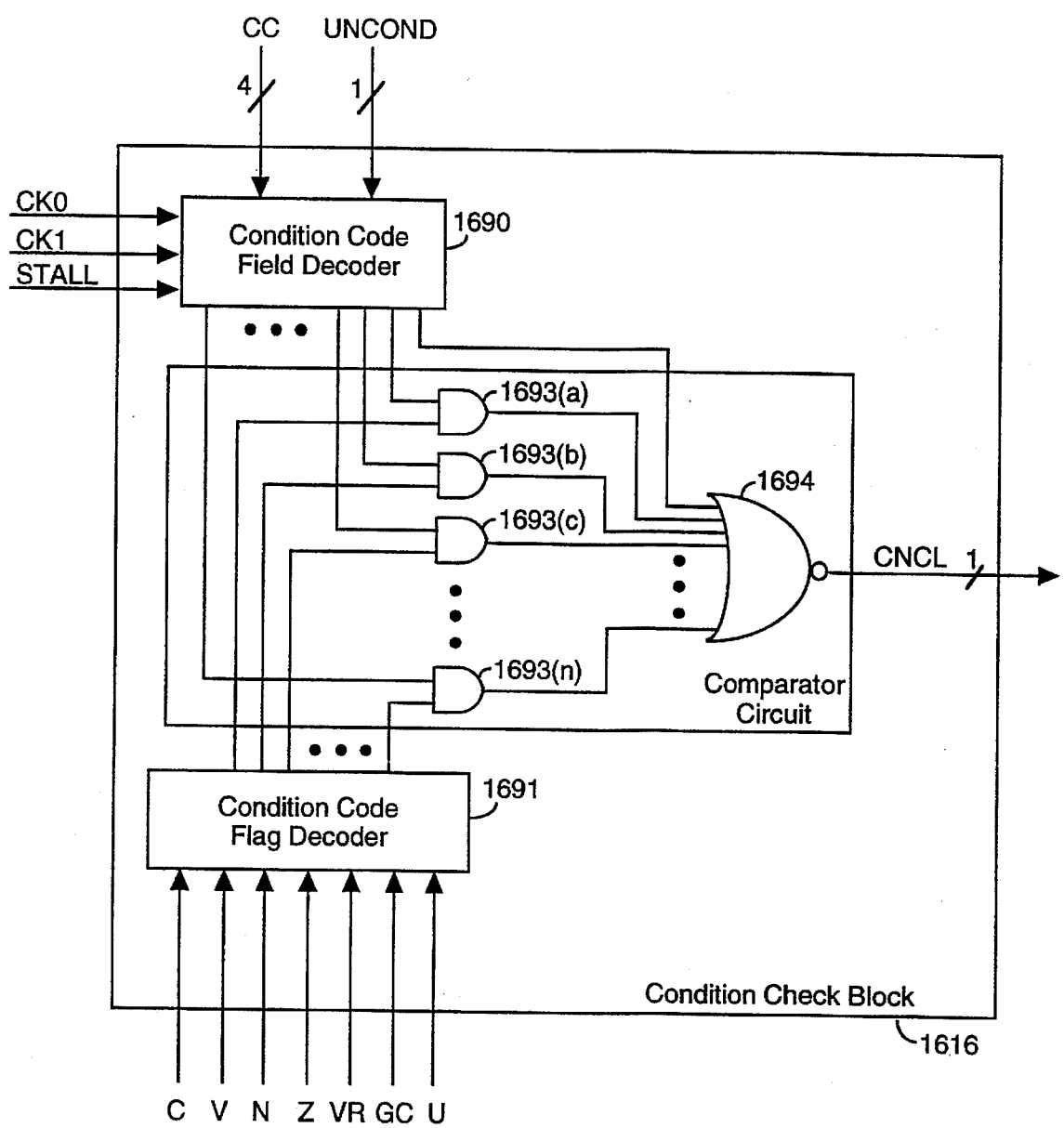
FIG. 32 is a block diagram of the condition check block of the common decoder unit.

FIG. 32 shows the condition check block 1616 of the common decoder unit 1600. It includes a condition code field decoder 1690, a condition code flag decoder 1691, and a comparator circuit 1692. The comparator circuit 1692 includes an OR gate 1694 and a set of AND gates 1693(*a*)–(*n*). Each of the AND gates 1693(*a*)–(*n*) is associated with one of the 14 conditions (0010–1111) listed in Table 1.

During the instruction decode stage of a particular instruction, the condition code field decoder 1690 receives the CC signal (i.e., the extracted condition code field of the instruction) and the UNCOND signal from the condition code decoder 1627. If the UNCOND signal indicates that an unconditional instruction has been decoded, then during the execution stage of the instruction, the condition code field decoder 1690 outputs directly to the OR gate 1694 of the comparator circuit 1692 a binary high signal. In response, CNCL signal outputted by the OR gate 1692 indicates that the operations that are defined by the instruction and that are currently being executed are to be completed.

If however, the UNCOND signal indicates that a conditional instruction has been decoded, then the condition code field decoder 1690 decodes the received CC signal to determine which of the 2 non-conditions (0000 and 0001) or 14 conditions (0010–1111) listed in Table 1 is defined by the CC signal. If the CC signal defines either of the 2 non-conditions (0000 or 0001), then during the execution stage of the instruction, the condition code field decoder 1690 outputs directly to the OR gate 1694 a binary high signal. In response, CNCL signal outputted by the OR gate 1694 indicates that the operations defined by the instruction and currently being executed are to be completed.

But, when the CC signal defines one of the 14 conditions (0010–1111), then during the execution stage of the instruction, the condition code field decoder 1690 outputs to the appropriate AND gate 1693(*a*)–(*n*) a binary high signal. At the same time, the condition code flag decoder 1691 receives the flags currently stored by the bit regsiters 1674-0 to 1674-5 and 1674-10 of the condition code register 1674 (ccr). In response, it outputs to each of the AND gates 1693(*a*)–(*n*) a binary high signal when the condition (listed in Table 1) that is associated with each of the AND gates 1693(*a*)–(*n*) currently exists. And, when the associated condition does not exist, it outputs to the associated AND gate 1693(*a*)–(*n*) a binary low signal.

As a result, if the condition defined by the CC signal currently exists, then the associated AND gate 1693(*a*)–(*n*) provides to the OR gate 1694 a binary high signal. In response, the CNCL signal output by the OR gate 1694 indicates that the operations defined by the instruction and currently 5 being executed are to be completed. But, if the condition defined by the CC signal does not currently exist, then the associated AND gate 1693(*a*)–(*n*) provides to the OR gate 1694 a binary low signal. In response, the CNCL signal output by the OR gate 1694 indicates that the operations defined by the instruction and currently being executed are to be canceled.

EXU Operation

FIG. 10 shows the architecture of the execution unit (EXU) 1700. The local execution unit (EXU) controller 1750 receives a number of the signals generated by the common decoder unit 1600 for executing a decoded instruction.

In response to the ALU/BPUOP signal, the local execution unit (EXU) controller 1750 generates control signals which are provided to the ALU 1712 and the BPU 1714. For the various instructions shown in FIGS. 9(*a*)–9(*g*) that define ALU, BPU, and combination ALU and BPU (i.e., division) operations, these control signals control the ALU 1712 and the BPU 1714 to perform those operations.

In response to the MUOP signal, the local execution unit (EXU) controller 1750 generates control signals which are provided to the MU 1716. For the various instructions shown in FIGS. 9(*a*)–(*k*) that define MU operations, these control signals control the MU to perform these operations.

As was stated earlier and is shown in FIG. 10, each of the data registers 1702–1709 (xd0–m1) includes a guard bit register 1702(*a*)–1709(*a*) (xd0g–m1g), a base precision register 1702(*b*)–1709(*b*) (xd0h–m1h), and an extended precision register 1702(*c*)–1709(*c*) (xd01–m1I). Each one of the registers 1702–1709 (xd0–m1) stores a 56 bit data word (or operand) with the guard bit registers 1702(*a*)–1709(*a*) (xd0g–m1g) storing the first 8 bits, the base precision registers 1702(*b*)–1709(*b*) (xd0h–m1h) storing the next 24 bits, and the extended precision registers 1702(*c*)–1709(*c*) (xd01–m1I) storing the last 24 bits. For data processing operations, the full registers 1702–1709 are used for storing 56 bit data words provided by the internal busses 1742 and 1744 and for outputting 56 bit data words onto the internal busses 1734–1737. However, for data transfers to and from the X and Y data busses 1102 and 1104, the subregisters 1702(*a*)–1709(*b*) can each be accessed.

The local execution unit (EXU) controller 1750 generates source control signals which are provided to the selectors 1730–1732 in response to the ALUSRCA, ALUSRCB, MU/BPUSRCA, and MU/BPUSRCB signals.

For the ALUSRCA signal, the source control signals generated by the local execution unit (EXU) controller 1750 control the selectors 1730–1732 to output onto the 56 bit internal ALUSRCA bus 1734 the 56 bits of data stored by whichever of the registers 1702–1709 (xd0–m1) was designated by the ALUSRCA signals. Referring to FIGS. 8(*a*)–8(*f*), this may occur for a decoded instruction of the type 1134–1139, 1142, 1143, 1146, and 1151. For the ALUSRCB signal, these control signals control the selectors 1730–1732 to output onto the 56 bit internal ALUSRCB bus 1735 the 56 bits of data stored by whichever of the registers 1702–1709 (xd0–m1) was designated by the ALUSRCB signal. Referring to FIGS. 8(*a*)–(*c*), this may occur for a decoded instruction of the type 1134–1146, 1151, and 1159.

For the MU/BPUSRCA signal, these control signals control the selectors 1730–1732 to output onto the 56 bit internal MU/BPUSRCA bus 1736 the 56 bits of data stored by whichever of the registers 1702–1709 (xd0–m1) was designated by the MU/BPUSRCA signal. And finally, for the MU/BPUSRCB signal, these control signals control the selectors 1730–1732 to output onto the 56 bit internal MU/BPUSRCB bus 1737 the 56 bits of data stored by whichever of the registers 1702–1709 (xd0–m1) was designated by the MU/BPUSRCB signal. Referring to FIGS. 8(*a*)–8(*f*), these may occur for a decoded instruction of the type 1134–1146, 1151, and 1159.

The local execution unit (EXU) controller 1750 also generates destination control signals which are provided to the selectors 1738–1740 in response to the ALUDST and MU/BPUDST signals. For the ALUDST signal, the control signals generated by the local execution unit (EXU) controller 1750 control the selectors 1738–1740 to input 56 bits of data from the 56 bit ALUDST bus 1742 to whichever of the registers 1702–1709 (xd0–m1) was designated by the ALUDST signal. For the MU/BPUDST signal, the control signals generated by the local execution unit (EXU) controller 1750 control the selectors 1738–1740 to input 56 bits of data from the 56 bit MU/BPUDST bus 1744 to whichever of the registers 1702–1709 (xd0–m1) was designated by the MU/BPUDST signal.

From the foregoing discussion, and as suggested in FIGS. 8(a)–(f) and FIGS. 9(a)–9(k), it is clear that the execution unit (EXU) 1700 is designed to perform single ALU, BPU, or MU operations (instruction types 1136, 1137, 1140–1145, 1149, 1151, 1157, 1159, and 1161), parallel ALU and BPU operations (division operations for instruction type 1151), and parallel ALU and MU operations (instruction types 1134, 1135, 1138, 1139, and 1146). Furthermore, this configuration is designed to provide up to two source registers and a separate destination register for each ALU, BPU, or MU operation defined by one of these instruction types. In addition, each of the 8 registers 1702–1709 (xd0–md1) can be a first source (A), a second source (B), or a destination for an operation by the ALU 1712, the BPU 1714 or the MU 1716. However, as shown in FIGS. 8(a)–8(f) and 9(a)–9(k), the number and the type of registers 1702–1709 (xd0–m1) that can be selected as a source or destination is limited by the instruction type.

In response to the INTEG signal, the local execution unit (EXU) controller 1750 generates integer arithmetic control signals provided to the ALU 1712 or the BPU 1714. These control signals control the ALU 1712 or the multiplier unit (MU) 1716 to perform integer arithmetic operations for those instructions listed in FIGS. 9(a)–(k) that involve integer arithmetic. Otherwise, if the FRAC signal is received, the local execution unit (EXU) controller 1750 generates control signals for controlling the ALU 1712 or the multiplier unit (MU) 1716 to perform fraction arithmetic operations.

The local execution unit (EXU) controller 1750 generates shift control signals provided to the ALU 1712 and the selector 1746 in response to the ALUSHFT signal. The shift control signals received by the selector 1746 control the selector 1746 to provide the shifting code stored by one of the shift registers 1720 or 1722 (sha and shb) to the source B shifter 1752 of the ALU 1712 or to the output shifter 1753 of the ALU 1712. The shift control signal received by the ALU 1712 controls the source B shifter 1752 to shift the source B operand or the ALU output shifter 1753 to shift and round the ALU output by the amount indicated in the shifting code that was provided by the selector 1746. These control signals control the ALU 1712 to perform the described shifting functions for those instructions listed in FIGS. 9(a)–(k) that involve bit shifts by with ALU operations.

If the IMMDE signal indicates that immediate data is to be used instead of a register for source B of the ALU 1712, the local execution unit (EXU) controller 1750 generates control signals provided to the buffer 1751 and the selectors 1730–1732 so that the immediate data on the immediate data lines 1698 is provided to the internal ALUSRCB bus 1735 rather than data from one of the registers 1702–1709 (xd0–m1). This occurs when one of the instruction types 1149, 1157, or 1161 is decoded by the common decoder unit 1600. However, if the IMMDE signal indicates that the contents of a register is to be used for source B of the ALU 1712, the local execution unit (EXU) controller 1750 generates control signals provided to the buffer 1752 and the selectors 1730–1732 so that data from one of the registers 1702–1709 (xd0–m1) is provided to the ALUSRCB bus 1135 instead of immediate data on the immediate data lines 1698. Referring to FIGS. 8(a)–8(f), this occurs when one of the instruction types 1134–1146, 1151, or 1159 is decoded by the common decoder unit 1600.

The local execution unit (EXU) controller 1750 generates control signals which are provided to the ALU 1712 in response to the ADDWC signal. These signals control the ALU 1712 to perform an addition with carry or a subtraction with borrow as defined in FIGS. 9(h) and 9(i) for instruction types 1146 and 1149.

If the DSTE signal indicates that a destination register is to be enabled, the local execution unit (EXU) controller 1750 generates control signals provided to the registers 1702–1709 (xd0–m1) for enabling these registers to store the data provided by the X data bus 1102, Y data bus 1104, internal ALUDST bus 1742, or internal MU/BPUDST bus 1744 via the selectors 1738–1740. Referring to FIGS. 8(a)–8(f), this occurs for the instruction types 1134–1146, 1149–1151, 1157, 1159, and 1161 that involve data processing operations and include destination fields (DST, D1, or D2). However, if the DSTE signal indicates otherwise, the local execution unit (EXU) controller 1750 generates control signals provided to the registers 1702–1709 (xd0–m1) for disabling these registers from storing the data provided by the X data bus 1102, Y data bus 1104, internal ALUDST bus 1742, or internal MU/BPUDST bus 1744 via the selectors 1738–1740. This occurs for the various instructions shown in FIG. 9(g) of the instruction type 1151 that involve data processing operations but don't include destination fields (DST, D1, or D2).

Like the local AU controller 1850, the local execution unit (EXU) controller 1750 generates data transfer control signals which are provided to the selectors 1730–1732 and 1738–1740 in response to the XRSEL, YRSEL, XDBUSOP, and YDBUSOP signals.

As was mentioned earlier, the XDBUSOP signal may indicate that data is to be stored or pushed to data memory 1900. If this is the case and the XRSEL signal specifies one of the data registers 1702(a)–1709(c) (xd0g–m1I) or one of the shift control registers 1720 and 1722 (sha and shb) for doing so, then the local execution unit (EXU) controller 1750 generates a control signal sent to the appropriate selector 1730, 1731, 1732, or 1746 for controlling that selector to output onto the X data bus 1102 the data stored by whichever of the registers was designated by the XRSEL signal. Referring to FIGS. 8(a)–8(f), this may occur for a decoded instruction of the instruction type 1134, 1136, 1139, 1140, 1143, 1145, 1147, 1165, or 1166.

But, the XDBUSOP signal may also indicate that data is to be loaded or popped from data memory 1900 to a register or that immediate data is to be loaded to a register. Then if this is the case and the XRSEL signal specifies one of the registers 1702(a)–1709(c) (xd0g–m1I) or one of the registers 1720 and 1722 (sha and shb) for doing so, the local execution unit (EXU) controller 1750 will generate a control signal sent to the appropriate selector 1738, 1739, 1740, or 1748 for controlling that selector to input data from the X data bus 1102 to whichever of the registers was designated by the XRSEL signal. This may occur for a decoded instruction of the instruction type 1134–1138, 1140–1142, 1144, 1147, 1150, 1155, 1156, 1160, 1165, or 1166.

If the YDBUSOP signal indicates that data is to be stored to data memory 1900 from a register and the YRSEL signal specifies one of the registers 1702(a)–1709(c) (xd0g–m1I) or one of the registers 1720 and 1722 (sha and shb), then the local execution unit (EXU) controller 1750 generates a control signal sent to the appropriate selector 1730, 1731, 1732, or 1746 for controlling that selector to output onto the Y data bus 1104 the data stored by whichever of the registers was designated by the YRSEL signal. Referring to FIGS. 8(a)–8(f), this may occur for a decoded instruction of the instruction type 1134, 1136, 1140, and 1147 that defines parallel data transfer operations.

However, if the YDBUSOP signal indicates that data is to be loaded from data memory 1900 to a register and the YRSEL signal specifies one of the data registers 1702(a)–1709(c) (xd0g–m1I) or one of the registers 1720 and 1722 (sha and shb), then the local execution unit (EXU) controller 1750 generates a control signal sent to the appropriate selector 1738, 1739, 1740, or 1748 for controlling that selector to input data from the Y data bus 1104 to whichever of the registers was designated by the YRSEL signal. This may occur for a decoded instruction of the instruction type 1134–1137, 1140, 1141, and 1147 that defines parallel data transfer operations.

If the XDBUSOP signal indicates that data is to be moved from one register to another and the XRSEL signal specifies one of the data registers 1702(a)–1709(c) (xd0g–m1I) or one of the registers 1720 and 1722 (sha and shb), then the local execution unit (EXU) controller 1750 generates a control signal sent to the appropriate selector 1730, 1731, or 1732 for controlling that selector to output data onto the X data bus 1102 to whichever of the data registers 1702(a)–1709(c) (xd0g–m1I) was designated by the XRSEL signal. Furthermore, if the YRSEL signal in this case specifies one of the data registers 1702(a)–1709(c) (xd0g–m1I), then the EXU controller generates a control signal sent to the appropriate selector 1738, 1739, or 1740 for controlling that selector to input data from the X data bus 1102 to whichever of the registers was designated by the YRSEL signal. This may occur for a decoded instruction of the instruction type 1148 that defines register to register (i.e., move) data transfer operations.

The local execution unit (EXU) controller 1750 also receives the clock signals CK0 and CK1. These signals are used by the local EXU decoder 1750 for proper timing in generating the control signals described earlier so that the standard pipeline shown in FIG. 3 can be implemented.

The local execution unit (EXU) controller 1750 may also receive the CANCEL signal from the condition check block 1616 of the common decoder unit 1600. In response, it generates control signals for controlling the data registers 1702(a)–1709(c) and the shift control registers 1720 and 1722 (sha and shb) to not store any data received from the X data bus 1102, Y data bus 1104, internal ALUDST bus 1742, or internal MU/BPUDST bus 1744 via the selectors 1738–1740 or 1748.

Furthermore, the local execution unit (EXU) controller 1750 may receive the STALL signal provided by the parallel arbiter 2100. When it does receive this signal, it generates control signals for controlling the data registers 1702(a)–1709(c) and the shift control registers 1720 and 1722 (sha and shb) to not store any data received from the X data bus 1102, Y data bus 1104, internal ALUDST bus 1742, or internal MU/BPUDST bus 1744 via the selectors 1738–1740 or 1748. As shown in FIG. 7, this may occur for at least one machine cycle M3A and M3B until the access conflict is resolved by the parallel arbiter 2100.

PCU

FIG. 12 shows the architecture of the program control unit (PCU) 1500. The local program control (PCU) controller 1550 receives a number of the signals generated by the common decoder unit 1600 for executing a decoded instruction.

In response to the PCUOP signal, the local program control unit (PCU) controller 1550 generates control signals which are provided to the various elements of the program control unit 1500.

Referring to FIGS. 8(a)–8(f), when non-program control instruction types 1134–1151, 1155–1161, 1165, 1166, and 1170 are decoded by the common decoder unit 1600, the PCUOP signal indicates that the contents of the program control register 1502 (pc0) are to be incremented. In response, the local program control unit (PCU) controller 1550 generates control signals provided to the program control register 1502 (pc0), the selector 1514, the selector 1516, and the adder 1506 for doing so.

Referring to FIG. 9(i), the PCUOP signal may indicate that a loop, call, branch (goto), or breakout instruction has been decoded. If this is the case and the RELB signal indicates that a relative branching operation is not to be performed, then the local program control unit controller 1550 generates control signals provided to the selectors 1514, 1516, 1518, the adder 1506, the buffer 1520, and the program control register 1502 (pc0) for (a) taking the address on the X Data Bus 1102 and (b) storing it in the program control register 1502 (pc0). This address will then be output onto the PC address bus 1116 in the following instruction fetch stage.

However, if the PCUOP signal indicates that a loop, call, branch (goto), or breakout instruction has been decoded and the RELB signal indicates that a relative branching operation is to be performed, then the local program control unit controller 1550 generates control signals provided to the selectors 1514, 1516, and 1518, the adder 1506, the buffer 1520, and the program control register 1502 (pc0) for (a) taking the immediate data address on the immediate data lines 1698 or the X data bus 1102, (b) adding it to the address output by the program control register 1502 (pc0), and (c) storing it back in this register. This address will then be output onto the PC address bus 1116 in the following instruction fetch stage.

The PCUOP signal may also indicate that repeat instruction has been decoded. In this case, the local program control unit controller 1550 generates control signals provided to the selectors 1514, 1518, 1524, 1522, the adder 1506, the buffer 1520, the repeat start register 1510 (rs), the repeat counter register 1508 (rc), and the repeat end register 1509 (re) for (a) taking the repeat count value on the X Data Bus 1102 and storing it in the repeat counter register 1508 (rc), (b) taking the step number value on the immediate data lines 1698 and adding it to the address provided by the program control register 1504 (pc2) and storing it in the repeat end register 1509 (re), and (c) taking the address stored in the program control register 1503 (pc1) and storing it in the repeat start register 1510 (rs).

The local program control unit (PCU) controller 1550 also generates data transfer control signals which are provided to the buffers 1526–1532 in response to the XRSEL, YRSEL, XDBUSOP, YDBUSOP signals.

The XDBUSOP signal may indicate that data is to be stored or pushed to data memory 1900 from a register. If this is the case and the XRSEL signal specifies one of the registers 1502, 1505, and 1508–1511 for doing so, then the local program control unit (PCU) controller 1550 generates a control signal sent to the buffer 1532 and to one of the buffers 1526–1531 for controlling those buffers to output onto the X data bus 1102 the data stored by whichever of the registers was designated by the XRSEL signal. Referring to FIGS. 8(a)–8(f), this may occur for a decoded instruction of the instruction type 1155, 1156, 1160, and 1165.

On the other hand, the XDBUSOP signal may indicate that data is to be loaded or popped from data memory 1900 to a register or that immediate data is to be loaded to a register. Then if this is the case and the XRSEL signal specifies one of the registers 1502, 1505, and 1508–1511 for doing so, the local program control unit (PCU) controller 1550 will generate a control signal sent to the buffer 1520 and one of the buffers 1526–1531 for controlling those buffers to input data from the X data bus 1102 to whichever of the registers was designated by the XRSEL signal. This may occur for a decoded instruction of the instruction type 1150, 1155, 1156, 1160, and 1165.

If the XDBUSOP signal indicates that data is to be moved from one register to another and the XRSEL signal specifies one of the registers 1502, 1505, and 1508–1511, then the local program control unit (PCU) controller 1550 generates a control signal sent to the buffer 1532 and one of the buffers 1526–1531 for controlling those buffers to output data from whichever of the registers was designated by the XRSEL signal onto the X data bus 1102. Furthermore, if the YRSEL signal in this case specifies one of the registers 1502, 1505, and 1508–1511, then the program control unit (PCU) controller 1550 generates a control signal sent to the buffer 1520 and one of the buffers 1526–1531 for controlling those buffers to input data from the X data bus 1102 to whichever of the registers was designated by the YRSEL signal. This may occur for a decoded instruction of the instruction type 1148 that defines register to register (i.e., move) data transfer operations.

The local program control unit (PCU) controller 1550 also receives the clock signals CK0 and CK1. These signals are used by the local program control unit (PCU) controller 1550 for proper timing in generating the control signals described earlier so that the standard pipeline shown in FIG. 3 can be implemented.

Furthermore, the local program control unit (PCU) controller 1550 may receive the STALL signal provided by the parallel arbiter 2100. When it does receive this signal, it generates control signals for controlling the registers 1502–1505 an 1508–1511 to not store any data received. As shown in FIG. 7, this may occur for at least one machine cycle M3A and M3B until the access conflict is resolved by the parallel arbiter 2100.

Address Unit Operation

FIG. 11 shows the architecture of the address unit (AU) 1800. The local AU decoder/controller 1850 receives a number of the signals generated by the common decoder unit 1600 for executing an instruction decoded by this unit.

As shown in FIG. 11, each of the address registers 1802–1809 (xa0–ya3) and each of the stack pointer registers 1816 (sp) and 1817 (sp+1) stores an 18 bit address. Furthermore, the index registers 1818 and 1820 (i0 and i1) store 18 bit indexing (i.e., displacement) values.

The local address unit (AU) controller 1850 generates operand address source control signals which are provided to the selector 1830 and buffers 1831 and 1832 in response to the XAUSRC and YAUSRC signals.

If the XAUSRC signal designates one of the address registers 1802–1809 (xa0–ya3) or the stack pointer registers 1816 (sp) or 1817 (sp+1), the operand address source control signals generated by the local address unit (AU) controller 1850 control the selector 1830 to output onto the 18 bit internal XAUSRC bus 1834 and onto the X address bus 1108 the 18 bits of data output by whichever of these registers was designated by the XAUSRC signal. Referring to FIGS. 8(*a*)–8(*f*), this may occur for a decoded instruction of the type 1134–1145, 1147, 1165, and 1166.

If the XAUSRC signal designates immediate address data, the operand address source control signals generated by the local address unit (AU) controller 1850 control the buffer 1832 to output onto the 18 bit internal XAUSRC bus 1834 and onto the X address bus 1108 the 18 bits of data provided by the immediate data lines 1698. Referring to FIGS. 8(*a*)–8(*f*), this may occur for a decoded instruction of the type 1155, 1156, and 1160.

On the other hand, if the DBLDT signal is received and YAUSRC signal designates one of the address registers 1802–1809 (xa0–ya3), the operand address source control signals generated by the local AU controller 1850 control the selector 1830 to output onto the 18 bit internal YAUSRC bus 1836 and onto the Y address bus 1110 the 18 bits of data output by whichever of these registers was designated by the YAUSRC signal. Referring to FIGS. 8(*a*)–8(*f*), this may occur for a decoded instruction of the type 1134–1137, 1140, 1141, and 1147 that defines parallel data transfer operations.

From the foregoing discussion, and as suggested in FIGS. 8(*a*)–8(*f*) and FIGS. 9(*a*)–9(*k*), it is clear that the address unit (AU) 1700 is designed to perform single data transfer operations (instruction types 1138, 1139, 1142–1145, 1155, 1156, 1160, and 1165) and parallel data transfer operations (instruction types 1134–1137, 1140, 1141, and 1147) that involve accessing data memory 1900, external memory 2500, the peripheral device interface 2200, and the DMAC 3000. Furthermore, each of the 8 address registers 1802–1809 (xa0–ya3) can be an operand address source for the X address bus 1108 and an operand address source for the Y address bus 1110. However, as shown in FIGS. 8(*a*)–9(*f*) and 9(*a*)–9(*k*), the number and the type of address registers 1802–1809 (xa0–ya3) that can be selected as an operand address source is limited by the instruction type.

In response to the XAUOP, YAUOP, XAUIS, YAUIS signals, the local address unit (AU) controller 1850 generates data address update control signals which are provided to the X address unit (XAU) 1812 and the Y address unit (YAU) 1814.

If the XAUSRC signal designates one of the address register 1802–1809 (xa0–ya3), then the XAUOP signal will indicate that the address outputted onto the XAUSRC bus 1836 by whichever of the address registers 1802–1809 (xa0–ya3) was designated by the XAURSC signal is to be (a) not updated, (b) incremented and then stored in the same register, (c) decremented and then stored in the same register, or (d) added together with an index (or displacement) value and then stored in the same register. In response to the XAUOP signal, the local address unit (AU) controller generates control signals that control the X address unit (XAU) 1812 to update or not update the address one of the ways just described. When the XAUOP signal indicates that the address on the XAUSRC bus 1836 is to be added to a displacement (i.e., index) value, the XAUIS signal identifies the source of the displacement value. If the XAUIS signal identifies one of the index registers 1818 or 1820 (i0 or i1), then the address unit (AU) controller 1850 generates a control signal for controlling the selectors 1822 and 1826 to output to source I of the X address unit (XAU) 1812 the displacement value contained by the specified index register. On the other hand, if the XAUIS signal indicates that immediate data will be the displacement value, then the address unit (AU) controller 1850 generates a control signal for controlling the selector 1826 to output to source I of the X address unit (XAU) 1812 the displacement value on the immediate data lines 1698.

On the other hand, if the XAUSRC signal designates the first stack pointer register 1816 (sp) (i.e. a push operation is to be performed), then the XAUOP signal will indicate that (a) the address outputted onto the XAUSRC bus 1836 by the stack pointer register 1816 (sp) is to be post decremented and then stored in the same register, and (b) the same decremented address is to be provided to the second stack pointer register 1817 (sp), incremented by one by its internal counter circuit, and then stored by it. In other words, the address contents of the stack pointer register 1816 (sp) are the address for the next push operation while the address contents of the stack register 1817 (sp+1) is the address of where the just pushed data is located.

Moreover, if the XAUSRC signal designates the second stack pointer register 1816 (sp) (i.e. a pop operation is to be performed), then the XAUOP signal will indicate that (a) the address outputted onto the XAUSRC bus 1836 by the stack pointer register 1817 (sp+1) is to be provided to and stored by the stack pointer register 1816 (sp), and (b) the same address is to be provided to the second stack pointer register 1817 (sp), incremented by one by its internal counter circuit, and then stored by it. In other words, the address contents of the stack pointer register 1816 (sp) are effectively post incremented and is the address for the next push operation while the address contents of the stack register 1817 (sp+1) is the address for the next pop operation.

The YAUOP signal indicates that the address outputted onto the YAUSRC bus 1836 by whichever address register 1802–1809 (xa0–ya3) was designated by the YAURSC signal is to be (a) not updated, (b) incremented and then stored in the same register, (c) decremented and then stored in the same register, or (d) added together with a displacement value and then stored in the same register. In response to the YAUOP signal, the local address unit (AU) controller generates control signals that control the Y address unit (XAU) 1814 to update or not update the address one of the ways just described. When the YAUOP signal indicates that the address on the YAUSRC bus 1836 is to be added to an index value, the YAUIS signal identifies the source of the index value. The YAUIS signal can only identify one of the index registers 1818 or 1820 (i0 or i1) as an index source. In response to the YAUIS signal, the address unit (AU) controller 1850 generates a control signal for controlling the selector 1822 to output to source I of the Y address unit (YAU) 1814 the index value contained by the specified index register.

The local address unit (AU) controller 1850 also generates data transfer control signals which are provided to the selectors 1830 and 1832 in response to the XRSEL, YRSEL, XDBUSOP, YDBUSOP signals.

The XDBUSOP signal may indicate that data is to be stored or pushed to data memory 1900, external memory 2500, the peripheral devices interface 2200, or the DMAC 3000 from a register. If this is the case and the XRSEL signal specifies one of the address registers 1802–1809 (xa0–ya3), one of the index registers 1818 or 1820 (i0 or i1), or one of the stack pointer registers 1816 (sp) or 1817 (sp+1) for doing so, then the local address unit (AU) controller 1850 generates a control signal sent to the selector 1830 or the selector 1822 for controlling that selector to output onto the X data bus 1102 the data stored by whichever of the registers was designated by the XRSEL signal. Referring to FIGS. 8(*a*)–8(*f*), this may occur for a decoded instruction of the instruction type 1155, 1156, 1160, and 1165.

On the other hand, the XDBUSOP signal may indicate that data is to be loaded or popped from data memory 1900, external memory 2500, the peripheral devices interface 2200, or the DMAC 3000 to a register or that immediate data is to be loaded to a register, Then if this is the case and the XRSEL signal specifies one of the address registers 1802–1809 (xa0–ya3), index registers 1818 or 1820 (i0 or i1), or stack pointer registers 1816 (sp) or 1817 (sp+1) for doing so, the local address unit (AU) controller 1850 will generate a control signal sent to the selector 1838 or the selector 1824 for controlling that selector to input data from the X data bus 1102 to whichever of the registers was designated by the XRSEL signal. This may occur for a decoded instruction of the instruction type 1150, 1155, 1156, 1160, and 1165.

If the XDBUSOP signal indicates that data is to be moved from one register to another and the XRSEL signal specifies one of the address registers 1802–1809 (xa0–ya3) or index registers 1818 or 1820 (i0 or i1), then the local address unit (AU) controller 1850 generates a control signal sent to the selector 1830 or the selector 1822 for controlling that selector to output data from whichever of the registers was designated by the XRSEL signal onto the X data bus 1102. Furthermore, if the YRSEL signal in this case specifies one of the address registers 1802–1809 (xa0–ya3), index registers 1818 or 1820 (i0 or i1), or stack pointer registers 1816 (sp) and 1817 (sp+1), then the address unit (AU) controller 1850 generates a control signal sent to the selector 1838 or the selector 1824 for controlling that selector to input data from the X data bus 1102 to whichever of the registers was designated by the YRSEL signal. This may occur for a decoded instruction of the instruction type 1148 that defines register to register (i.e., move) data transfer operations.

The local address unit (AU) controller 1850 also receives the clock signals CK0 and CK1. These signals are used by the local address unit (AU) controller 1850 for proper timing in generating the control signals described earlier so that the standard pipeline shown in FIG. 3 can be implemented.

The local address unit (AU) controller 1850 may also receive the CANCL signal from the condition check block 1616 of the common decoder unit 1600. In response, it generates control signals for controlling the address registers 1802–1809 and the index registers 1720 and 1722 to not store any data received from the X data bus 1102, Y data bus 1104, internal XAUDST bus 1842, or internal YAUDST bus 1840 via the selector 1838 or 1824.

Furthermore, the local address unit (AU) controller 1850 may receive the STALL signal provided by the parallel arbiter 2100. When it does receive this signal, it generates control signals for controlling the address registers 1802–1809 to not store any data received from the X data bus 1102, Y data bus 1104, the internal XAUDST bus 1842, or internal YAUDST bus 1844 via the selector 1838. As shown in FIG. 7, this may occur for at least one machine cycle M3A and M3B until the access conflict is resolved by the parallel arbiter 2100.

Parallel Arbiter

Referring to FIG. 15, the data memory 1900, the external memory 2500, and the peripheral devices interface 2200 may all store data. Thus, the addresses on the X address bus 1108 and the Y address bus 1110 will be mapped to one of them. Furthermore, the data memory contains 4 pages (P0–P3) 1902–1905 (i.e., 4 separate memory banks) of memory. For each page (P0–P3) 1902–1905, there is a corresponding page interface 2002–2005 in the data memory interface 2400.

Moreover, the pages (P0–P3) 1902–1905 of data memory 1900 and the peripheral devices interface 2200 are all single port devices or memories, like the external memory 2500 and the instruction memory 1400. However, the interfaces 2002–2005 and the peripheral devices interface 2200 receive addresses from the X address bus 1108, the Y address bus 1110, and the DMAC address bus 1112. As a result, conflicts in accessing the pages (P0–P3) 1902–1905 of the data memory 1900 and/or the peripheral devices interface 2200 may result during the execution stage, as well as the conflicts for accessing the external memory 2500 described earlier.

The access arbitration for the data memory 1900, external memory 2500, and the peripheral devices interface 2200 during the execution stage begins at time t3 of the machine cycle M2 for FIGS. 3, 4, 6, and 7 and M1A for FIG. 5. When no access conflicts arise, the arbitration ends at time t4 of the same machine cycle, as illustrated in FIGS. 3–6. However, when a conflict in accessing does occur, then, as shown in FIG. 7, the arbitration may end at time t4 of the machine cycle M3A.

Referring to FIG. 15, the parallel arbiter includes the external memory arbiter 2104, a data memory page arbiter 2102, and a peripheral devices interface arbiter 2106. The external memory arbiter 2104 was described earlier in terms of controlling access to and resolving conflicts in accessing the external memory 2500 during the instruction fetch stage. However, this discussion applies as well to the execution stage.

Furthermore, the data memory page arbiter 2102 controls access to and resolves conflicts in accessing the pages (P0–P3) 1902–1905 through the interfaces 2002–2005. The peripheral devices interface arbiter 2106 controls access to and resolves conflicts in accessing the peripheral devices interface 2200. Both receive (a) addresses A17–0 from the X address bus 1108, the Y address bus 1110, and the DMAC address bus 1112, and (b) the earlier discussed XABUSE and YABUSE signals from the common decoder unit 1600 and earlier discussed DABUSE signal from the DMAC 3000.

Similar to the instruction memory arbiter 2108 and the external memory arbiter 2104, the page arbiter 2102 decodes the addresses on the X address bus 1108, the Y address bus 1110, and the DMAC address bus 1112 to determine if one or more of these addresses are located in a particular page (P0–P3) 1902–1905 of the data memory 1900. Similarly, the peripheral devices interface arbiter 2106 decodes the addresses on the X address bus 1108, the Y address bus 1110, and the DMAC address bus 1112 to determine if one or more of these addresses are mapped to the peripheral devices interface 2200.

Referring to FIGS. 14 and 15, if one or more of the XABUSE, YABUSE, and DABUSE signals are received and one or more of the addresses on the X address bus 1108, Y address bus 1110, and the DMAC address bus 1112 are located in one of the pages (P0–P3) 1902–1905, then the page arbiter 2102 generates (a) a one bit X address and instruction bus select (PG0SELX, PG1SELX, PG2SELX, or PG3SELX) signal for the particular page, (b) a one bit Y address and instruction bus select (PG0SELY, PG1SELY, PG2SELY, or PG3SELY) signal for the particular page, and/or (c) a one bit DMAC address and instruction bus select (PG0SELD, PG1SELD, PG2SELD, or PG3SELD) signal for the particular page. On the other hand, if one or more of the XABUSE, YABUSE, and DABUSE signals are received and one or more of the addresses on the X address bus 1108, Y address bus 1110, and the DMAC address bus 1112 are mapped to the peripheral devices interface 2200, then the peripheral devices interface arbiter 2106 generates (a) a one bit X address and instruction bus select (PRSELX) signal, (b) a one bit Y address and instruction bus select (PRSELY) signal, and/or (c) a one bit DMAC address and instruction bus select (PRSELD) signal.

The PG0SELX, PG0SELY, PG0SELD, PG1SELX, PG1SELY, PG1SELD, PG2SELX, PG2SELY, PG2SELD, PG3SELX, PG3SELY, and PG3SELD signals are for controlling the corresponding interfaces 2002–2005 to select the X address bus 1108 and data bus 1102, the Y address bus 1110 and data bus 1104, and the DMAC address bus 1112 and data bus 1106 for accessing the corresponding page (P0–P3) 1902–1905 of the data memory 1900. Likewise, the PRSELX, PRSELY, and PRSELD signals are for controlling the peripheral devices interface 2200 to select the X address bus 1108 and data bus 1102, the Y address bus 1110 and data bus 1104, and the DMAC address bus 1112 and data bus 1106.

However, referring to FIG. 15, as mentioned earlier, the pages (P0–P3) 1902–1905 of the data memory 1900 and the peripheral devices interface are single port memories or devices. Thus, only one of the PG0SELX, PG0SELY, and PG0SELD signals, only one of the PG1SELX, PG1SELY, and PG1SELD signals, only one of the PG2SELX, PG2SELY, and PG2SELD signals, and only one of the PG3SELX, PG3SELY, and PG3SELD signals can be outputted at a time during a particular machine cycle to the respective interfaces 2002–2005 by the page arbiter 2102. And, only one of the PRSELX, PRSELY, and PRSELD signals can be outputted at a time during a particular machine cycle to the peripheral devices interface 2200 by the peripheral devices interface arbiter 2106.

As a result, if only one of the PG0SELX, PG0SELY, and PG0SELD signals, only one of the PG1SELX, PG1SELY, and PG1SELD signals, only one of the PG2SELX, PG2SELY, and PG2SELD signals, and only one of the PG3SELX, PG3SELY, and PG3SELD signals is generated at a time during a particular machine cycle, it is directly outputted by the page arbiter 2102. Similarly, if only one of the PRSELX, PRSELY, and PRSELD signals is generated at a time during a particular machine cycle, it is directly outputted by the peripheral devices interface arbiter 2106. In this case, the three stage instruction, fetch, decode, and execute pipeline proceeds as shown in FIG. 3.

However, in the case where one or more of the PG0SELX, PG0SELY, and PG0SELD signals, one or more of the PG1SELX, PG1SELY, and PG1SELD signals, one or more of the PG2SELX, PG2SELY, and PG2SELD signals, or one or more of the PG3SELX, PG3SELY, and PG3SELD signals are generated at the same time (i.e., a conflict in accessing a page (P0–P3) 1902–905), the page arbiter 2102 outputs during different machine cycles these signals based on the following priority scheme: (1) an asserted DABUSE signal held over from a previous arbitration is given first priority, (2) an asserted XABUSE signal is given second priority, (3) an asserted YABUSE signal is given second priority, and (4) an asserted DABUSE signal not held over from a previous arbitration is given last priority. At the same time, the page arbiter 2102 issues a stall (PGSTALL) signal for stalling during the access conflict the operation of the DSP core 3500 or a DMAC stall (PGDSTALL) signal for stalling during the access conflict the operation of the DMAC 3000 based on the just discussed priority scheme.

And, in the case where more than one of the PRSELX, PRSELY, and PRSELD signals are generated at the same time (i.e., a conflict in accessing the peripheral devices interface 2200), the peripheral devices arbiter 2106 outputs during different machine cycles these signals based on the same priority scheme discussed above. Also based on this priority scheme, the peripheral devices interface arbiter 2106 issues at the same time a stall (PRSTALL) signal for stalling during the access conflict the operation of the DSP core 3500 or a DMAC stall (PRDSTALL) signal for stalling during the access conflict the operation of the DMAC 3000.

Whenever an PGSTALL or PRSTALL signal is issued, it is collected by the OR gate 2110 and outputted to the DSP core 3500 as the STALL signal. As a result, operation of the DSP core 3500 is stalled as shown in FIG. 4. However, when the PGDSTALL signal or the PRDSTALL signal is issued, it is collected by the OR gate 2112 and outputted to the DMAC 3000 as the DSTALL signal. In this case, the operation of the DMAC 3000 is stalled but the three stage pipeline of the DSP core 3500 proceeds as in FIG. 3.

As was indicated earlier, the STALL signal is received by the local program control (PCU) controller 1550, the local execution unit (EXU) controller 1850, the local address unit (AU) controller, the instruction fetch controller 1608, the plural cycle state machine 1614, the condition code register (CCR) controller 1685, and the condition check block 1616. As was indicate earlier, in response, these elements of the DSP 1100 delay the execution stage, as shown in FIG. 7, so that the conflict in accessing the pages (P0–P3) 1902–1905 of the data memory 1900, the external memory 2500, or the peripheral devices interface 2200 can be properly resolved.

ADVANTAGES OF EMPLOYING DSP AND RISC CLASS INSTRUCTIONS WITH VARIABLE LENGTH TYPE CODE FIELD

The use of DSP and RISC class instructions having variable length type code fields (TY) and the associated architecture of the DSP 1100 provide several benefits in performing number crunching application programs.

As was mentioned earlier, the unique architecture of the execution unit (EXU) 1700 allows for parallel ALU and MU operations to be performed by the DSP 1100. Furthermore, the architecture of the address unit (AU) 1800 allows for parallel data transfers involving access to data memory 1900 to be performed by the DSP 1100. Referring to FIGS. 8(a)–(c), as a result, the instruction type 1134 and 1135 which have the minimum number of bits for the type code field (TY) can define the just mentioned parallel data processing operations in parallel with the just described parallel data transfer operations. Furthermore, as shown in FIG. 34, these operations are performed simultaneously during the execution stage. Since the operations defined by the instruction types 1134 and 1135 of the DSP class instructions can be executed all at once, an explicit pipeline can be implemented by a programmer utilizing these instruction types.

Furthermore, the small number of bits for the type code field (TY) enables the instruction types 1134 and 1135 to have two source fields (SX1 and SY1, SX2 and SY2) and a destination field (D1, D2) for each of the data processing operations and an operand address source field (Ab, Aa) and an operand transfer source field (Rs) or destination field (Rl, Ra, Rb) for each data transfer operation. These separate and distinct fields provides the programmer with increased programming flexibility.

In addition, the unique architecture of the execution unit (EXU) 1700 and the variable length type code field (TY) enables the programmer to select from any of the data registers 1702–1709 for performing data processing operations with RISC class instructions. Referring to FIGS. 8(a)–(c), as a result, the instruction type 1151 can define a data processing operation with two separate operand source fields (SRC1 and SRC2) and a distinct operand destination field (DST). Furthermore, each of the two source fields (SRC1 and SRC2) and the destination field can specify any of the 8 data registers 1702–1709 for use in performing the data processing operation.

Tables 2–4 provide an example of the benefits just described. Table 2 describes mathematically an N tap least mean squares (LMS) adaptive filter.

TABLE 2

N Tap LMS Adaptive Filter

| Computation | Mathematical Expression |
| --- | --- |
| Tap Weight Update | h(n + 1,i) – h(n,i) – [b][x(n – i)]<br>b = [Mn][e(n)] |
| Error Accumulation | e(n + 1,i + 1) =<br>e(n + 1,i) + [h(n + 1,i)][x(n + 1,i)] |

As indicated in the figure, the updated coefficients are expressed by the term h(n+1,i), where the constant b is the product of a predefined constant Mn and the total error accumulation e(n) from the previous loop. The error accumulation for the updated coefficients is given by the term e(n+1,i+1).

Table 3 shows the implementation of this filter using the instruction types 1134, 1135, and 1154 shown in FIGS. 8(a)–8(f).

TABLE 3

N Tap LMS Program

```
Repeat N RPT
    a0 = xd0 – m0; m0 = [a0][yd1]; *xa0 + + = a0; yd0 = *ya0 + +
    a1 = a1 + m0; m0 = [xd1][yd0]; xd0 = *xa0 + +; yd1 = *ya0 + +
RPT
```

The first instruction is of the instruction type 1154 and is for repeating the two succeeding instructions N times in order to compute N tap weights. The second instruction is of the instruction type 1134 and is for performing in parallel an ALU addition operation, an MU multiplication operation, and two load from memory operations. The third instruction is of the instruction type 1135 and is for performing in parallel an ALU addition operation, an MU multiplication operation, a store in memory operation, and a load from memory operation.

Table 4 shows 6 machine cycles (2i–2 through 2i+3) of the pipelined process implemented by the above program.

TABLE 4

| Machine Cycle | Operations | Description |
| --- | --- | --- |
| 2i – 2 | a0 = xd0 – m0;<br>m0 = [a0][yd1];<br>*xa0 + + = a0;<br>yd0 = *ya0 + + | a0 = h(n + 1,i – 1);<br>m0 = [h(n + 1,i – 2)][x(n – 1 – i)];<br>*xa0 + + = h(n + 1,i – 2);<br>yd0 = x(n – i) |
| 2i – 1 | a1 = a1 + m0;<br>m0 = [xd1][yd0];<br>xd0 = *xa0 + +;<br>yd1 = *ya0 + +; | a1 = e(n + 1,i – 1);<br>m0 = [b][x(n – i)];<br>xd0 = h(n, i);<br>yd1 = x(n – i) |
| 2i | a0 = xd0 – m0;<br>m0 = [a0][yd1];<br>*xa0 + + = a0;<br>yd0 = *ya0 + + | a0 = h(n + 1,i);<br>m0 = [h(n + 1,i – 1)][x(n – i)];<br>*xa0 + + = h(n + 1,i – 1);<br>yd0 = x(n + 1 – i) |
| 2i + 1 | a1 = a1 + m0;<br>m0 = [xd1][yd0];<br>xd0 = *xa0 + +;<br>yd1 = *ya0 + + | a1 = e(n + 1,i);<br>m0 = [b][x(n + 1 – i)];<br>xd0 = h(n,i + 1);<br>yd1 = x(n + 1 – i) |
| 2i + 2 | a0 = xd0 – m0;<br>m0 = [a0][yd1];<br>*xa0 + + = a0;<br>yd0 = *ya0 + + | a0 = h(n + 1,i + 1);<br>m0 = [h(n + 1,i)][x(n + 1 – i)];<br>*xa0 + + = h(n + 1,i);<br>yd0 = x(n + 2 – i) |
| 2i + 3 | a1 = a1 + m0; | a1 = e(n + 1,i + 1); |

TABLE 4-continued

| Machine Cycle | Operations | Description |
|---|---|---|
| | m0 = [xd1][yd0]; | m0 = [b][x(n + 2 − i)]; |
| | xd0 = *xa0 + +; | xd0 = h(n,i + 2); |
| | yd1 = *ya0 + + | yd1 = x(n + 2 − i) |

At the execution stage of each of the even numbered machine cycles (2i−2, 2i, 2i+2), the program computes a tap weight (i.e., coefficients h(n+1,i−1), h(n+1,i), h(n+1,i+1)) using the second instruction (i.e., instruction type 1134) of the program in Table 3. And, at the execution stage of each of the odd numbered machine cycles (2i−1, 2i+1, 2i+3), the program computes an error accumulation (i.e., e(n+1,i−1), e(n+1,i), e(n+1,i+1)) for the corresponding earlier computed tap weight using the third instruction (i.e., instruction type 1135) of the program of FIG. X(b). Thus, using this program it will take only 2N machine cycles to compute the N tap weights for the LMS filter for each loop.

Figure 33:
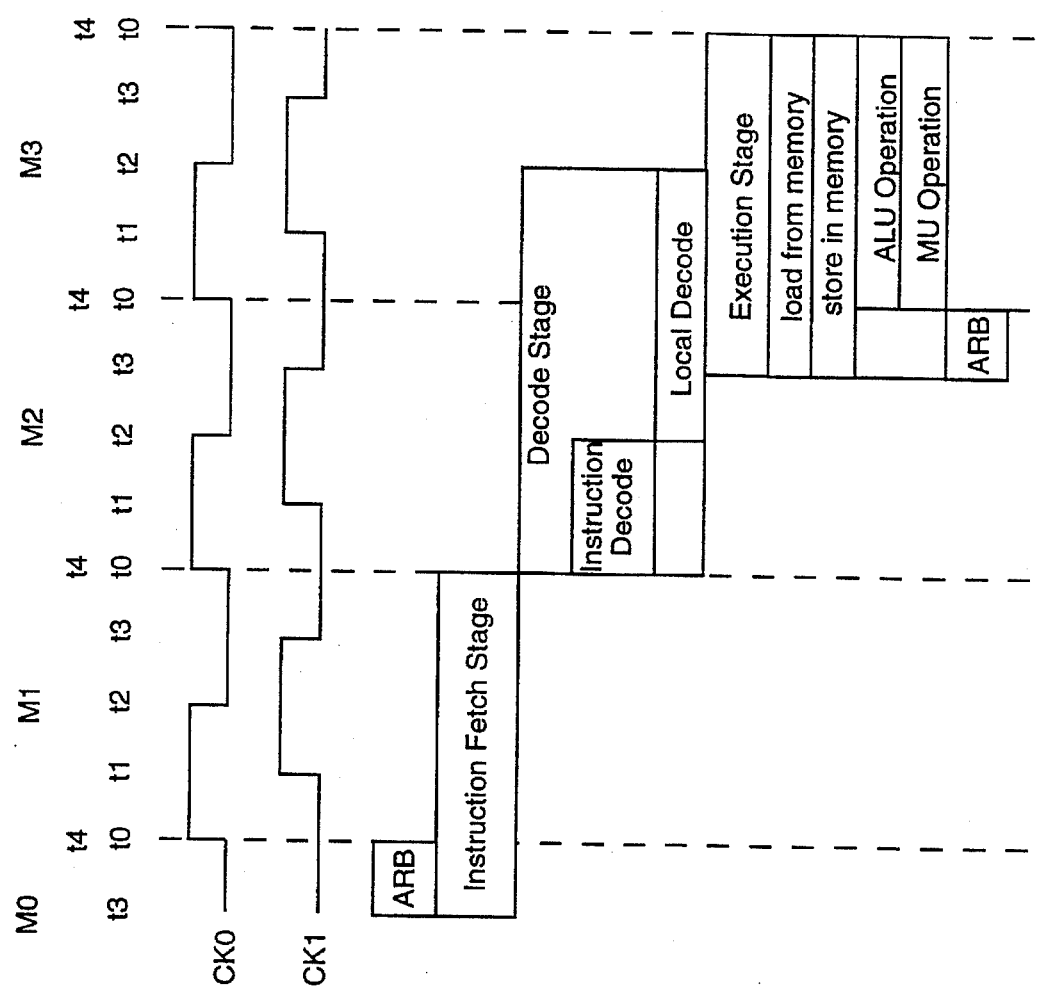
FIG. 33 is a timing diagram that shows an explicit pipeline which can be implemented by the DSP of the present invention.

Referring to FIG. 33, since all of the operation slots can are being utilized, it is clear that the pipeline for implementing this program is explicit and contains no hidden or implicit pipelining limitations. This is due to the earlier described flexibility the variable length type code field (TY) provides in terms of operand source and destination selectability and in terms of the number of separate parallel operations that can be performed with one instruction.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A digital signal processor, comprising:

a plurality of data registers for use as operand sources and destinations;

an instruction memory storing a sequence of instruction words each having the same fixed bit length, said sequence of instruction words including DSP instruction words and RISC instruction words;

each RISC instruction word identifying one of the set consisting essential of (A) one or more data processing operations and no memory access data transfer operations, (B) one or more memory access data transfer operations and no data processing operations, and (C) a program control operation;

each DSP instruction word identifying one or more data processing operations and one or more memory access data transfer operations;

said DSP instruction words including a predefined DSP instruction word identifying two data processing operations and one or more memory access data transfer operations, said predefined DSP instruction word having (A) for each data processing operation, two distinct data processing operand source fields for each specifying one of said data registers as a data processing operand source, and (B) for each memory access data transfer operation, a distinct data transfer operand source or destination field for specifying one of said data registers as a data transfer operand source or destination;

said RISC instruction words including a predefined RISC instruction word identifying two data processing operations each corresponding to one of said data processing operations identified by said predefined DSP instruction word, said predefined RISC instruction word having for each data processing operation, two distinct data processing operand source fields for each specifying one of said data registers as a data processing operand source, wherein said data processing operand source fields for a respective one of said data processing operations identified by said predefined RISC instruction word each have more bits than the corresponding one of said data processing operand source fields of the corresponding one of said data processing operations identified by said predefined DSP instruction word;

a program control unit that outputs instruction addresses one at a time to said instruction memory so as to select one of said instruction words in said instruction memory at a time; and an instruction decoder unit for decoding one at a time said selected instruction words and generating in response control signals for controlling performance of each operation identified by each decoded instruction word, said generated control signals including (A) when said predefined DSP instruction word or said predefined RISC instruction word is decoded, a data processing operand source register select signal for each data processing operand source field of said decoded predefined DSP or RISC instruction word, and (B) when said predefined DSP instruction word is decoded, a data transfer operand source or destination register select signal for each memory access data transfer operand source or destination field of said decoded predefined DSP instruction word.

2. The digital signal processor of claim 1, wherein:

for said corresponding one of said data processing operations identified by said predefined DSP instruction word, said predefined DSP instruction word has a distinct data processing destination field for specifying one of said data registers as a data processing operand destination;

for said respective one of said data processing operations identified by said predefined RISC instruction, said predefined RISC instruction word has a distinct data processing operand destination field for specifying one of said data registers as a data processing operand destination, wherein said destination field of said predefined RISC instruction word has more bits than said destination field of said predefined DSP instruction word;

said generated control signals include when said predefined DSP instruction word or said predefined RISC instruction word is decoded a data processing destination register select signal for said data processing destination field of said decoded predefined DSP or RISC instruction word.

3. The digital signal processor of claim 2, wherein:

for each data processing operation identified by said predefined DSP instruction word, said predefined DSP instruction word has a distinct data processing destination field for specifying one of said data registers as a data processing operand destination;

for each data processing operation identified by said predefined RISC instruction word, said predefined RISC instruction word has a distinct data processing operand destination field for specifying one of said data registers as a data processing operand destination, wherein said destination field of each of said data processing operations identified by said predefined RISC instruction word has more bits than the corresponding one of said destination fields of the corresponding one of the said data processing operations identified by said predefined DSP instruction word;

said generated control signals include when said predefined DSP instruction word or said predefined RISC instruction word is decoded a data processing destination register select signal for each data processing destination field of said decoded predefined DSP or RISC instruction word.

4. The digital signal processor of claim 2, further comprising:

a plurality of address registers for use as memory address sources;

for each memory access data transfer operation identified by said predefined DSP instruction word, said predefined DSP instruction word has a distinct memory address source field for specifying one of said address registers as a memory address source;

said generated control signals including when said predefined DSP instruction word is decoded a memory address register select signal for each memory address source field of said decoded predefined DSP or RISC instruction word.

5. The digital signal processor of claim 4, wherein:

said predefined DSP instruction word identifies two data processing operations and two memory access data transfer operations.

6. The digital signal processor of claim 5 wherein said fixed bit length is 24 bits.

7. The digital signal processor of claim 5 wherein said fixed bit length is 32 bits.

8. The digital signal processor of claim 5 wherein said fixed bit length is 16 bits.

9. A method operating a digital signal processor, said method comprising the steps of:

providing a plurality of data registers for use as operand sources and destinations;

storing a sequence of instruction words, said sequence of instruction words including DSP instruction words and RISC instruction words;

each RISC instruction word identifying one of the set consisting essential of (A) one or more data processing operations and no memory access data transfer operations, (B) one or more memory access data transfer operations and no data processing operations, and (C) program control operations;

each DSP instruction word identifying one or more data processing operations and one or more memory access data transfer operations;

said DSP instruction words including a predefined DSP instruction word identifying two data processing operations and one or more memory access data transfer operations, said predefined DSP instruction word having (A) for each data processing operation, two distinct data processing operand source fields for each specifying one of said data registers as a data processing operand source, and (B) for each memory access data transfer operation, a distinct data transfer operand source or destination field for specifying one of said data registers as a data transfer operand source or destination;

said RISC instruction words including a predefined RISC instruction word identifying two data processing operations each corresponding to one of said data processing operations identified by said predefined DSP instruction word, said predefined RISC instruction word having for each data processing operation, two distinct data processing operand source fields for each specifying one of said data registers as a data processing operand source, wherein said data processing operand source fields for a respective one of said data processing operations identified by said predefined RISC instruction word each has more bits than the corresponding one of said data processing operand source fields of the corresponding one of said data processing operations identified by said predefined DSP instruction word;

fetching one instruction word at a time in said instruction memory; and decoding said fetched instruction words one at a time and generating in response control signals for controlling execution of each operation identified by each decoded instruction word, said generated control signals including (A) when said predefined DSP instruction word or said predefined RISC instruction word is decoded, a data processing operand source register select signal for each data processing operand source field of said decoded predefined DSP or RISC instruction word, and (B) when said predefined DSP instruction word is decoded, a data transfer operand source or destination register select signal for each memory access data transfer operand source or destination field of said decoded predefined DSP instruction word; and executing each operation identified by each decoded instruction word in response to said generated control signals.

10. The method of claim 9, wherein:

for said corresponding one of said data processing operations identified by said predefined DSP instruction word, said predefined DSP instruction word has a distinct data processing destination field for specifying one of said data registers as a data processing operand destination;

for said respective one of said data processing operations identified by said predefined RISC instruction word, said predefined RISC instruction word has a distinct data processing operand destination field for specifying one of said data registers as a data processing operand destination, wherein said destination field of said predefined RISC instruction word has more bits than said destination field of said predefined DSP instruction word;

said generated control signals including when said predefined DSP instruction word or said predefined RISC instruction word is decoded a data processing destination register select signal for said data processing destination field of said decoded predefined DSP or RISC instruction word.

11. The method of claim 10, further comprising the step of:

providing a plurality of address registers for use as memory address sources;

for each memory access data transfer operation identified by said predefined DSP instruction word, said predefined DSP instruction word has a distinct memory address source field for specifying one of said address registers as a memory address source;

said generated control signals including when said predefined DSP instruction word is decoded a memory address register select signal for each memory address source field of said decoded predefined DSP instruction word.

12. The method of claim 11, wherein:

said predefined DSP instruction word identifies two data processing operations and two memory access data transfer operations.

13. The method of claim 9, wherein:

for each data processing operation identified by said predefined DSP instruction word, said predefined DSP instruction word has a distinct data processing destination field for specifying one of said data registers as a data processing operand destination;

for each data processing operation identified by said predefined RISC instruction word, said predefined RISC instruction word has a distinct data processing operand destination field for specifying one of said data registers as a data processing operand destination, wherein said destination field of each of said data processing operations identified by said predefined RISC instruction word has more bits than the corresponding one of said destination fields of the corresponding one of the said data processing operations identified by said predefined DSP instruction word;

said generated control signals including when said predefined DSP instruction word or said predefined RISC instruction word is decoded a data processing destination register select signal for each data processing destination field of said decoded predefined DSP or RISC instruction word.

14. A digital signal processor, comprising:

a plurality of data registers for use as operand sources and destinations;

an instruction memory storing a sequence of instruction words each having the same fixed bit length, said sequence of instruction words including DSP instruction words and RISC instruction words;

each RISC instruction word identifying one of the set consisting essential of (A) one or more data processing operations and no memory access data transfer operations, (B) one or more memory access data transfer operations and no data processing operations, and (C) a program control operation;

each DSP instruction word identifying one or more data processing operations and one or more data transfer operations;

said DSP instruction words including a predefined DSP instruction word identifying one or more data processing operations and two memory access data transfer operations, said predefined DSP instruction word having (A) for each data processing operation, two distinct data processing operand source fields for each specifying one of said data registers as a data processing operand source, and (B) for each memory access data transfer operation, a distinct data transfer operand source or destination field for specifying one of said data registers as a data transfer operand source or destination;

said RISC instruction words including a predefined RISC instruction word identifying two memory access data transfer operations each corresponding to one of said memory access data transfer operations identified by said predefined DSP instruction word, said predefined RISC instruction word having for each memory access data transfer operation, a distinct data transfer operand source or destination field for specifying one of said data registers as a data transfer operand source or destination, wherein said data transfer operand source or destination fields of said predefined RISC instruction word have more bits than said data transfer operand source or destination fields of said predefined DSP instruction word;

a program control unit that outputs instruction addresses one at a time to said instruction memory so as to select one of said instruction words in said instruction memory at a time; and an instruction decoder unit for decoding one at a time said selected instruction words and generating in response control signals for controlling performance of each operation identified by each decoded instruction word, said generated control signals including (A) when said predefined DSP instruction word is decoded, a data processing operand source register select signal for each data processing operand source field of said decoded predefined DSP instruction word, and (B) when said DSP instruction word or said predefined RISC instruction word is decoded, a data transfer operand source or destination register select signal for each data transfer source or destination field of said decoded predefined DSP or RISC instruction word.

15. The digital signal processor of claim 14, further comprising:

a plurality of address source registers for use as memory address sources;

for each memory access data transfer operation identified by said predefined DSP instruction word, said predefined DSP instruction word has a distinct memory address source field for specifying one of said address registers as a memory address source;

for each memory access data transfer operation identified by said predefined RISC instruction word, said predefined RISC instruction word has a distinct memory address source field for specifying one of said address registers as a memory address source; wherein said memory address source field for each memory access data transfer operation identified by said predefined RISC instruction word has more bits than said memory address source field of the corresponding one of said memory access data transfer operations identified by said predefined DSP instruction word;

said control signals including when said predefined DSP instruction word or said predefined RISC instruction word is decoded a memory address register select signal for each memory address source field of said decoded predefined DSP or RISC instruction word.

16. The digital signal processor of claim 15, wherein:

said predefined DSP instruction word identifies two data processing operations and two memory access data transfer operations.

17. The digital signal processor of claim 16 wherein said fixed bit length is 24 bits.

18. The digital signal processor of claim 16 wherein said fixed bit length is 32 bits.

19. The digital signal processor of claim 16 wherein said fixed bit length is 16 bits.

20. A method of operating a digital signal processor, comprising:

providing a plurality of data registers for use as operand sources and destinations;

storing a sequence of instruction words each having the same fixed bit length, said sequence of instruction words including DSP instruction words and RISC instruction words;

each RISC instruction word identifying one of the set consisting essential of (A) one or more data processing operations and no memory access data transfer operations, (B) one or more memory access data transfer operations and no data processing operations, and (C) a program control operation;

each DSP instruction word identifying one or more data processing operations and one or more memory access data transfer operations;

said DSP instruction words including a predefined DSP instruction word identifying one or more data processing operation and two memory access data transfer operations, said predefined DSP instruction word having (A) for each data processing operation, two distinct data processing operand source fields for each specifying one of said data registers as a data processing operand source, and (B) for each memory access data transfer operation, a distinct data transfer operand source or destination field for specifying one of said data registers as a data transfer operand source or destination;

said RISC instruction words including a predefined RISC instruction word identifying two memory access data transfer operations each corresponding to one of said memory access data transfer operations identified by said predefined DSP instruction word, said predefined RISC instruction word having for each memory access data transfer operation, a distinct data transfer operand source or destination field for specifying one of said data registers as a data transfer operand source or destination, wherein said data transfer operand source or destination fields of said predefined RISC instruction word have more bits than said data transfer operand source or destination fields of said predefined DSP instruction word; and fetching one of said instruction words at a time in said instruction memory;

decoding said fetched instruction words one at a time and generating in response control signals for controlling execution of each operation identified by each decoded instruction word, said control signals including (A) when said predefined DSP instruction word is decoded, a data processing operand source register select signal for each data processing operand source field of said decoded predefined DSP instruction word, and (B) when said predefined DSP instruction word or said predefined RISC instruction word is decoded, a data transfer operand source or destination register select signal for each data transfer source or destination field of said decoded predefined DSP or RISC instruction word; and executing each operation identified by each decoded instruction word in response to said control signals.

21. The method of claim 20, further comprising the step of:

providing a plurality of address source registers for use as memory address sources;

for each memory access data transfer operation identified by said predefined DSP instruction word, said predefined DSP instruction word has a distinct memory address source field for specifying one of said address registers as a memory address source;

for each memory access data transfer operation identified by said predefined RISC instruction word, said predefined RISC instruction word has a distinct memory address source field for specifying one of said address registers as a memory address source; wherein said memory address source field for each memory access data transfer operation identified by said predefined RISC instruction word has more bits than said memory address source field of the corresponding one of said memory access data transfer operations identified by said predefined DSP instruction word;

said control signals including when said predefined DSP instruction word or said predefined RISC instruction word is decoded a memory address register select signal for each memory address source field of said decoded predefined DSP or RISC instruction word.

22. The digital signal processor of claim 21, wherein:

said predefined DSP instruction word identifies two data processing operations and two memory access data transfer operations.

* * * * *